(12) United States Patent
Wang

(10) Patent No.: US 10,897,455 B2
(45) Date of Patent: Jan. 19, 2021

(54) SYSTEM AND METHOD FOR IDENTITY AUTHENTICATION

(71) Applicant: Alibaba Group Holding Limited, George Town (KY)

(72) Inventor: Qinghua Wang, Hangzhou (CN)

(73) Assignee: Alibaba Group Holding Limited

( * ) Notice: Subject to any disclaimer, the term of this patent is extended or adjusted under 35 U.S.C. 154(b) by 334 days.

(21) Appl. No.: 15/667,542

(22) Filed: Aug. 2, 2017

(65) Prior Publication Data

US 2018/0041479 A1 Feb. 8, 2018

(30) Foreign Application Priority Data

Aug. 5, 2016 (CN) .......................... 2016 1 0638118

(51) Int. Cl.
| | |
|---|---|
| *H04L 29/06* | (2006.01) |
| *H04W 12/00* | (2009.01) |
| *H04L 9/32* | (2006.01) |
| *H04W 12/06* | (2009.01) |

(52) U.S. Cl.
CPC ........ *H04L 63/0428* (2013.01); *H04L 9/3263* (2013.01); *H04L 63/083* (2013.01); *H04L 63/0823* (2013.01); *H04L 63/0838* (2013.01); *H04L 63/0853* (2013.01); *H04L 63/102* (2013.01); *H04W 12/001* (2019.01); *H04W 12/06* (2013.01)

(58) Field of Classification Search
USPC ........................................................ 726/4
See application file for complete search history.

(56) References Cited

U.S. PATENT DOCUMENTS

| | | | |
|---|---|---|---|
| 8,769,784 B2* | 7/2014 | Ganesan ................. | G06F 21/31 26/4 |
| 9,021,564 B2* | 4/2015 | Shen ..................... | H04L 63/083 726/5 |
| 9,172,699 B1 | 10/2015 | Vazquez et al. | |
| 9,301,139 B2* | 3/2016 | Korgaonkar .......... | H04W 12/06 |
| 9,374,369 B2* | 6/2016 | Mahaffey .............. | H04L 63/083 |
| 9,378,356 B2* | 6/2016 | Rockwell ................ | G06F 21/43 |
| 9,426,149 B2* | 8/2016 | Wang ................... | H04L 63/0853 |
| 9,942,763 B2* | 4/2018 | Zhang ................... | H04W 12/08 |
| 2013/0185778 A1 | 7/2013 | Tamai | |
| 2014/0068723 A1* | 3/2014 | Grim ..................... | H04W 12/06 726/4 |

(Continued)

*Primary Examiner* — Amare F Tabor
(74) *Attorney, Agent, or Firm* — Van Pelt, Yi & James LLP

(57) ABSTRACT

Embodiments of the present application relate to a method, device, and system for processing data. The method includes receiving a login request from a front-end device, the login request comprising account information of an account associated with the front-end device, determining a confirmation device associated with the front-end device based at least in part on the account information, generating an authentication request based at least in part on the account information, wherein said authentication request comprises said account information, obtaining confirmation information from the confirmation device, the confirmation information being generated based at least in part on the authentication request and confirming the login request, and authenticating, by the authentication system, the front-end device based at least in part on the confirmation information.

20 Claims, 19 Drawing Sheets

(56) References Cited

U.S. PATENT DOCUMENTS

| | | | |
|---|---|---|---|
| 2014/0173695 A1* | 6/2014 | Valdivia | G06F 21/36 726/4 |
| 2014/0189808 A1 | 7/2014 | Mahaffey et al. | |
| 2015/0082390 A1* | 3/2015 | Flink | H04L 63/0861 726/4 |
| 2015/0381618 A1* | 12/2015 | Lin | H04L 63/0869 713/169 |
| 2016/0078430 A1* | 3/2016 | Douglas | G06Q 30/0185 705/43 |
| 2016/0381038 A1* | 12/2016 | Disraeli | G06F 21/31 726/7 |
| 2018/0337783 A1* | 11/2018 | Lu | H04L 63/0807 |

\* cited by examiner

SYSTEM AND METHOD FOR IDENTITY AUTHENTICATION

CROSS REFERENCE TO OTHER APPLICATIONS

This application claims priority to People's Republic of China Patent Application No. 201610638118.6 entitled AN IDENTITY AUTHENTICATION METHOD, DEVICE AND SYSTEM, filed Aug. 5, 2016, which is incorporated herein by reference for all purposes.

FIELD OF THE INVENTION

The present application relates to the field of Internet security. In particular, the present application relates to a method, device, and system for identity authentication.

BACKGROUND OF THE INVENTION

"Two-factor" authentication is a common method used in the field of cryptography. Identity authentication generally has three elements that can be used individually or in any combination thereof. The first element is the need for identity authentication content (e.g., a password and an identification number or other identifier remembered by the user). The second element is a user-owned special authentication-reinforcing mechanism such as a dynamic password card, IC card, or magnetic card. The third element is a unique characteristic, such as fingerprints, pupils, or voice, inherently possessed by the user. When each element of identity authentication is used separately for authentication, each element has a deficiency. However, if two of the elements of identity authentication are combined (e.g., used in combination in connection with authentication), then double-element authentication is achieved (e.g., two-factor authentication). Two-factor authentication can effectively increase the security of system location control.

Currently, two-factor authentication is widely used in the context of remote Secure Shell Protocol (SSH) host logins. The following are a few of the common implementations of two-factor authentication:

a) password+token code login;
b) public key login;
c) USB card login.

However, authentication using the password+token code implementation generally results in password leaking in insecure environments such as cafes, public transit terminals, etc. When public-key implementations (e.g., including USB card logins) are used, third parties can easily log in by posing as the users. The three implementations described above partially improve login security while also diminishing user experience and introducing other security risks.

No effective solution has been put forward so far to address the problem of identity authentication methods involving both high security risks and poor user experience.

BRIEF DESCRIPTION OF THE DRAWINGS

Various embodiments of the invention are disclosed in the following detailed description and the accompanying drawings.

The drawings described here are intended to further the understanding of the present invention and form a part of the present application. The exemplary embodiments of the present invention and the descriptions thereof are intended to explain the present invention and do not constitute inappropriate limitation of the present invention.

DETAILED DESCRIPTION

Figure 1:
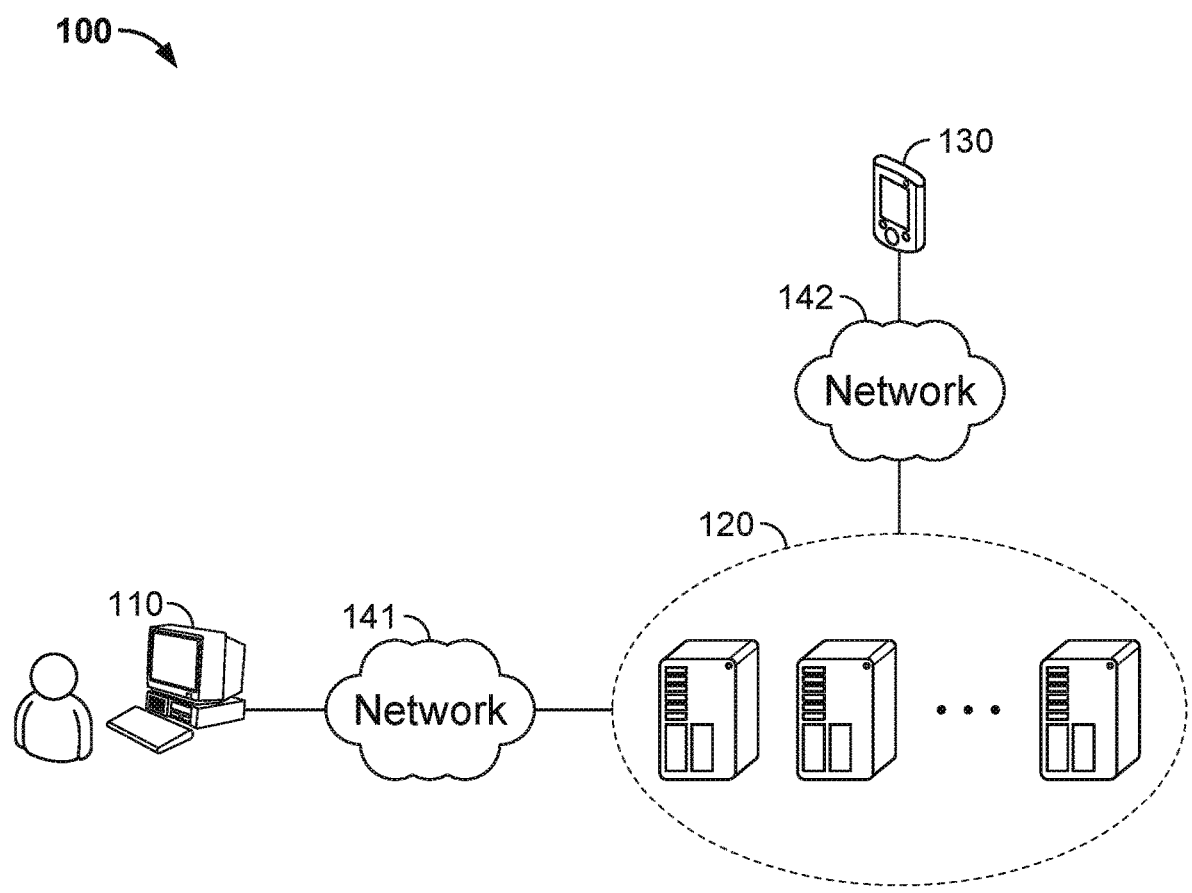
FIG. 1 is a diagram of a system for identity authentication according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So that persons skilled in the art should have a better understanding of the technical schemes of the present invention, the technical schemes in embodiments of the present invention are described clearly and completely in light of the drawings of the embodiments of the present invention. Obviously, the embodiments described are only some of the embodiments of the present invention and are not all the embodiments. All other embodiments that are obtained by persons with ordinary skill in the art on the basis of embodiments in the present invention should, so long as no additional creative effort is expended, fall within the scope of protection of the present invention.

Please note that the terms "first," "second," and so on in the description and claims of the present invention and in the drawings described above are for differentiating between similar objects and do not have to be for describing specific sequences or chronological orders. It should be understood that data used in this way is interchangeable under appropriate circumstances so that present invention embodiments described here may be implemented according to sequences other than those in drawings or descriptions here. In addition, the terms "comprising" or "having" and any variations thereof are intended to be non-exclusive. For example, processes, methods, systems, products, or equipment containing a series of steps or units need not be limited to those steps or units that are clearly listed, but may also include other steps or units that were not clearly listed or that are intrinsic to these processes, methods, products, or equipment.

The following terms are used throughout the present application:

Secure Shell Protocol (Secure Shell, SSH) is a relatively reliable protocol that provides security for remote login sessions and other network services at present. The use of SSH protocol can effectively prevent the problem of information leaks during remote management.

Token authentication uses dynamic password technology. Each password (e.g., token code) that is generated is different and remains synchronous with the authentication server.

SSL (Secure Sockets Layer) and its successor Transport Link Security (TLS) are a type of secure protocol for providing security and data integrity for network communications. SSL and TLS encrypt the connection of the transport layer to the network.

Heartbeat detection is used to assess whether network devices are executing normally. Implementations of heartbeat detection periodically send simple messages. If no response (e.g., to the simply messages) is received within a set period of time, then a system determines that the other party has experienced an abnormality.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, vehicle-mounted mobile stations, or the like. A terminal can run various operating systems.

As used herein a network can include a wired network (e.g., a local area network (LAN), a wireless network, etc. A wireless network can include WiFi connections, Bluetooth connections, cellular connections such as 3G, 4G, and 5G, etc. A network can include any combination of wired and/or wireless networks.

A terminal can have various input modules. For example, a terminal can have a touchscreen, one or more sensors, a microphone via which sound input (e.g., speech of a user) can be input, a camera, a mouse or other external input device connected thereto, etc.

As used herein, identification information associated with a terminal (or device) can comprise an IP address associated with the confirmation device, a MAC address associated with the confirmation device, a Universal Device identifier (UDID), an International Mobile Equipment Identifier (IMEI), a Subscriber Identification Module (SIM) identifier, a phone number, an account identifier associated with the confirmation device, an account identifier associated with a user of the confirmation device, the like, or any combination thereof.

FIG. 1 is a diagram of a system for identity authentication according to various embodiments of the present application.

Referring to FIG. 1, system 100 for identity authentication is provided. System 100 comprises front-end device 110 (e.g., a terminal), one or more servers 120 (also referred to herein as authentication system 120), and confirmation device 130 (e.g., a terminal). System 100 can comprise one or more networks 141 and 142 over which front-end device 110, server(s) 120, and confirmation device 130 communicate.

In some embodiments, authentication system 120 is separately connected to the front-end device 110 and the confirmation device 130. For example, authentication system 120 can establish network connections through network 141 and/or network 142 with front-end device 110 and the confirmation device 130. In some embodiments, network 141 and network 142 can be the same network.

According to various embodiments, authentication system 120 provides authentication of front-end device 110 (or authentication of the user thereof). For example, authentication system 120 can authenticate front-end device 110 via communication over one or more networks 141 and 142 with front-end device 110 and confirmation device 130.

Figure 2:
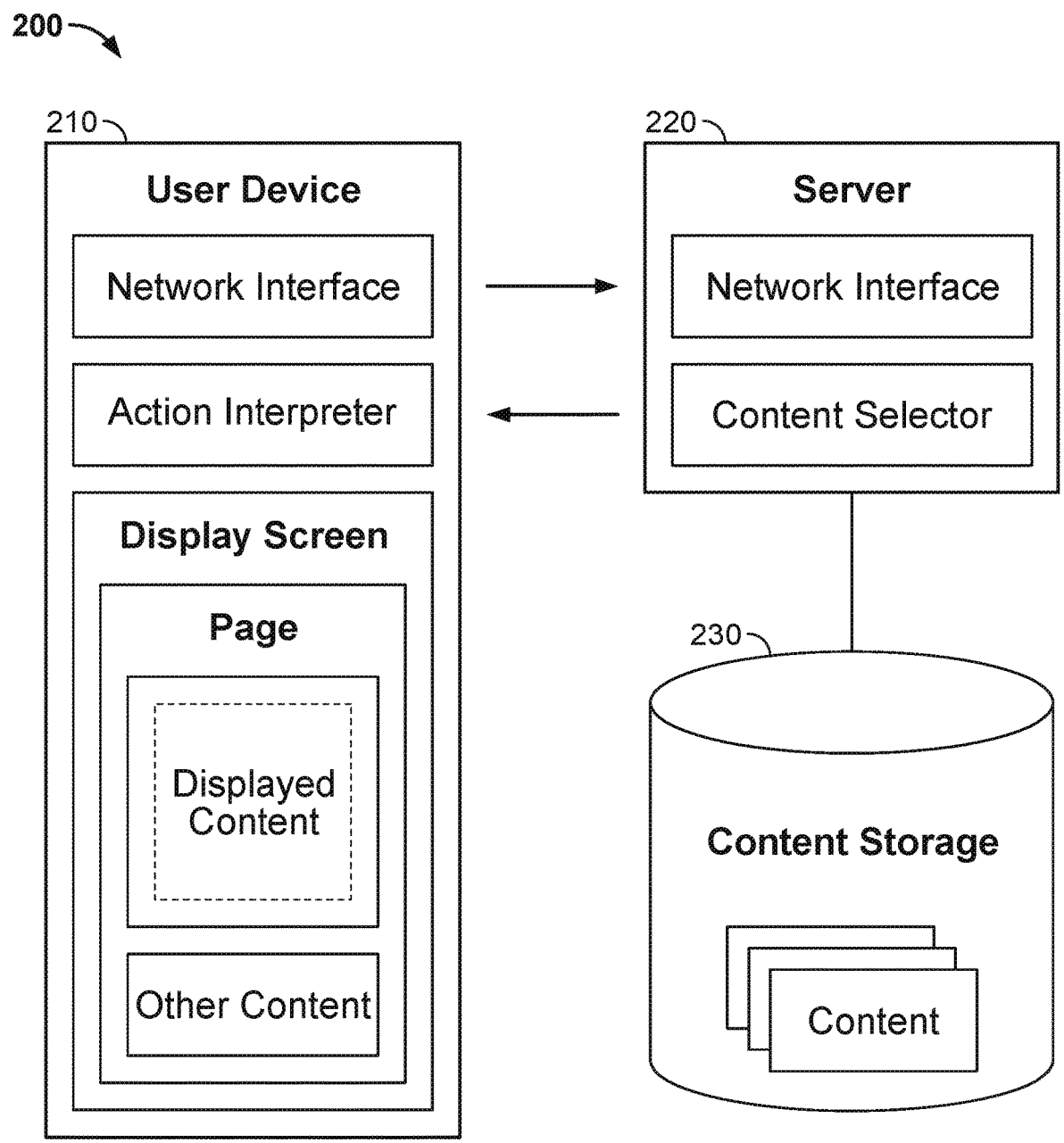
FIG. 2 is a diagram of data exchanges between a user device and a server according to various embodiments of the present application.

FIG. 2 is a diagram of data exchanges between a user device and a server according to various embodiments of the present application.

Referring to FIG. 2, a data exchange 200 between user device 210 and server 220 is provided. Server 220 can be implemented using one or more servers (e.g., that communicate with one another). User device 210 can correspond to a terminal such as front-end device 110 or confirmation device 130 of system 100 of FIG. 1. Server 220 can correspond to one or more server(s) 120 of system 100 of FIG. 1. Data exchange 200 between user device 210 and server 220 can be implemented by system 100 of FIG. 1.

FIG. 2 uses a block diagram to depict data exchanges between user device 210 and server 220. Data exchange 200 can represent data exchanges between the front-end device 110 and authentication system 120 of system 100 of FIG. 1, and between authentication system 120 and confirmation device 130 of system 100 of FIG. 1. As illustrated in FIG. 2, user device 210 (e.g., front-end device 110 or confirmation device 130 of system 100 of FIG. 1) can establish a remote network connection via a data network with server 220 (e.g., authentication system 120 of system 100 of FIG. 1). User device 210 can provide content to a user thereof. For example, user device 210 can display the content via a display screen. User device 210 can display on a display screen a page comprising displayed content and/or other content. In some embodiments, user device 210 can display (or otherwise communicate or provide to a user thereof) content that user device 210 received from server 220, or can display (or otherwise communicate or provide to a user thereof) content that user device 210 obtained from content storage 230. In some embodiments, user device 210 converts captured operations performed by the user with a mouse or a keyboard into data and sends the data via a network interface to server 220. The user device 210 can use an action interpreter or one or more processors to convert inputs thereto to data to be communicated to server 220. Server 220 can receive data (e.g., the data communicated thereto from user device 210) via a network interface (e.g., via communications across one or more networks). In some embodiments, server 220 analyzes received data and selects appropriate content from content storage. Content can be stored in content storage 230. Content storage 230 can be storage included in server 220 or can be remote in relation to server 220 and can be connected to server 220 via one or more connections or networks. Server 220 can select the appropriate content from content storage 230 using a content selector or one or more processors. Server 220 sends at least part of the content selected from content storage 230 to user device 210. For example, server 220 can obtain content from content storage 230 and send such content to user device 210. In some embodiments, server 220 can send to user device 210 a pointer, link, or address associated with the selected content stored on content storage 230. In some embodiments, user device 210 receives the content from server 220 or receives a pointer, link, or address associated with selected content stored on content storage 230.

Returning to system 100 of FIG. 1, in some embodiments, front-end device 110 communicates one or more login requests according to a predefined protocol. Front-end device 110 can communicate one or more login requests to server(s) 120. In some embodiments, the login requests comprise account information for an account. For example, the account information included in the login requests can be associated with a current account for use of front-end device 110. The current account can be associated with a user of front-end device 110.

In some embodiments, authentication system 120 is a target host logged on to remotely by a user (e.g., via front-end device 110). The target host (e.g., authentication system 120) can authenticate the identity of the user. In some embodiments, front-end device 110 is a client such as a terminal used by a user or a mobile terminal device (e.g., a smartphone, a tablet, or an iPad). In some embodiments, a login request can correspond to a remote login request by a user to remotely log on to an authentication system through a front-end device and undergo identity authentication. For example, the login request communicated by front-end device 110 to authentication system 120 can be a remote login request communicated in connection with a remote login by a user. Accordingly, the account information included in the login request (e.g., the login request communicated by front-end device 110 to authentication system 120) comprises account information for a remote login carried out by a user. As an example, the account information comprises the account name and password for the remote login.

As an example, authentication system 120 is a target host, front-end device 110 is a notebook computer (e.g., a terminal), and confirmation device 130 is a token application running on a terminal such as a mobile phone. In some embodiments, the token application generates a token (e.g., a 6 digit token). The token application can communicate the token (e.g., across an SSL connection or by certificate), and/or the token can be displayed to the user. According to this example, User A uses a notebook computer (e.g., front-end device 110) to conduct a remote login. In connection with the remote login, the user could enter the account name "1252" and the password "123456" for the remote login account. The notebook computer sends the account name "1252" and the password "123456" that were input by the user through the network to the target host (e.g., authentication system 120). The account name and password that are input by the user and sent to the target host can be communicated in the login request communicated by the notebook computer.

In this example, authentication system 120 is configured to receive login requests issued (e.g., generated and/or communicated) by front-end device 110. Authentication system 120 uses the account information communicated in connection with a login request as a basis for determining the confirmation device associated with front-end device 110, and generating an authentication request based on the account information. In some embodiments, the account information is communicated in connection with the authentication request. For example, the authentication request can comprise the account information. Authentication system 120 can determine the confirmation device associated with the front-end device 110 based at least in part on a stored mapping of confirmation devices and account information (e.g., account identifier such as account name or user name). In some embodiments, the user registers front-end device 110 and confirmation device 130 (e.g., as a precondition). If the end user has only registered a front-end device, the authentication system 120 will notify or otherwise require the user to register the token app with the same credential of the confirmation device 130. In the context of system 100, authentication system 120 determines that confirmation device 130 corresponds to account information associated with the login request communicated to authentication system 120 from front-end device 110.

In some embodiments, confirmation device 130 is a hand-held device associated with the user in advance. For example, a user can register confirmation device 130 in association with the user's account. Examples of a confirmation device include terminals such as smartphones, tablets, iPads, and other such devices that can serve as token terminal devices (e.g., a device that can generate a token) for identity authentication. According to various embodiments, system 100 can use account information to associate a front-end device with a confirmation device and/or to associate a user or account with a confirmation device. For example, based on account information, the user can associate the currently used front-end device with a confirmation device. In some embodiments, authentication system 120 saves account information in relation to the corresponding confirmation device.

In some embodiments, front-end device 110 is communicated to authentication system 120 in connection with a remote login. As an example, a user can input account information (e.g., to front-end device 110) in connection with a remote login. Front-end device 110 sends the account information via the network to authentication system 120 for authentication (e.g., of the user or account associated with front-end device 110). Authentication system 120 can use the account information received in connection with the remote log-in to determine whether information for a corresponding account is stored. For example, authentication system 120 queries a local database as to whether the database has the account information. If authentication system 120 fails to find the account information, authentication system 120 determines that the account is a non-legitimate account. For example, in the event that authentication system 120 is unable to identify information for an account corresponding to the received account information, authentication system 120 can deem authentication of the account information (or the user or the front-end device) to have failed. If authentication system 120 finds the account information, authentication system 120 determines the confirmation device associated with the account information. For example, authentication system 120 determines the confirmation device associated with front-end device 110. After looking up the account information and determining the confirmation device (e.g., confirmation device 130 of system 100) associated with the account information, authentication system 120 can send the account information via the network to the confirmation device. Authentication system 120 can send the account information to the confirmation device in connection with communicating an authentication request to the confirmation device. The user can manually confirm the account information received by the confirmation device. For example, in the event that the confirmation device receives the account information (or a confirmation request) from authentication system 120, the confirmation device can prompt a user thereof to confirm the corresponding login request. The user can confirm the login request by inputting an input associated with the confirmation (e.g., selecting a button on a user interface, the button being associated with confirming the login request). In some embodiments, the confirmation device can automatically confirm the login request. For example, the login request can be automatically confirmed based on a context of the login request satisfying one or more predefined criteria (e.g., location of the front-end device, a proximity of the front-end device to the confirmation device, etc.).

As an illustrative example, the authentication system is a target host, the front-end device is a notebook computer, and the confirmation device is a mobile phone. After receiving the account information "1252" and "123456," the target host locally looks up the mobile phone associated with the account information (e.g., account name and/or password). In the event that the target host finds mobile Phone A as being associated with the account information, the target host sends an authentication request to Mobile Phone A. The authentication request can include "Account '1252' requests remote login; permitted?"

In some embodiments, confirmation device 130 is configured to receive authentication requests and to communicate confirmation information generated in connection with the authentication requests back to the authentication system. For example, confirmation device 130 can communicate an indication whether the login request (or an account associated therewith) received by authentication system 120 is authenticated. The authentication request communicated by authentication system 120 to confirmation device 130 is associated with a login request received by authentication system 120. The indication of whether the login request received by authentication system 120 is authenticated can be included in the confirmation information that is communicated by confirmation device 130 to authentication system 120.

In some embodiments, if authentication system 120 determines that the current account is a legitimate account (e.g., that the login request or account associated therewith is authenticated), authentication system 120 communicates an indication of the confirmation or authentication of the login request by confirmation device 130. For example, authentication system 120 can report the confirmation information back to front-end device 110. In the event that confirmation device 130 communicates an indication of confirmation of the login request, authentication system 120 determines that the current account is a legitimate account. For example, authentication system 120 deems the login request (or the account associated therewith) to be authenticated in the event that confirmation device 130 communicates an indication of confirmation of the login request.

According to various embodiments, the confirmation device can generate the confirmation information in connection with one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, if the user (e.g., of confirmation device 130) determines that the account information sent by authentication system 120 corresponds to account information input by the user himself or herself (e.g., via front-end device 110), the user can generate confirmation information by clicking a confirmation button displayed on confirmation device 130 or by swiping the display screen of the confirmation device 130. Confirmation device 130 communicates the confirmation information back to authentication system 120. Authentication system 120 determines whether the account is a legitimate account (or whether the login request is authenticated or otherwise authorized) based on the confirmation information (e.g., communicated by confirmation device 130). In the event that the account is deemed to be a legitimate account (or that the login request is authenticated or otherwise authorized), remote login may be carried out. In some embodiments, absence of receipt of confirmation information (e.g., associated with a corresponding authentication request) is deemed to indicate that the account is a non-legitimate account (or that the login request is not authenticated or not otherwise authorized). For example, if authentication system 120 has not received confirmation information sent back by confirmation device 130, then authentication system 120 determines that the account is a non-legitimate account. In the event that the account is determined to be a non-legitimate account (or that the login request is not authenticated or not otherwise authorized), remote login cannot be carried out. For example, authentication system 120 can deny a login request in the event that the corresponding account is determined to be a non-legitimate account (or that the login request is not authenticated or not otherwise authorized).

In some embodiments, if the user (e.g., of confirmation device 130) confirms that the user has not entered the account information (or otherwise submitted a login request), or if the account information sent by authentication system 120 is not account information entered by the user, then the user can provide an indication to confirmation device 130 that the account information or corresponding login request is not authenticated. For example, the user can generate denial information by clicking a deny button displayed on confirmation device 130. In response to receiving the denial information from the user (or otherwise being generated in connection with an authentication request), confirmation device 130 communicates the denial information to authentication system 120. The denial information can be included in confirmation information communicated to authentication system 120. For example, the denial information can correspond to an indication that the account information or corresponding login request is not authenticated. Authentication system 120 determines that the account is a non-legitimate account (or that the account information or corresponding login request is not authenticated) based at least in part on the denial information. In the event that authentication system 120 determines that the account is a non-legitimate account (or that the account information or corresponding login request is not authenticated), remote login cannot be carried out. For example, authentication system 120 can deny the corresponding login request in response to determining that the account is a non-legitimate account (or that the account information or corresponding login request is not authenticated). Authentication system 120 can communicate an indication of the denial of the corresponding login request to front-end device 110.

As an illustrative example, authentication system 120 is a target host, front-end device 110 is a notebook computer, and confirmation device 130 is a mobile phone. Confirmation device 130 (e.g., corresponding to account information associated with a login request) can be Mobile Phone A. After receiving an authentication request (e.g., from the target host), Mobile Phone A can display the authentication request or information associated therewith. For example, Mobile Phone A can display "Account '1252' requests remote login; permitted?" on the display screen along with a permission button and a rejection button. The user holding Mobile Phone A can view the authentication request. If the user permits account "1252" to conduct the remote login, then the user can generate (via Mobile Phone A) confirmation information by clicking the permission button. Mobile Phone A communicates the confirmation information back to the target host. The target host determines that account "1252" is a legitimate account (or that the corresponding login request is authenticated) based on the confirmation information communicated by Mobile Phone A. In the event that the authentication system determines that account "1252" is a legitimate account, the target host permits the account to conduct the remote login, and establishes a remote login connection with the notebook computer.

In some embodiments, the front-end device refers to the device currently in need of identity authentication; the authentication system refers to the device that performs the first identity authentication of the front-end device, and the confirmation device is the device that performs the second identity authentication of the front-end device, thereby achieving two-factor authentication of the front-end device and making identity authentication more secure.

According to various embodiments, authentication system 120 receives a login request issued by front-end device 110; authentication system 120 uses account information (e.g., associated with the login request) as a basis for determining the confirmation device associated with front-end device 110; authentication system 120 communicates an authentication request to confirmation device 130; authentication system 120 receives confirmation information from confirmation device 130, in the event that authentication system 120 receives the confirmation information communicated by confirmation device 130 in response to the authentication request, authentication system 120 determines that the current account is a legitimate account (or that the login request is authenticated); and in the event that authentication system 120 determines that the current account is a legitimate account (or that the login request is authenticated), authentication system 120 implements identity authentication for the remote login.

Because the login request sent by front-end device 110 comprises account information for the current account for use of front-end device 110, authentication system 120 can look up the confirmation device with the account information and communicate the account information to the confirmation device (e.g., in connection with an authentication request). Authentication system 120 can look up the confirmation device in a local storage (e.g., database) or a remote storage. The user can complete the identity authentication by performing a manual operation (e.g., on confirmation device 130) to confirm the account information or corresponding login request. The use of the user completing the identity authentication (e.g., on confirmation device 130) avoids password leaks or the security risks involved in other parties falsely presenting themselves. Moreover, the user does not need to input a password during the identity authentication process, but only to perform a simple confirmation operation. Therefore, various embodiments achieve the effects of enhancing user login experience, reducing user login time costs, and effectively preventing user misrepresentation.

Various embodiments address the technical problem in the prior art of identity authentication methods involving both high security risks and poor user experience.

In some embodiments, the authentication system establishes network connections separately with at least one front-end device and at least one confirmation device and receives a first registration request sent from any one front-end device and/or a second registration request sent from any one confirmation device, wherein the first registration request carries the first account information used by any one front-end device when first remotely logging on to the authentication system, and the second registration request carries the second account information used by any one confirmation device when first remotely logging on to the authentication system.

In some embodiments, front end device 110 and confirmation device 130 are registered with the same credential (e.g., associated with the user). The authentication system 120 can identify the front-end device 110 and confirmation device 130 based on the registration thereof.

In some embodiments, the authentication system can establish remote network connections with multiple, remotely logged-in, front-end devices and with the confirmation devices associated with multiple front-end devices. In response to each user remotely logging in for the first time, the remote login account information can be sent through the front-end device to the authentication system for registration, and the account information can be sent through the confirmation device to the authentication system for registration.

As an illustrative example, authentication system 120 is a target host, front-end device 110 is a notebook computer, and the confirmation device 130 is a mobile phone. In the event that User A first uses Notebook Computer A to log in remotely, User A can enter the remote login account name "1252" and the password "123456" into both Notebook Computer A and Mobile Phone A. Notebook Computer A and the Mobile Phone A each communicate the user-entered account name "1252" and password "123456" through the network to the target host. In the event that User B first uses Notebook Computer B to log in remotely, User B can enter the remote login account name "1253" and the password "456123" into both Notebook Computer B and Mobile Phone B. Notebook Computer B and Mobile Phone B each communicate the user-entered account name "1253" and password "456123" through the network to the target host.

In some embodiments, authentication system 120 can deem a current account or a corresponding login request to be authenticated if authentication system 120 receives account information (e.g., an account name, account identifier, account password, etc.) from front-end device 110 that matches account information received (contemporaneously) from confirmation device 130.

In some embodiments, authentication system 120 generates first registration information according to a first registration request (received from a front-end device such as PC device) and/or generates second registration information according to a second registration request (received from a confirmation device such as a token application installed on a mobile terminal that can generate a token). Authentication system 120 can generate the first registration information in response to receiving the first registration request. Authentication system 120 can generate the second registration information in response to receiving the second registration request. The first registration information comprises: the first account information and a certificate associated with the first account information, and the second registration information at least comprises: the second account information. The certificate associated with the first account information (that can be included in the first registration information) can correspond to a token such as an encrypted key, a password, or the like. For each registration, authentication system 120 can generate a private certificate (e.g., with a unique local device hardware information). The private certificate can be used in connection with a later SSL connection. In some embodiments, the front end device 110 is associated with confirmation device 130 based on the first registration information and the second registration information.

In some embodiments, the first registration information is used in the trusted certificate information that is used for launching the next login. The trusted certificate information can comprise information associated with the user and/or device. The information associated with the user and/or device can be used to identify the user and/or device. For example, the information associated with the user and/or device can be used to confirm that the device from which the trusted certificate information is received corresponds to a validated device and/or user. The second registration information can include a certificate associated with the second account information and identification information for the confirmation device. Before the confirmation device carries out identity authentication, the confirmation device may be verified according to the certificate. The certificate can be communicated via an SSL connection and can comprise information from which the corresponding front-end device and/or confirmation device can be determined. If the verification fails, that indicates that the confirmation device is a non-legitimate device. For example, if authentication system 120 determines that the confirmation device from which account information is received does not match the confirmation device associated with the request received from front-end device 110, then the confirmation device from which account information is received is deemed to be a non-legitimate device. As a result, authentication of the login (e.g., identity authentication) fails. In the event that the confirmation device is deemed to be a non-legitimate device, authentication system 120 will not send the information or a request associated with validation/authentication to this confirmation device.

In some embodiments, authentication system 120 saves the first registration information and the second registration information. Authentication system 120 can store the first registration information and/or the second registration information locally or remotely. For example, the first registration information and/or the second registration information can be stored at a central data store.

In some embodiments, in response to receiving the first account information communicated by front-end device 110, authentication system 120 can generate a corresponding certificate according to the first account information. Authentication system 120 can save the first account information and the corresponding certificate locally in authentication system 120 or remotely at a central data store. The certificate can be used as a credential (e.g., in place of a password). The certificate can comprise information used in connection with a login. The credential can include information associated with the user and/or device hardware information that can identify the user and/or the applicable device. In response to receiving the second account information communicated by the confirmation device 130, authentication system 120 can save the confirmation device identification information and the second account information locally in authentication system 120 or remotely at a central data store.

In some embodiments, after receiving the first account information communicated by front-end device 110, authentication system 120 generates a corresponding certificate according to the first account information and saves the first account information and the corresponding certificate locally in authentication system 120. Authentication system 120 can generate the corresponding certificate in response to receiving the first account information from front-end device 110. After receiving the second account information communicated by confirmation device 130, authentication system 120 generates the corresponding certificate according to the second account information and saves the confirmation device identification information, the second account information, and the corresponding certificate locally in the authentication system. Authentication system 120 can generate the corresponding certificate based on the second account information in response to receiving the second account information from confirmation device 130. Authentication system 120 can also save the first account information, corresponding certificate, the confirmation device identification information, the second account information, and/or the corresponding certificate in a remote data store.

As an illustrative example, authentication system 120 is a target host, front-end device 110 is a notebook computer, and the confirmation device 130 is a mobile phone. After receiving the account name "1252" and the password "123456" sent by Notebook Computer A, the target host can generate Certificate A for Notebook Computer A and save the account name "1252," the password "123456," and Certificate A locally in a database. The certificate can be generated using OpenSSL. The account name, password, and/or Certificate A can be stored in association with the Notebook Computer A and/or a user associated with the Notebook Computer A. The target host can generate the Certificate A in response to receiving the account name and password communicated by Notebook Computer A. After receiving the account name "1252" and the password "123456" sent by Mobile Phone A, the target host can save Mobile Phone A's identification information, the account name "1252," and the password "123456" locally in a database. After receiving the account name "1253" and the password "456123" sent by Notebook Computer B, the target host can generate Certificate B for Notebook Computer B and save the account name "1253," the password "456123," and Certificate B locally in a database. The account name, password, and/or Certificate B can be stored in association with the Notebook Computer B and/or a user associated with the Notebook Computer B. The target host can generate the Certificate C in response to receiving the account name and password communicated by Notebook Computer B. The certificate can be generated using OpenSSL. After receiving the account name "1253" and the password "456123" sent by Mobile Phone B, the target host can save Mobile Phone B's identification information, the account name "1253," and the password "456123" locally in a database. In some embodiments, the target host saves the account names, passwords, certificates, device identification information, the like, or any combination thereof remotely in a data store.

In some embodiments, if the first account information and the second account information are determined to match (e.g., be the same), the front-end device that uses the first account information for registration and the confirmation device that uses the second account information for registration in the authentication system are deemed to be inter-related devices. For example, the authentication system can determine that the first account information associated with the front-end device matches the second account information associated with the confirmation device, and can deem the confirmation device as being associated with the front-end device (e.g., the confirmation device can be deemed to correspond to an account associated with the front-end device).

In some embodiments, in the event that a user binds his own confirmation device to a front-end device, the user can communicate remote login account information through the front-end device to the authentication system for registration, and by having the confirmation device communicate the same remote login account information to the authentication system for registration, the authentication system confirms that the confirmation device and the front-end device are inter-related. For example, the user can operate the front-end device and the confirmation device to each communicate remote login account information, and if the remote login account information communicated by the front-end device and the confirmation device are determined to match, the authentication system can deem the front-end device and the confirmation device to be associated.

As an illustrative example, the authentication system is a target host, the front-end device is a notebook computer, and the confirmation device is a mobile phone. The target host can use stored account names and passwords as a basis for determining that Notebook Computer A and Mobile Phone A are inter-related devices and that Notebook Computer B and Mobile Phone B are inter-related devices. For example, the target host can determine whether the account names and/or passwords associated with Notebook Computer A and the account names and/or passwords associated with Mobile Phone A match (e.g., are the same) in connection with determining whether Notebook Computer A and Mobile Phone A are inter-related devices. Similarly, the target host can determine whether the account names and/or passwords associated with Notebook Computer B and the account names and/or passwords associated with Mobile Phone B match (e.g., are the same) in connection with determining whether Notebook Computer B and Mobile Phone B are inter-related devices.

According to various embodiments, during an initial remote login to authentication system 120, authentication system 120 uses the received account information as a basis for generating the registration information used in connection with an identity verification and for confirming the association between front-end device 110 and confirmation device 130. In this way, authentication system 120 achieves the goal of performing identity authentication based on received account information in connection with a subsequent remote login to authentication system 120.

Figure 3:
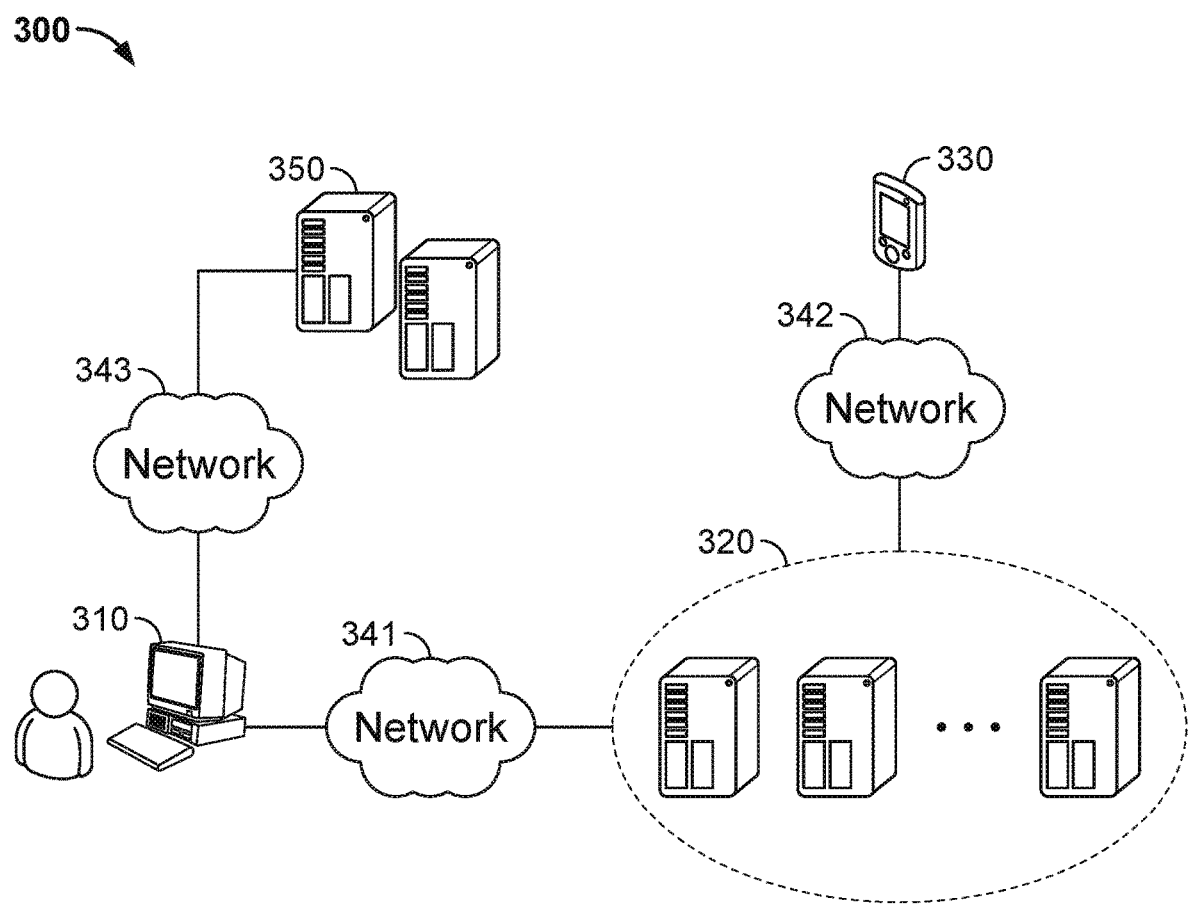
FIG. 3 is a diagram of an identity authentication system according to various embodiments of the present application.

FIG. 3 is a diagram of an identity authentication system according to various embodiments of the present application.

Referring to FIG. 3, system 300 for identity authentication is provided. System 300 comprises front-end device 310 (e.g., a terminal), one or more servers 320 (also referred to herein as authentication system 320), and confirmation device 330 (e.g., a terminal). System can comprise server 350 (e.g., authorization server 350). System 300 can comprise one or more networks 341, 342, and/or 343 over which front-end device 310, server(s) 320, and confirmation device 330 communicate. In some embodiments, system 300 comprises one or more servers 350 and one or more 341, 342, and/or 343 over which front-end device 310 and server(s) 350 communicate. In some embodiments, server(s) 350 can correspond to an authorization server.

In some embodiments, front-end device 310 can be implemented by front-end device 110 of system 100 of FIG. 1; one or more servers 320 can be implemented by authentication system 120 (e.g., one or more servers 120) of system 100 of FIG. 1; and confirmation device 330 can be implemented by confirmation device 130 of system 100 of FIG. 1.

One or more servers 320 (also referred to herein as authentication system 320). In some embodiments, the authentication system further comprises an authorization server. For example, authentication system 320 can comprise an authorization server 350.

Authentication system 320 (e.g., authorization server 350) is configured to receive a verification code communicated by front-end device 310. The verification code can be communicated to authentication system 320 in connection with a remote login or otherwise in connection with an identity authentication. Authentication system 320 can extract information from the verification code. In some embodiments, information extracted from the verification code comprises account information (e.g., associated with a login request or for which identity authentication is to be performed), and/or a security certificate corresponding to the account associated with the account information. Authentication system 320 can extract the information from the verification code by decrypting the verification code. Authentication system 320 can decrypt the verification code according to a predetermined decryption algorithm. Authentication server verifies the decryption result. In some embodiments, the verification code is generated by front-end device 310 for authorization purposes. Front-end device 310 can generate the verification code by encrypting the account information and security certificate for the current account (e.g., the account associated with the account information) in accordance with a predetermined encryption algorithm. In the event that the decryption result is successfully verified, front-end device 310 can be permitted access to network(s) 340. In some embodiments, in response to the decryption result being successfully verified, authentication system 320 queries front-end device 310 as to whether front-end device 310 is to (e.g., needs or otherwise desires to) access network(s) 340. In the event that front-end device 310 is to (e.g., needs or otherwise desires to) access network(s) 340, front-end device 310 establishes a network connection with authentication system 320 and issues (e.g., communicates) the login request to authorization server 320.

In some embodiments, the predetermined encryption algorithm used in connection with generating the verification code corresponds to the predetermined decryption algorithm. The predetermined encryption algorithm can be a Data Encryption Standard (DES) encryption algorithm. Other encryption algorithms can be used as the predetermined encryption/decryption algorithm. The present application imposes no particular limits in this regard.

According to various embodiments, front-end device 310 can establish an SSL connection with authorization server 320. Front-end device 310 can encrypt the user-entered account information and the certificate corresponding to the front-end device based at least in part on a preset encryption algorithm (e.g., the predetermined encryption algorithm). For example, front-end device 310 can use a preset encryption algorithm in connection with encrypting the user-entered account information and the certificate corresponding to front-end device 310. Front-end device 310 generates an authorization key (e.g., the verification code) based at least in part on the encrypting of the user-entered account information and the certificate corresponding to front-end device 310. Front-end device 310 communicates the authorization key to authorization server 320. After receiving the authorization key, authentication system 320 can decrypt the authorization key. The authorization key can be decrypted based at least in part on (e.g., by applying) the preset decryption algorithm. The authorization key can be decrypted to obtain the certificate and account information of front-end device 310. Authentication system 320 can determine whether the certificate and account information (e.g., obtained from decrypting the authorization key) have been saved. For example, authentication system 320 can determine whether the certificate and account information obtained from the authorization key matches a certificate and account information stored at authentication system 320 (or at a storage associated with authorization server 320). As an example, authentication system 320 queries locally as to whether the account information and certificate have been saved. If authentication system 320 determines that the certificate and account information obtained from the authorization key matches a certificate and account information stored at authorization server 320, then front-end device 310 is determined to be verified as a legitimate device. In the event that front-end device 310 is determined to be verified as a legitimate device, the network connection (e.g., associated with a login request) may proceed. Accordingly, front-end device 310 can be granted access to network 340.

In some embodiments, a PC device (e.g., a font-end device) sends a request to an application running on a mobile terminal (e.g., the confirmation device). In response to the application running on the mobile terminal confirming the request (e.g., via an input by an end user of the mobile terminal), a token generated by an application running on the mobile terminal is communicated to the PC device. The application that generates the token can be the same application that receives the request from the PC device.

According to various embodiments, the authentication system (e.g., authorization server 320) queries front-end device 310 as to whether front-end device 310 is to (e.g., needs or otherwise desires to) access network 340. Front-end device 310 can reply to the query as to whether front-end device 310 is to (e.g., needs or otherwise desires to) access network 340 with an indication. In some embodiments, the indication can be a login request. In some embodiments, if front-end device 310 is to (e.g., needs or otherwise desires to) access the network, front-end device 310 establishes a remote network connection and communicates a remote login request to the authentication system (e.g., to authorization server 320). The remote network connection between the front-end device 310 and the authentication system may be broken when the network develops an abnormality or pulse detection finds that the front-end device has disconnected.

As an illustrative example, the front-end device is a notebook computer, the authentication system (e.g., authorization server 320) is a target host, and the confirmation device is a mobile phone. Before conducting a remote login through the notebook computer, a remote connection is to be established between the notebook computer and the authentication system. For example, a user can cause the notebook computer to establish the remote connection with the authentication system (e.g., by using an application or the like installed on the notebook computer). The notebook computer may first establish an SSL connection with authorization server 320. The user may cause the notebook computer to generate a notebook computer authorization key. For example, the user can input to the notebook computer the account name "1252" and the password "123456." The notebook computer generates a notebook computer authorization key based at least in part on the account name "1252," the password "123456," and the notebook computer's security certificate. The notebook computer authorization key can be generated in connection with the registration of the notebook computer with the authorization server. The notebook computer authorization key can include user and/or device hardware information. The notebook computer communicates the notebook computer authorization key to authorization server 320. In the event that authentication system 320 receives the notebook computer authorization key, authentication system 320 decrypts the notebook computer authorization key to obtain the account name "1252," the password "123456," and the notebook computer's security certificate. Authentication system 320 queries locally as to whether the same account information (e.g., the account name and the password) and security certificate exist. As an example, in some embodiments, authentication system 320 determines whether the account name, password, and/or the notebook computer's security certificate that are obtained from the notebook computer authorization key match account information and the security certificate that are registered in association with the user (or front-end device 310) or that are otherwise stored by the authentication system. If the same account information and security certificate exist (or if the account information and security certificate match account information and/or the notebook computer's security certificate that are obtained from the notebook computer authorization key), then authentication system 320 determines that the notebook computer is a legitimate device. The authentication system inquires if the network is to (e.g., needs or otherwise desires to) be accessed. For example, authentication system 320 can query the notebook computer as to whether the notebook computer is to (e.g., needs or otherwise desires to) access the network. After the user (or the notebook computer) confirms that the network is to (e.g., needs or otherwise desires to) be accessed, a remote network connection between the notebook computer and the target host can be established. The remote network connection can include communication over an SSL connection and/or certificate.

According to various embodiments, before front-end device 310 establishes a connection with the authentication system, front-end device 310 can carry out authorization and send the authorization verification code to the authorization server 320. The authorization carried out can include front end device sending a request and confirmation device providing a response that comprises a token for identity authentication. In the event that authentication system 320 receives the authorization verification code, authentication system 320 decrypts the authorization verification code and verifies (e.g., authenticates) information obtained via decryption of the authorization verification code. After successful verification, a remote network connection can be established between the confirmation device and the network. For example, a remote network connection can be established between the confirmation device and the network if the authentication system (e.g., authorization server 320) queries the confirmation device if the confirmation device is accessing (or desires to access) the network, and the confirmation device provides an indication that it is accessing (or desires to access the network).

According to various embodiments, it is possible to authorize front-end device 310 by encrypting the certificate and the account information and thus to achieve the results of more secure protection for user access, less likelihood of forgery attacks, and effective control of device access to/disconnection from the network. For example, the front end device can communicate over an SSL connection that be used in connection with a certificate.

According to various embodiments, authentication system 320 is further configured to receive a registration request and/or to communicate a security certificate to a terminal. For example, authentication system 320 receives a registration request from a terminal such as front-end device 310 (also referred to herein as a front-end device registration request). Authentication system 320 can generate a security certificate associated with a registration request. For example, in connection with registering a terminal associated with a registration request, Authentication system 320 can generate a security certificate corresponding to the registration request. In some embodiments, authentication system 320 can request the authentication system to generate the security certificate (e.g., the security certificate can be generated by another server or terminal in the authentication system). Authentication system 320 can send the security certificate back to the terminal associated with the registration request. For example, in connection with registering front-end device 310, authentication system 320 provides front-end device 310 with the corresponding security certificate.

In some embodiments, a registration request comprises account information communicated by front-end device 310. As an example, the registration request can include user-entered remote login account information.

According to various embodiments, in the event that front-end device 310 first undergoes authorization, front-end device 310 is to (e.g., needs or otherwise desires to) register with authorization server 320. In connection with registering front-end device 310 (with an authentication system), front-end device 310 sends account information to authorization server 320. The account information communicated by front-end device 310 can correspond to user-entered account information. In some embodiments, front-end device 310 sends a request for registering front-end device 310. The account information communicated by front-end device 310 can be communicated in connection with (e.g., contemporaneously with) the request for registering front-end device 310. In the event that authentication system 320 receives the account information, authentication system 320 generates a security certificate. For example, authentication system 320 uses the account information as a basis for generating the security certificate for the corresponding front-end device 310. The security certificate is saved in association with corresponding account information. As an example, authentication system 320 saves the account information and the corresponding security certificate locally in the authentication system (e.g., locally in authorization system 320). The security certificate can be stored in a database storing mappings of security certificates to account information (e.g., for lookup in connection with an authentication of a terminal). The security certificate is provided to front-end device 310. For example, authentication system 320 sends the generated security certificate back to front-end device 310 so that the front-end device undergoes re-authorization and thus can safely access the network.

According to various embodiments, authentication system 320 generates security certificates based on account information and thus the goal of certificate-based authorization of corresponding front-end devices is achieved.

In some embodiments, authorization server 350 performs one or more functions of the authentication system 320. For example, the authorization server can receive the verification sent from front-end device 310, decrypt the verification code, and verify the decryption code.

Various embodiments include a method for identity authentication. Please note that the steps depicted in the flowcharts in the drawings can be executed in a computer system, such as a group of computers capable of executing commands. Moreover, although logical sequences are depicted in the flowcharts, the steps that are depicted or described may, in some situations, be executed in sequences other than those herein.

Figure 4:
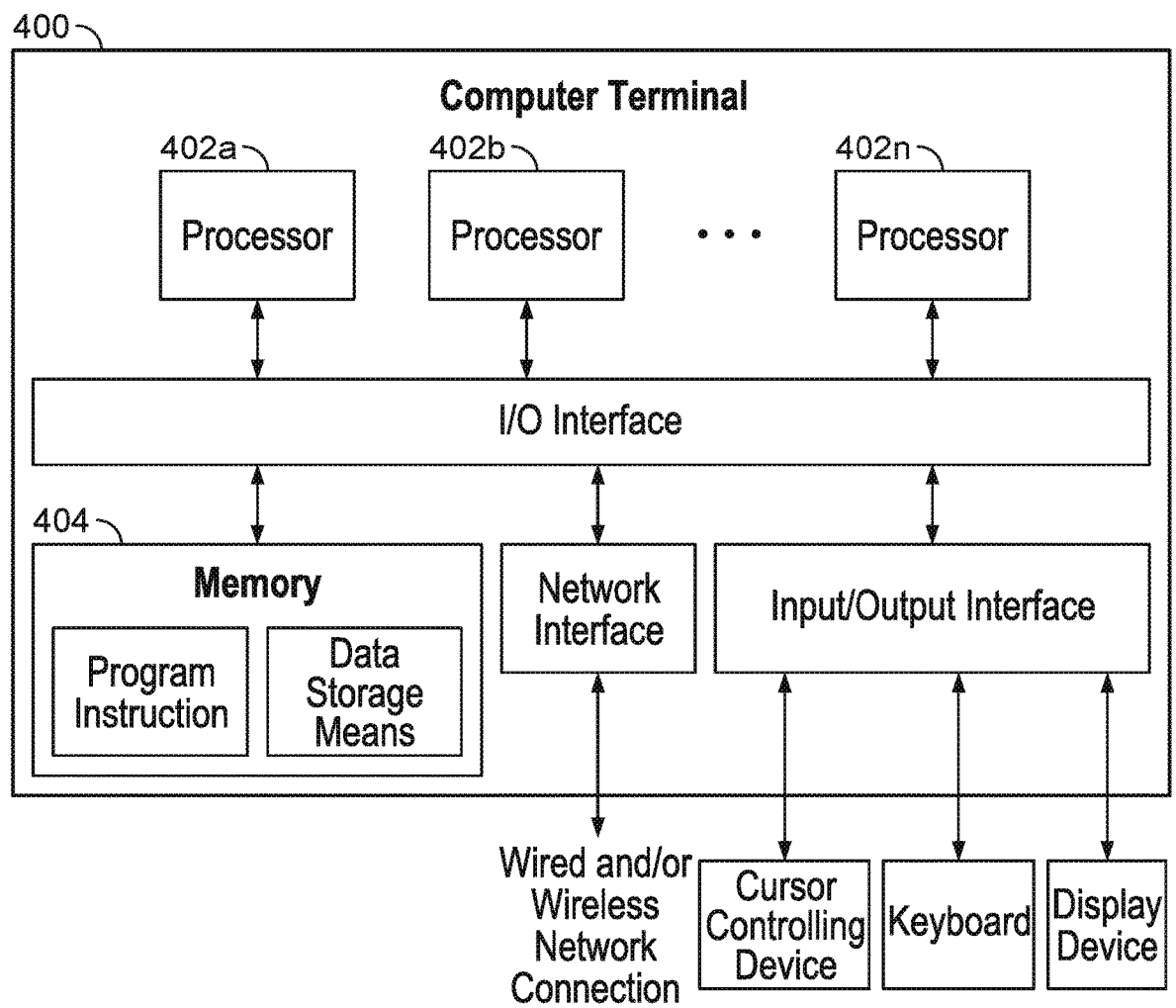
FIG. 4 is a structural block diagram of a terminal for implementing an identity authentication according to various embodiments of the present application.

FIG. 4 is a structural block diagram of a terminal for implementing an identity authentication according to various embodiments of the present application.

Referring to FIG. 4, terminal 400 for identity authentication is provided. Terminal 400 can be implemented in connection with system 100 of FIG. 1, and/or system 300 of FIG. 3. Terminal 400 can implement front-end device 310 of system 300 of FIG. 3, confirmation device 330 of system 300 of FIG. 3, an authentication system 320 of system 300 of FIG. 3.

Terminal 400 comprises one or more processors 402 (e.g., illustrated as 402a, 402b, . . . 402n), an I/O interface, memory 404, a network interface, and an input/output interface. Memory 404 can comprise a storage medium and can store program instructions. The network interface can be configured for wire and/or wireless communication (e.g., according to TCP/IP protocols, Wi-Fi connections, Bluetooth connections, etc.).

As illustrated in FIG. 4, terminal 400 comprises one or more processors 402 (e.g., illustrated as 402a, 402b, . . . 402n), memory 404, and a transmitting device for communication. Terminal 400 can comprise an I/O interface, a network interface, and an input/output interface. Memory 404 can comprise a storage medium and can store program instructions. The network interface can be configured for wire and/or wireless communication (e.g., according to TCP/IP protocols, Wi-Fi connections, Bluetooth connections, etc.).

One or more processors 402 (e.g., illustrated as 402a, 402b, . . . 402n) can include but are not limited to processing devices such as microprocessors (MCUs) or programmable logic devices (FPGAs).

Terminal 400 can further comprise: a display device, input/output interfaces (I/O interfaces), a universal serial bus (USB) port (may be included as one port among ports serving as I/O interfaces), a network interface, a power supply, and/or a camera.

One or more processors 402 (e.g., illustrated as 402a, 402b, . . . 402n) and/or other data processing circuits may generally be referred to as "data processing circuits" herein. The data processing circuits can fully or partially be embodied as software, hardware, firmware, or any combination. In addition, a data processing circuit can be a single, independent processing module or any of the other components that are fully or partially integrated with the terminal 400. For example, with regard to those touched upon in embodiments of the present application, this data processing circuit controls as a processor (e.g., selects the interface-connected variable resistance terminal path).

Memory 404 may be used to store software programs and modules of the application software (e.g., program instructions/modules corresponding to a method for identity authentication). By running software programs and modules stored in memory 404, one or more processors 402 (e.g., illustrated as 402a, 402b, . . . 402n) execute various function applications and data processing (e.g., implement a method identity authentication according to various embodiments further described herein). Memory 404 may comprise high-speed random access memory. Memory 404 may further comprise non-volatile memory, such as one or more magnetic storage devices, flash memory, or other non-volatile solid-state memory. In some embodiments, memory 404 may further comprise memory that is remotely disposed relative to one or more processors 402 (e.g., illustrated as 402a, 402b, . . . 402n). Such remote memory may be connected to the terminal 400 via a network. Examples of the aforesaid network comprise but are not limited to the Internet, corporate intranets, local area networks, mobile communication networks, and combinations thereof.

The transmitting device is configured to receive and/or send data via a network. Specific examples of the network can comprise wireless networks provided by communication suppliers for the terminal 400. In various embodiments, the transmitting device comprises a network interface controller (NIC), which can connect to other networks via a base station and thereby communicate with the Internet. As an example, the transmitting device may be a radio frequency (RF) module, which is for communicating with the Internet wirelessly.

The display device can, for example, be a touch-screen such as a touch-screen liquid crystal display (LCD). This liquid crystal display can enable the user to interact with the user interface of the computer terminal 400 (or mobile device).

Figure 5:
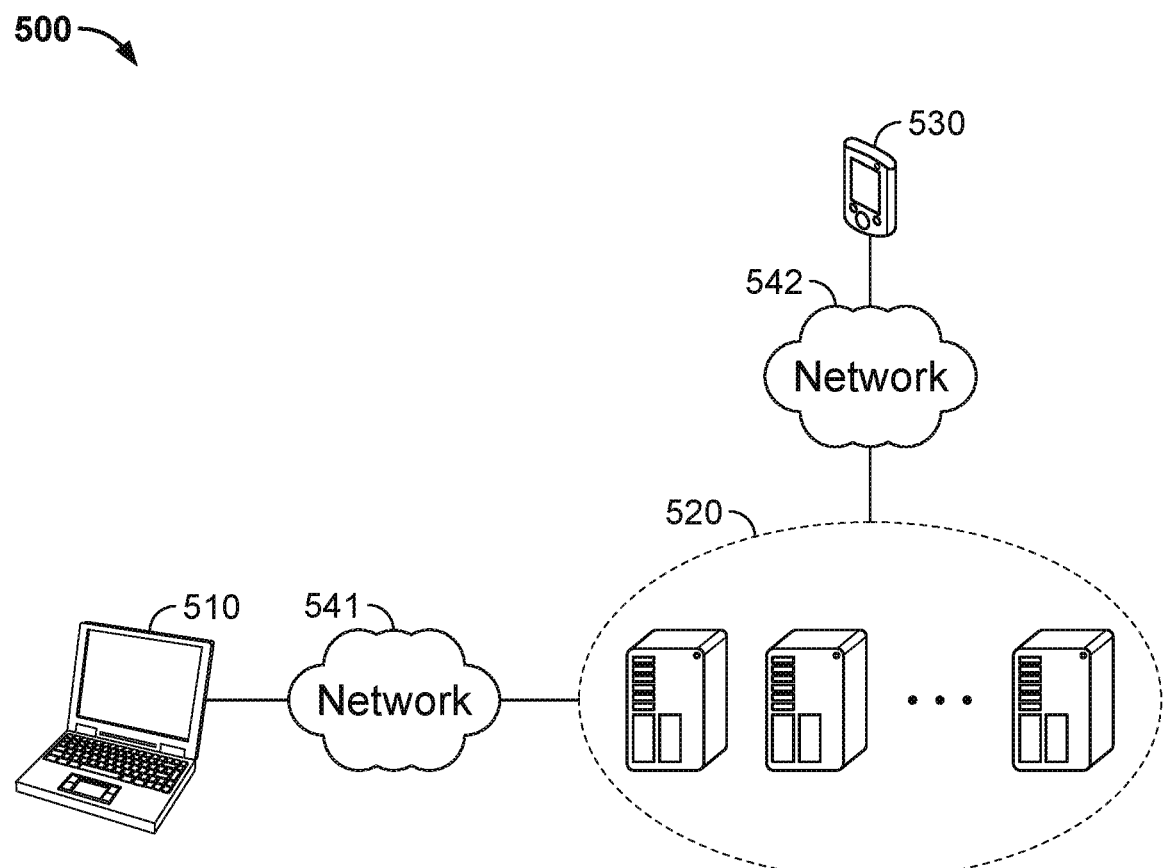
FIG. 5 is a structural block diagram of a terminal serving as a receiving terminal according to various embodiments of the present application.

FIG. 5 is a structural block diagram of a terminal serving as a receiving terminal according to various embodiments of the present application.

Referring to FIG. 5, system 500 for identity authentication is provided. System 500 can be implemented in connection with system 100 of FIG. 1, data exchange 200 of FIG. 2, system 300 of FIG. 3, and/or terminal 400 of FIG. 4.

As illustrated in FIG. 5, system 500 comprises terminal 510 (e.g., a front-end device), one or more servers 520 (e.g., authentication server), and terminal 530 (e.g., confirmation device). System 500 can further comprise one or more networks 541 and 542 over which terminal 510 (e.g., a PC terminal), one or more servers 520, and/or terminal 530 (e.g., a mobile terminal) communicates.

In some embodiments, terminal 510 corresponds to front-end device 110 of system 100 of FIG. 1 and/or front-end device 310 of system 300 of FIG. 3.

In some embodiments, one or more servers 520 correspond to authentication system 120 of system 100 of FIG. 1 and/or authentication system 320 of system 300 of FIG. 3.

In some embodiments, terminal 530 corresponds to confirmation device 130 of system 100 of FIG. 1 and/or confirmation device 330 of system 300 of FIG. 3.

As shown in FIG. 5, one or more servers 520 (e.g., an authentication system) can connect through a data network (e.g., one or more networks 541 and/or 542) or electronically connect to one or more front-end devices 510. One or more servers 520 (e.g., an authentication system) can connect through a data network or electronically connect to one or more confirmation devices 530. The data network connection can be a local area network connection, a wide area network connection, an Internet connection, or other type of data network connection. One or more servers 520 (e.g., an authentication system) can execute network services executed by one server (e.g., a security server) or a group of servers. The network services are network-based user services, such as social networking networks, cloud resources, e-mail, online payments, or other online applications.

Figure 6:
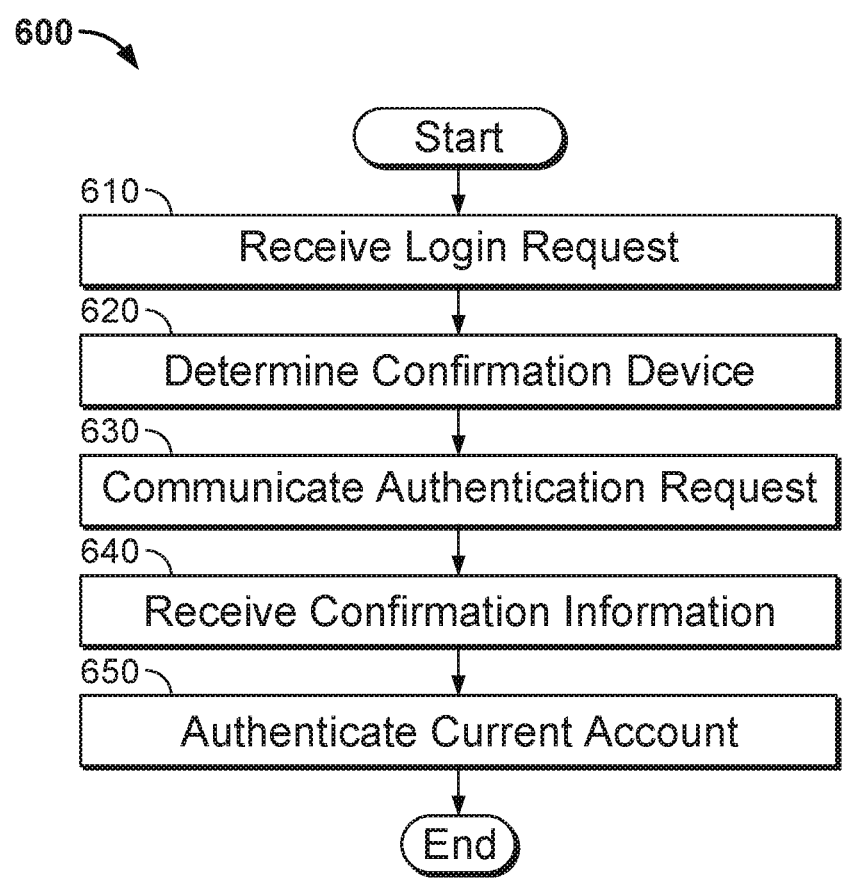
FIG. 6 is a flowchart of a method for identity authentication according to various embodiments of the present application.

FIG. 6 is a flowchart of a method for identity authentication according to various embodiments of the present application.

Referring to FIG. 6, a method 600 for identity authentication is provided. Method 600 can at least be partially implemented in connection with system 100 of FIG. 1, data exchange 200 of FIG. 2, system 300 of FIG. 3, terminal 400 of FIG. 4, and/or system 500 of FIG. 5. For example, system 100, system 300, terminal 400, and/or system 500 can implement at least a part of method 600.

At 610, a login request is received. In some embodiments, an authentication system receives the login request. The authentication system can comprise one or more servers. The login request can be communicated to the authentication system by a front-end device (e.g., front-end device 110). The login request can be communicated to the authentication system via a network. In some embodiments, the login request comprises account information. For example, the account information included in the login request can correspond to the account information of the current account for use of the front-end device. The account information included in the login request can correspond to an account associated with a user of the front-end device. In some embodiments, the account information is communicated to the authentication system in connection with the login request. For example, the account information can be communicated separately (but contemporaneously) with the login request.

In some embodiments, the authentication system corresponds to a target host logged on to remotely by a user (e.g., using a front-end device). The authentication system can be a domain to which the front-end device seeks access or otherwise is associated with such domain to which the front-end device seeks access. In some embodiments, the target host authenticates the identity of the user or authenticates the front-end device. The front-end device could be a terminal such as a client. For example, the front-end device could be computer equipment (including a PC or a notebook computer) used by a user or a mobile terminal device (such as a smartphone, a tablet, or an iPad).

According to various embodiments, the login request corresponds to a remote login request. The remote login request can be a request by a user to remotely log on to an authentication system through a front-end device. The user or front-end device can undergo identity authentication in connection with the remote login request. Account information included in the login request can correspond to account information for a remote login carried out by a user. For example, account information included in the login request can include one or more of the account name (e.g., corresponding to the user or to the front-end device) and a password for a remote login. The account name and corresponding password can be registered with the authentication in advance (e.g., in connection with registration of the user or front-end device). In some embodiments, the login request can include a certificate, token, key, or the like.

As an illustrative example, the authentication system is a target host, the front-end device is a notebook computer, and the confirmation device is a mobile phone. When User A uses a notebook computer to conduct a remote login, the user can input the account name "1252" and the password "123456" for the remote login account. The notebook computer sends the account name "1252" and the password "123456" (e.g., that were input by the user) through the network to the target host. The target host receives the account information including the account name "1252" and the password "123456" for using the notebook computer.

At 620, a confirmation device is determined. In some embodiments, the confirmation device is determined based at least in part on the account information included in the login request (or otherwise communicated in connection with the login request). For example, the account information included in the login request can be extracted. The confirmation device can be determined based at least in part on a stored mapping of confirmation devices and account information (e.g., an account identifier such as an account name or user name). According to various embodiments, the authentication system determines the confirmation device. For example, the authentication system uses the account information as a basis for determining a confirmation device associated with the front-end device (or associated with the user of the front-end device).

The confirmation device could be a hand-held device bound by the user (e.g., specified by the user as being associated with the user) in advance. Examples of the confirmation device include smartphones, tablets, iPads, and other such devices that can serve as a terminal for identity authentication. Confirmation devices can be associated with a user or a front-end device (or both) based at least on a mapping to account information. For example, using account information, the user can associate the currently used front-end device with a confirmation device. The authentication system saves account information in relation to the corresponding confirmation device.

In some embodiments, in the event that a user is to (e.g., needs or otherwise desires to) remotely log in (e.g., to authentication system), the user can input account information. The account information can be input to the front-end device. In some embodiments, the user causes the front-end device to obtain (e.g., from local storage) the account information in connection with a login request. The front-end device communicates the account information via the network to the authentication system. The account information communicated to the authentication system can be used for authentication. The authentication server can determine whether the account information included in the login request (or otherwise communicated to the authentication server in connection with the login request) matches account information stored at the authentication system. The authentication system can use the account information received in connection with the remote login to determine whether information for a corresponding account is stored. For example, the authentication system queries a local database as to whether the database has the account information. If the authentication system fails to find the account information, the authentication system determines that the account is a non-legitimate account. For example, in the event that the authentication system is unable to identify information for an account corresponding to the received account information, the authentication system can deem authentication of the account information (or the user or front-end device) to have failed. If the authentication system finds the account information, the authentication system determines the confirmation device associated with the account information.

As an illustrative example, the authentication system is a target host, the front-end device is a notebook computer, and the confirmation device is a mobile phone. After receiving the account information "1252" and "123456," the target host locally looks up the mobile phone associated with the account information (e.g., account name and/or password). The target host finds that Mobile Phone A corresponds to the confirmation device (e.g., Mobile Phone A matches the account information).

At 630, an authentication request is communicated. The authentication can be communicated to the confirmation device. For example, the authentication system sends an authentication request to the confirmation device. The confirmation device can provide an indication that the confirmation device received an authentication request. For example, the confirmation device can display the indication on a display device thereof. In some embodiments, the confirmation device can prompt a user thereof based at least in part on the authentication device. In some embodiments, the authentication request comprises the account information. In some embodiments, the account information is communicated to the confirmation device (e.g., by the authentication system) in connection with the authentication request. For example, the account information can be communicated separately (but contemporaneously) with the authentication request.

According to various embodiments, in the event that the account information is looked up and the confirmation device associated with the account information is determined, the authentication system sends the account information via the network to the confirmation device. In response to receiving the account information (e.g., from the authentication system), the confirmation device displays the account information on the display screen. The user can manually confirm the account information received by the confirmation device. For example, the user can input to the confirmation device an indication of confirmation of the account information. The user can input to the confirmation device that the account information is not confirmed (e.g., deny authentication of the account information or of the login request).

As an illustrative example, the authentication system is a target host, the front-end device is a notebook computer, and the confirmation device is a mobile phone. After receiving the account information "1252" and "123456," the target host locally looks up the mobile phone associated with the account information (e.g., account name and/or password). In the event that the target host finds Mobile Phone A as being associated with the account information, the target host sends an authentication request to Mobile Phone A. Display of the authentication request or an indication of the authentication request can include "Account '1252' requests remote login; permitted?" The authentication request or the indication of the authentication request can be displayed on the display screen along with a permission button and a rejection button. The user holding Mobile Phone A can view the authentication request. The confirmation device can receive an input from the user indicating whether the account information (or the login request) is confirmed. In some embodiments, the confirmation device can automatically confirm the login request. For example, the login request can be automatically confirmed based on a context of the login request satisfying one or more predefined criteria (e.g., location of the front-end device, a proximity of the front-end device to the confirmation device, etc.).

At 640, confirmation information is received. In some embodiments, the authentication system receives the confirmation information. The confirmation information can be communicated to the authentication system from the confirmation device. For example, the confirmation device can communicate the confirmation information in response to determining whether the account information (or the login request) is confirmed. The confirmation device can determine whether the account information (or the login request) is confirmed based on input from the user (e.g., indicating whether the account information or the login request is confirmed). The confirmation device can send the confirmation information to the authentication system via a network.

At 650, the current account (or login request) is authenticated. In some embodiments, the current account (or login request) is authenticated based at least in part on the confirmation information. The authentication can determine whether the current account (or login request) is authenticated based on the confirmation information.

According to various embodiments, the confirmation device communicates an indication whether the login request (or an account associated therewith) received by the authentication system is authenticated. The authentication request communicated by the authentication system to the confirmation device is associated with a login request received by the authentication system. The indication of whether the login request received by the authentication system is authenticated can be included in the confirmation information that is communicated by the confirmation device to the authentication system.

In some embodiments, the confirmation device only communicates the confirmation information to the authentication system in the event that the account information (or the login request) is confirmed. The absence of a response to the authentication (e.g., within a predefined period of time) can be deemed a determination that the account information (or the login request) is not confirmed.

In some embodiments, by receiving the confirmation information sent back by the confirmation device, the authentication system determines that the current account is a legitimate account. For example, the confirmation information can be information generated by the confirmation device after receiving a confirmation instruction (e.g., an indication from the user that the account information or the login request is confirmed).

According to various embodiments, the confirmation device can generate the confirmation information in connection with one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, if the user (e.g., of the confirmation device) determines that the account information sent by the authentication system corresponds to account information input by the user himself or herself (e.g., via front-end device), the user can generate confirmation information by clicking a confirmation button displayed on the confirmation device or by swiping the display screen of the confirmation device. The confirmation device communicates the confirmation information back to the authentication system. The authentication system determines whether the account is a legitimate account (or whether the login request is authenticated or otherwise authorized) based on the confirmation information (e.g., communicated by the confirmation device). In the event that the account is deemed to be a legitimate account (or that the login request is authenticated or otherwise authorized), remote login may be carried out. In some embodiments, absence of receipt of confirmation information (e.g., associated with a corresponding authentication request) is deemed to indicate that the account is a non-legitimate account (or that the login request is not authenticated or not otherwise authorized). For example, if the authentication system has not received confirmation information sent back by the confirmation device, then the authentication system determines that the account is a non-legitimate account. In the event that the account is determined to be a non-legitimate account (or that the login request is not authenticated or not otherwise authorized), remote login cannot be carried out. For example, the authentication system can deny a login request in the event that the corresponding account is determined to be a non-legitimate account (or that the login request is not authenticated or not otherwise authorized).

In some embodiments, if the user (e.g., of the confirmation device) confirms that it has not entered the account information (or otherwise submitted a login request), or if the account information sent by the authentication system is not account information entered by the user, then the user can provide an indication to the confirmation device that the account information or corresponding login request is not authenticated. For example, the user can generate denial information by clicking a deny button displayed on the confirmation device. In response to receiving the denial information from the user (or otherwise being generated in connection with an authentication request), the confirmation device communicates the denial information to the authentication system. The denial information can be included in confirmation information communicated to the authentication system. For example, the denial information can correspond to an indication that the account information or corresponding login request is not authenticated. The authentication system determines that the account is a non-legitimate account (or that the account information or corresponding login request is not authenticated) based at least in part on the denial information. In the event that the authentication system determines that the account is a non-legitimate account (or that the account information or corresponding login request is not authenticated), remote login cannot be carried out. For example, the authentication system can deny the corresponding login request in response to determining that the account is a non-legitimate account (or that the account information or corresponding login request is not authenticated). The authentication system can communicate an indication of the denial of the corresponding login request to the front-end device.

As an illustrative example, the authentication system is a target host, the front-end device is a notebook computer, and the confirmation device is a mobile phone. The confirmation device (e.g., corresponding to account information associated with a login request) can be Mobile Phone A. After receiving an authentication request (e.g., from the target host), Mobile Phone A can display the authentication request or information associated therewith. For example, Mobile Phone A can display "Account '1252' requests remote login; permitted?" on the display screen along with a permission button and a rejection button. The user holding Token Phone A can view the authentication request. If the user permits account "1252" to conduct the remote login, then the user can generate (via Mobile Phone A) confirmation information by clicking the permission button. Mobile Phone A communicates the confirmation information back to the target host. The target host determines that account "1252" is a legitimate account (or that the corresponding login request is authenticated) based on the confirmation information communicated by Mobile Phone A. In the event that the authentication system determines that account "1252" is a legitimate account, the target host permits the account to conduct the remote login, and establishes a remote login connection with the notebook computer In some embodiments, the front-end device refers to the device currently in need of identity authentication, the authentication system refers to the device that performs the first identity authentication of the front-end device, and the confirmation device is the device that performs the second identity authentication of the front-end device, thereby achieving two-factor authentication of the front-end device and making identity authentication more secure.

According to various embodiments, the authentication system receives a login request issued by the front-end device; the authentication system uses account information (e.g., associated with the login request) as a basis for determining the confirmation device associated with the front-end device; the authentication system communicates an authentication request to the confirmation device; the authentication system receives confirmation information from the confirmation device, in the event that the authentication system receives the confirmation information communicated by the confirmation device in response to the authentication request, the authentication system determines that the current account is a legitimate account (or that the login request is authenticated); and in the event that the authentication system determines that the current account is a legitimate account (or that the login request is authenticated), the authentication system implements identity authentication for the remote login.

Because the login request sent by the front-end device comprises account information for the current account for use of the front-end device, the authentication system can look up the confirmation device with the account information and communicate the account information to the confirmation device (e.g., in connection with an authentication request). The authentication system can look up the confirmation device in a local storage (e.g., database) or a remote storage. The user can complete the identity authentication by performing a manual operation (e.g., on the confirmation device) to confirm the account information or corresponding login request. The use of the user completing the identity authentication (e.g., on the confirmation device) avoids password leaks or the security risks involved in other parties falsely presenting themselves. Moreover, the user does not need to input a password during the identity authentication process, but only to perform a simple confirmation operation. Therefore, various embodiments achieve the effects of enhancing user login experience, reducing user login time costs, and effectively preventing user misrepresentation.

Various embodiments address the technical problem in the related art of identity authentication methods involving both high security risks and poor user experience.

Figure 7:
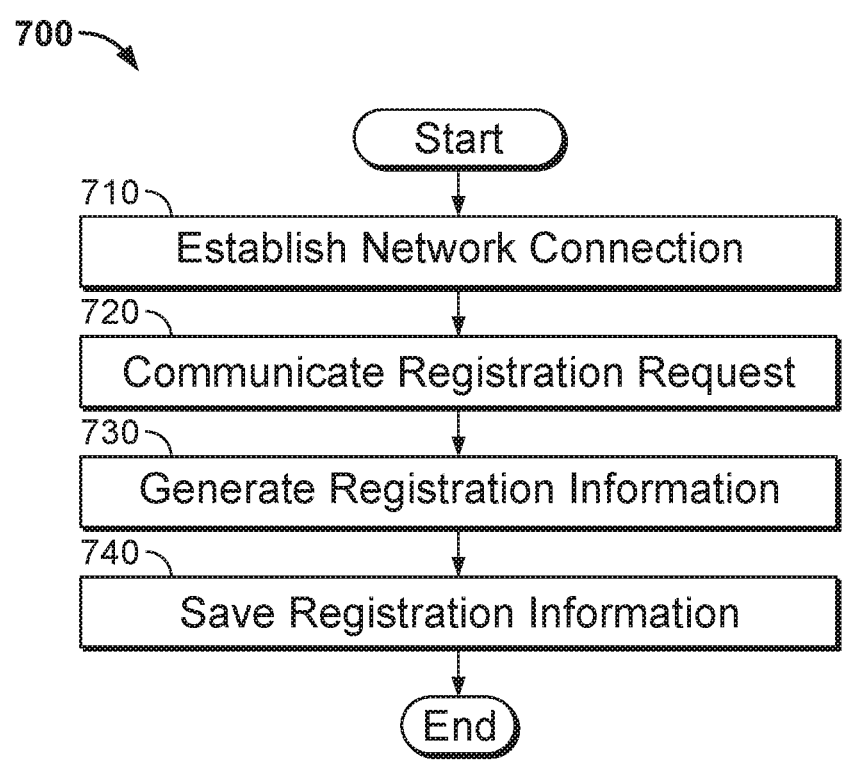
FIG. 7 is a flowchart of a method for identity authentication according to various embodiments of the present application.

FIG. 7 is a flowchart of a method for identity authentication according to various embodiments of the present application.

Referring to FIG. 7, a method 700 for identity authentication is provided. Method 700 can at least be partially implemented in connection with system 100 of FIG. 1, data exchange 200 of FIG. 2, system 300 of FIG. 3, terminal 400 of FIG. 4, system 500 of FIG. 5, and/or method 600 of FIG. 6. For example, system 100, system 300, terminal 400, and/or system 500 can implement at least a part of method 700. According to various embodiments, method 700 can be implemented before 610 of method 600 of FIG. 6.

According to various embodiments, method 700 is implemented in connection with registering the front-end device and/or the confirmation device. Method 700 can be implemented in connection with creating a mapping between a terminal (e.g., a front-end device and/or the confirmation device) and account information associated with a user or the corresponding terminal.

At 710, a network connection is established. According to various embodiments, the authentication system establishes network connections to a front end-device or a confirmation device. For example, a network connection can be separately established between the authentication system and at least one front-end device and at least one confirmation device.

At 720, a registration request is communicated. According to various embodiments, the authentication system receives a registration request from a front-end device and/or a confirmation device. For example, the authentication system can receive a first registration request sent from any front-end device and/or a second registration request sent from any confirmation device. The first registration request can comprise account information such as the first account information used by any one front-end device. As an example, the account information that is included in the first registration request can include account information used in connection with a first (e.g., an initial) login to the authentication system. In some embodiments, the account information is not included in the first registration request; rather, the account information can be communicated in connection with (e.g., contemporaneously with) the first registration request. The second registration request can comprise account information. For example, the account information included in the second registration request can include account information used by a confirmation device in connection with a login to the authentication system. As an example, the account information that is included in the first registration request can include account information used by any one confirmation device in connection with a first (e.g., an initial) login to the authentication system. In some embodiments, the account information is not included in the first registration request; rather, the account information can be communicated in connection with (e.g., contemporaneously with) the second registration request.

According to various embodiments, the authentication system can establish remote network connections with multiple, remotely logged-in, front-end devices and with one or more confirmation devices associated with the multiple front-end devices. When each user remotely logs in for the first time, the remote login account information can be sent through the front-end device to the authentication system for registration, and the account information can be sent through the confirmation device to the authentication system for registration.

As an illustrative example, the authentication system is a target host, the front-end device is a notebook computer, and the confirmation device is a mobile phone. In the event that User A first uses Notebook Computer A to log in remotely, User A can enter the remote login account name "1252" and the password "123456" into both Notebook Computer A and Mobile Phone A. Notebook Computer A and the Mobile Phone A each communicate the user-entered account name "1252" and password "123456" through the network to the target host. In the event that User B first uses Notebook Computer B to log in remotely, User B can enter the remote login account name "1253" and the password "456123" into both Notebook Computer B and Mobile Phone B. Notebook Computer B and Mobile Phone B each communicate the user-entered account name "1253" and password "456123" through the network to the target host.

At 730, registration information can be generated. According to various embodiments, the authentication system generates registration information based on a corresponding registration request (e.g., received from a front-end device or a confirmation device). Generation of the registration information can include extracting account information included in (or communicated in connection with) a registration request. As an example, the authentication system generates first registration information according to the first registration request and/or generates second registration information according to the second registration request. Registration information can comprise account information and a certificate. The certificate can be associated with the account information. As an example, the first registration information comprises the first account information and a certificate associated with the first account information, and the second registration information at least comprises the second account information. The certificate associated with the first account information (that can be included in the first registration information) can correspond to a token such as an encrypted key, a password, or the like.

In some embodiments, the first registration information is used in the trusted certificate information that is used for launching the next login (e.g., to the authentication system). The second registration information may further include a certificate associated with the second account information and identification information for the confirmation device. The confirmation device can be verified according to the certificate. According to various embodiments, before the confirmation device carries out identity authentication, the confirmation device is verified according to the certificate. If the verification fails, that indicates that the confirmation device is a non-legitimate device. The authentication system will not send the user-entered information or the certificate to this confirmation device (e.g., the authentication system will validate the certificate(s)). According to various embodiments, in the event that the confirmation device is not verified, information communicated by a front-end device to the authentication system is not communicated (e.g., by the authentication system) to the confirmation device. In some embodiments, in the event that the confirmation device is verified, information communicated by a front-end device (corresponding to the confirmation device) to the authentication system is communicated (e.g., by the authentication system) to the confirmation device.

At 740, registration information is stored. In some embodiments, the authentication system stores the registration information. The authentication system can store the registration information locally or on a remote storage. As an example, the authentication system saves the first registration information and the second registration information.

In some embodiments, after receiving the first account information communicated by the front-end device, the authentication system can generate the corresponding certificate according to the first account information and save the first account information and the corresponding certificate locally in the authentication system. Similarly, after receiving the second account information communicated by the confirmation device, the authentication system can save the confirmation device identification information and the second account information locally in the authentication system.

In some embodiments, after receiving the first account information sent by the front-end device, the authentication system can generate the corresponding certificate according to the first account information and save the first account information and the corresponding certificate locally in the authentication system. Similarly, after receiving the second account information sent by the confirmation device, the authentication system can generate the corresponding certificate according to the second account information and save the confirmation device identification information, the second account information, and the corresponding certificate locally in the authentication system.

As an illustrative example, the authentication system is a target host, the front-end device is a notebook computer, and the confirmation device is a mobile phone. After receiving the account name "1252" and the password "123456" sent by Notebook Computer A, the target host can generate Certificate A for Notebook Computer A and save the account name "1252," the password "123456," and Certificate A locally in a database. The account name, password, and/or Certificate A can be stored in association with the Notebook Computer A and/or a user associated with the Notebook Computer A. The target host can generate the Certificate A in response to receiving the account name and password communicated by Notebook Computer A. After receiving the account name "1252" and the password "123456" sent by Mobile Phone A, the target host can save Mobile Phone A's identification information, the account name "1252," and the password "123456" locally in a database. After receiving the account name "1253" and the password "456123" sent by Notebook Computer B, the target host can generate Certificate B for Notebook Computer B and save the account name "1253," the password "456123," and Certificate B locally in a database. The account name, password, and/or Certificate B can be stored in association with the Notebook Computer B and/or a user associated with the Notebook Computer B. The target host can generate the Certificate CB in response to receiving the account name and password communicated by Notebook Computer B. After receiving the account name "1253" and the password "456123" sent by Mobile Phone B, the target host can save Mobile Phone B's identification information, the account name "1253," and the password "456123" locally in a database. In some embodiments, the target host saves the account names, passwords, certificates, device identification information, the like, or any combination thereof remotely in a data store.

In some embodiments, if the first account information and the second account information are determined to match (e.g., be the same), the front-end device that uses the first account information for registration and the confirmation device that uses the second account information for registration in the authentication system are deemed to be inter-related devices. For example, the authentication system can determine that the first account information associated with the front-end device matches the second account information associated with the confirmation device, and can deem the confirmation device as being associated with the front-end device (e.g., the confirmation device can be deemed to correspond to an account associated with the front-end device).

In some embodiments, in the event that a user binds its own (e.g., associates or otherwise registers in association) confirmation device to a front-end device, the user can communicate remote login account information through the front-end device to the authentication system for registration, and by having the confirmation device communicate the same remote login account information to the authentication system for registration, the authentication system confirms that the confirmation device and the front-end device are inter-related. For example, the user can operate the front-end device and the confirmation device to each communicate remote login account information, and if the remote login account information communicated by the front-end device and the confirmation device are determined to match, the authentication system can deem the front-end device and the confirmation device to be associated. In response to determining that the front-end device and the confirmation device are associated, the authentication system can store a mapping of the front-end device to the confirmation device.

As an illustrative example, the authentication system is a target host, the front-end device is a notebook computer, and the confirmation device is a mobile phone. The target host can use stored account names and passwords as a basis for determining that Notebook Computer A and Mobile Phone A are inter-related devices and that Notebook Computer B and Mobile Phone B are inter-related devices. For example, the target host can determine whether the account names and/or passwords associated with Notebook Computer A and the account names and/or passwords associated with Mobile Phone A match (e.g., are the same) in connection with determining whether Notebook Computer A and Mobile Phone A are inter-related devices. Similarly, the target host can determine whether the account names and/or passwords associated with Notebook Computer B and the account names and/or passwords associated with Mobile Phone B match (e.g., are the same) in connection with determining whether Notebook Computer B and Mobile Phone B are inter-related devices.

According to various embodiments, during an initial remote login to the authentication system, the authentication system can use the received account information as a basis for generating the registration information needed for identity verification and confirming the association between the front-end device and the confirmation device. In this way, the authentication system achieves the goal of performing identity authentication based on received account information in connection with a subsequent remote login to the authentication system.

Figure 8A:
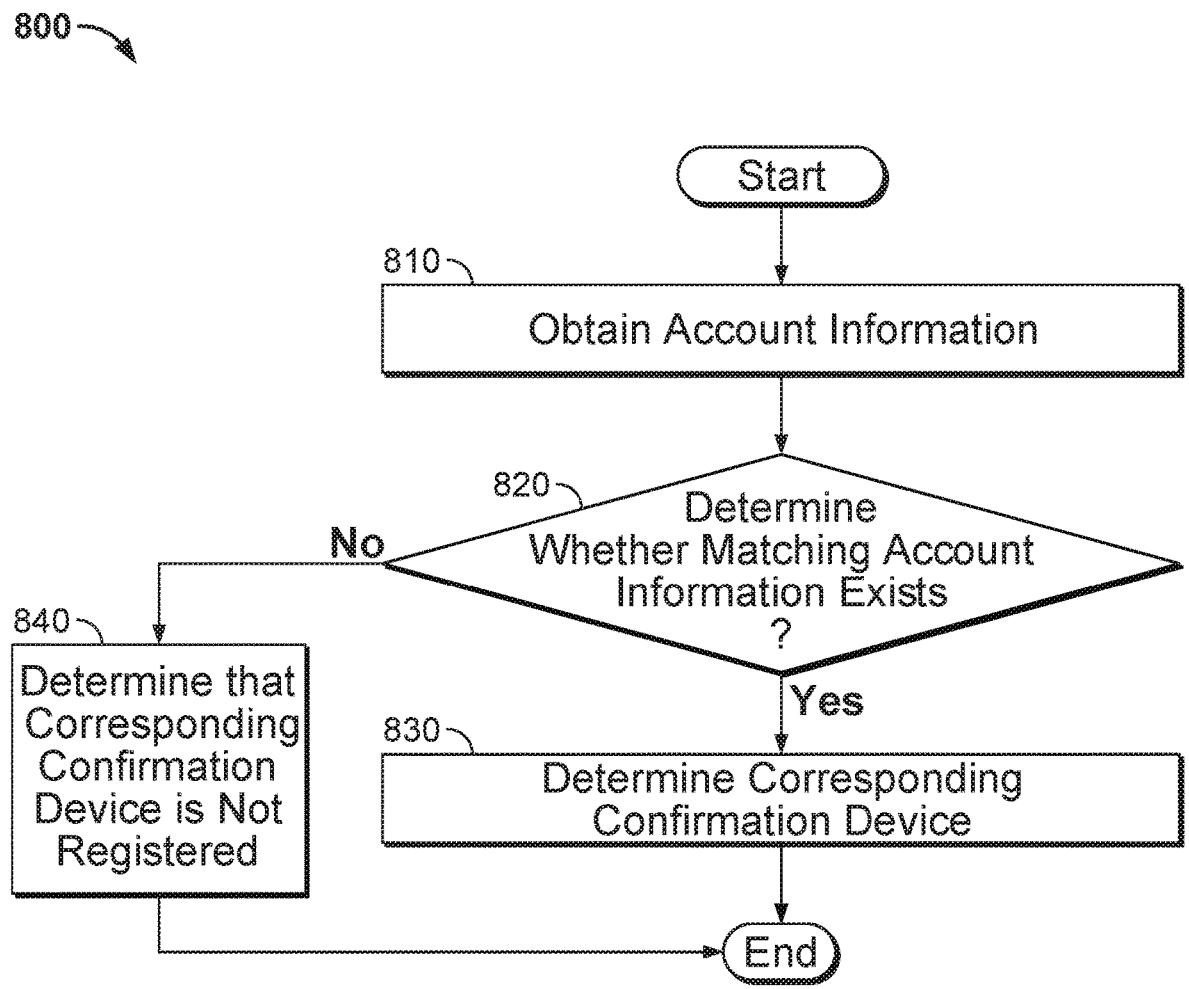
FIG. 8A is a flowchart of a method for identity authentication according to various embodiments of the present application.

FIG. 8A is a flowchart of a method for identity authentication according to various embodiments of the present application Referring to FIG. 8A, a method 800 for identity authentication is provided. Method 800 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, and/or method 700 of FIG. 7. For example, system 100, system 300, terminal 400, and/or system 500 can implement at least a part of method 800. According to various embodiments, method 800 can be implemented in connection with 620 of method 600 of FIG. 6. For example, 620 of method 600 of FIG. 6 can comprise method 800.

According to various embodiments, method 800 is implemented in connection with determining a confirmation device (e.g., corresponding to a front-end device or to an account). Method 800 can be implemented in connection with a login request.

At 810, account information is obtained. In some embodiments, the authentication system obtains the account information associated with the login request (e.g., received from the front-end device). For example, the account information can obtain the account information by extracting the account information from the login request.

At 820, it is determined whether matching account information exists. For example, the authentication system can determine whether account information associated with the login request matches any account information that has previously been registered. In some embodiments, the authentication system can determine whether a database storing mappings of accounts (or front-end devices) to confirmation devices stores a record comprising the account information associated with the login request, and whether such record comprises a corresponding confirmation device. The authentication system can query a database storing account information (e.g., a database storing mappings of first account information to second account information) whether there exists first account information and second account information that matches the account information associated with the login request.

In the event that it is determined that matching account information exists at 820, then method 800 proceeds to 830 at which a corresponding confirmation device is determined. The confirmation device can be determined based at least in part on a mapping of a confirmation device to the account information associated with the login request. As an example, if the query is successful, the authentication system determines that the front-end device that sent the login request is a registered device and confirms that the confirmation device that used the second account information for registration is a confirmation device associated with the front-end device.

In some embodiments, in the event that it is determined that matching account information does not exist at 820, then method 800 can end. In some embodiments, in the event that it is determined that matching account information does not exist at 820, then method 800 can proceed to 840 at which it is determined that a confirmation device corresponding to the account information associated with the login request has not been registered. For example, if matching account information is determined to not exist, then the authentication system can deem that a corresponding confirmation device or the front-end device has not been registered or that the account information associated with the login request is invalid or not authenticated.

In some embodiments, after receiving the account information sent by the front-end device, the authentication system can query a local database as to whether account information exists that is the same as that account information. If such account information is determined to exist, then the authentication system determines that the front-end device that sent the account information has already been registered in the authentication system. The authentication system uses the account information to determine the corresponding confirmation device and sends the account information to the confirmation device that was found. If such a corresponding confirmation device is determined to not exist, the authentication system confirms that the front-end device that sent the account information has not been registered and/or that the account information is for a non-legitimate account.

As an illustrative example, the authentication system is a target host, the front-end device is a notebook computer, and the confirmation device is a mobile phone. After receiving the account name "1252" and the password "123456" sent by Notebook Computer A, the target host can query the local database as to whether it has the account name "1252" and the password "123456." If the target host finds the account name "1252" and the password "123456," then the target host will determine that Notebook Computer A has already registered, and the target host identifies the identification information for Mobile Phone A associated with Notebook Computer A, sends the authentication request including information such as "Account '1252' requests remote login; permitted?" to Mobile Phone A for identity authentication.

According to various embodiments, the authentication system conducts queries with account information to determine whether the front-end device that sent the account information has been registered and to determine the confirmation device, if any, that is associated with the front-end device.

According to various embodiments, the authentication system comprises a target host and/or an authentication server. The target host can be a terminal such as a server. The target host is configured to receive the first account information used by any one front-end device in connection with a remote login such as an initial remote login (e.g., to the authentication system). The target host can be further configured to send the first registration request comprising the first account information to the authentication server, receive a certificate that was communicated back by the authentication server and that is associated with the first account information, and thus obtain the first registration information.

Specifically, the target host and authentication server can be two separate servers, or the target host and the authentication server can be one server (e.g., the target host can be a module or function executed by an authentication server).

In some embodiments, the authentication system includes a target host and an authentication server. The target host is the host to which the user (e.g., the front-end device) remotely logs on. The authentication server can perform identity authentication of user-entered account information. The user-entered account information can correspond to account information associated with an access or login request received from the user (e.g., via the front-end device). When each user first remotely logs in via a front-end device, each user can input the account information to log on to the target host. The target host sends the received account information to the authentication server for registration. With the received account information, the authentication server generates a certificate corresponding to the account information and sends the certificate corresponding to the account information back to the target host. The target host obtains the registration information based on the account information and the received certificate and saves the registration information in a local database.

As an illustrative example, the front-end device is a notebook computer and the confirmation device is a mobile phone. When User A uses a notebook computer to conduct a remote login for the first time, the user could enter the account name "1252" and the password "123456" for the remote login account. Notebook Computer A sends the account name "1252" and the password "123456" that were input by the user through the network to the target host. After receiving the account name "1252" and the password "123456" sent by Notebook Computer A, the target host can generate a registration request based on the account name "1252" and the password "123456" and send it to the authentication server. After receiving the account name "1252" and the password "123456," the authentication server can generate a trusted certificate corresponding to the account name "1252" and the password "123456" and send the trusted certificate back to the target host. The target host takes the account name "1252," the password "123456," and the received trusted certificate and saves the account name, the password, and the received trusted certificate in a database. For example, the target host can save the account name, the password, and the received trusted certificate in association with one another or as a single whole in a local database.

According to various embodiments, when each user first remotely logs in via a front-end device, the corresponding user also inputs the account information (or a portion thereof) through the confirmation device so as to log on to the target host. The target host sends the account information to the authentication server for registration. With the received account information, the authentication server generates a corresponding certificate and sends the corresponding certificate to the target host. The target host regards the account information sent by the confirmation device and the corresponding certificate as registration information and saves the account information and the corresponding certificate in a local database.

In some embodiments, front-end device registration can be carried out through the authentication server, and remote login can be conducted through the target host. There is no need for a server to carry out front-end device registration or to conduct a remote login again. Thus, the load on the server is reduced.

As discussed above, at 820, it is determined whether matching account information exists, and in the event that it is determined that matching account information exists at 820, then method 800 proceeds to 830 at which a corresponding confirmation device is determined. For example, the authentication system queries whether there exists first account information and second account information that are the same as the account information, and, if the query is successful, then the authentication system confirms that the confirmation device that used the second account information for registration is a confirmation device associated with the front-end device.

Figure 8B:
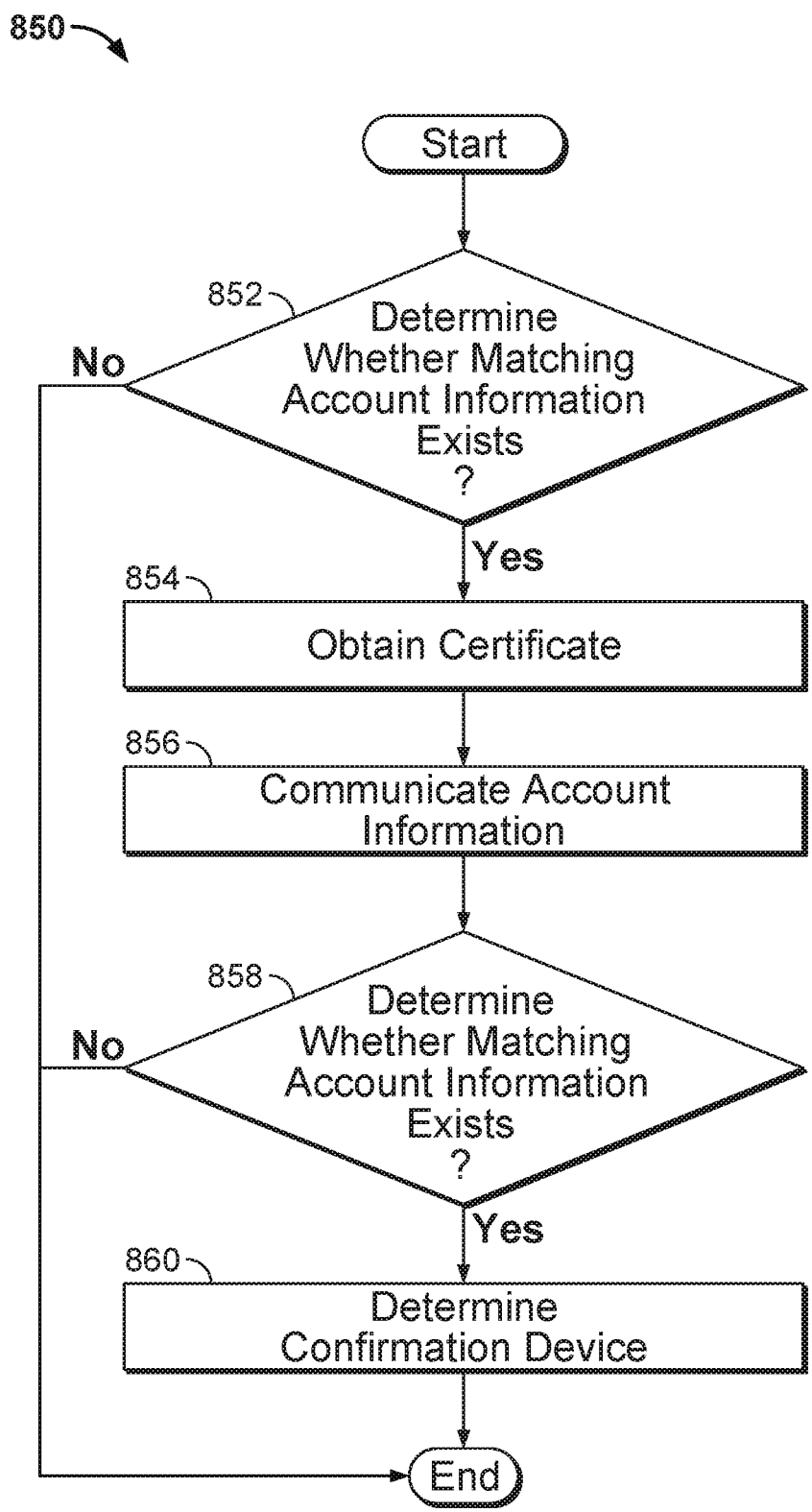
FIG. 8B is a flowchart of a method for identity authentication according to various embodiments of the present application.

FIG. 8B is a flowchart of a method for identity authentication according to various embodiments of the present application.

Referring to FIG. 8B, a method 850 for identity authentication is provided. Method 850 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, and/or method 800 of FIG. 8A. For example, system 100, system 300, terminal 400, and/or system 500 can implement at least a part of method 850. According to various embodiments, method 850 can be implemented in connection with 620 of method 600 of FIG. 6. For example, 620 of method 600 of FIG. 6 can comprise method 850. According to some embodiments, method 850 can be implemented in connection with 820, either individually or collectively.

At 852, it is determined whether matching account information exists. For example, the authentication system can determine whether account information associated with the login request matches any account information that has previously been registered. The target host can query whether there exists first account information that matches the account information associated with the login request.

In the event that it is determined that matching account information exists at 852, then method 850 proceeds to 854 at which a certificate is obtained. In some embodiments, a certificate associated with the first account information is obtained. For example, the certificate can be stored at the authentication system in a database storing mappings of account information and certificates. The target host obtains a certificate associated with the first account information. The certificate can be generated in connection with the registration of the device (e.g., of the confirmation device). The device can store the certificate locally in the local device system (e.g., in windows.cert store). The certificate can be used in connection with an SSL connection.

At 856, account information is communicated. For example, the target host uses Open SSL and associated functions to invoke the certificate to launch a TLS connection to the authentication server and sends the account information to the authentication server. Other library functions for establishing a TLS connection can be used.

At 858, it is determined whether matching account information exists. The authentication server can determine whether account information associated with the login request matches any account information that has previously been registered. As an example, the authentication server can determine whether the authentication system includes account information associated with registration of a confirmation device, the account information matching account information associated with a login request (e.g., obtained from the login request or otherwise matching account information associated with the front-end device). As an example, the authentication server queries the authentication system as to whether there exists second account information that is the same as the first account information (e.g., account information obtained from the login request or otherwise matching account information associated with the front-end device such as the first account information).

In the event that it is determined that matching account information exists at 858, method 850 then proceeds to 860 at which a corresponding confirmation device is determined. The confirmation device can be determined based at least in part on a mapping of a confirmation device to the account information associated with the login request. If the query for second account information that is the same as the first account information is successful, the authentication server determines that the confirmation device that used the second account information for registration is a confirmation device associated with the front-end device.

In the event that it is determined that matching account information does not exist at 852 or 858, then method 800 can end.

According to various embodiments, after a user remotely logs in for the first time via a front-end device, the target host locally stores the account information sent by the front-end device and the corresponding certificate. When the user remotely logs in again via the front-end device, the target host receives the account information sent by the front-end device and then queries locally as to whether this account information already exists. If the target host fails to find the account information, then the target host deems the front-end device as not having been registered and is to be registered. If the target host finds the account information, the target host will extract the trusted certificate corresponding to the account information, invoke the trusted certificate to establish a TLS connection with the authentication server (e.g., using Open SSL), and send the account information to the authentication server. The authentication server locally queries whether second account information exists that is the same as the first account information. If the authentication server finds such second account information, then the confirmation device corresponding to this second account information and the front-end device are deemed to be inter-related.

As an illustrative example, the front-end device is a notebook computer and the confirmation device is a mobile phone. After receiving the account name "1252" and the password "123456" sent by Notebook Computer A, the target host can locally query with the account name "1252" and the password "123456" as to whether there exists a corresponding trusted certificate. If a corresponding trusted certificate does exist, then the target host invokes the trusted certificate to establish a TLS connection with the authentication server and sends the account name "1252" and the password "123456" to the authentication server. After receiving the account name "1252" and the password "123456," the authentication server locally queries for a mobile phone corresponding to the account name "1252" and the password "123456." If the authentication server finds a corresponding Mobile Phone A, then the authentication server determines that Mobile Phone A is associated with Notebook Computer A.

According to various embodiments, it is possible to attain the objective of determining the associated confirmation device based on the account information (e.g., the account information included in a login request or otherwise associated with a front-end device) as follows: the target host looks up the certificate and invokes the certificate to launch a TLS connection with the authentication server, which can look up the confirmation device associated with the front-end device.

Referring back to FIG. 6, at 650, an account (or login request) is authenticated. For example, upon receiving confirmation information sent back by the confirmation device in response to the authentication request, the authentication system determines that the current account is a legitimate account.

Figure 9A:
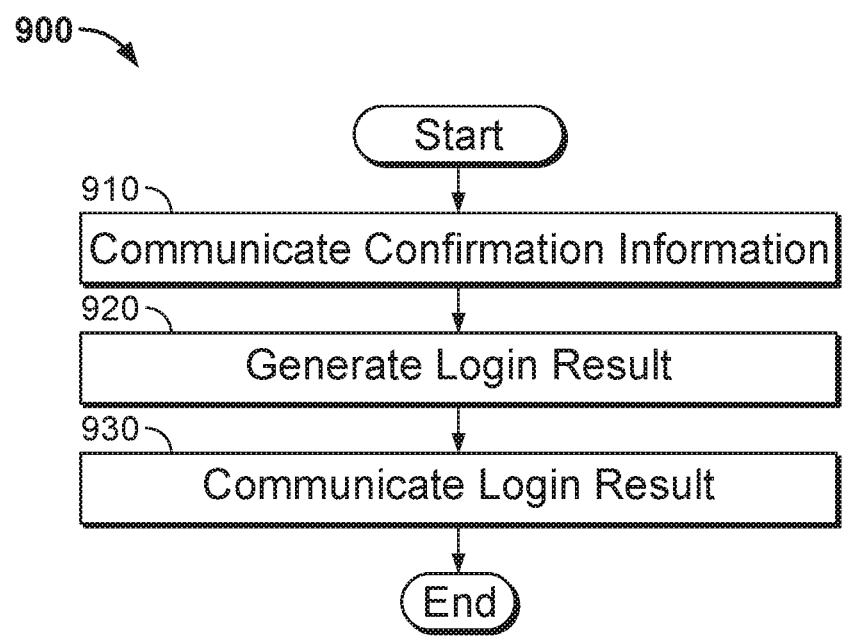
FIG. 9A is a flowchart of a method for identity authentication according to various embodiments of the present application.

FIG. 9A is a flowchart of a method for identity authentication according to various embodiments of the present application.

Referring to FIG. 9A, a method 900 for identity authentication is provided. Method 900 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, and/or method 850 of FIG. 8B. For example, system 100, system 300, terminal 400, and/or system 500 can implement at least a part of method 900. According to various embodiments, method 900 can be implemented in connection with 650 of method 600 of FIG. 6. For example, 650 of method 600 of FIG. 6 can comprise method 900.

At 910, confirmation information is communicated. As an example, the authentication server forwards the confirmation information to the target host. According to various embodiments, the target host is a module or function that can be executed by the authentication server. In some embodiments, the target host is a server in the authentication system. The confirmation information can be included in a response communicated from the confirmation device (e.g., in connection with an authentication process). The confirmation information can be generated by a confirmation device. The confirmation information can comprise, or otherwise correspond to, an indication of whether the login request received by the authentication system is authenticated. The indication of whether the login request received by the authentication system is authenticated can be based on a user input to the confirmation device. As an example, a PC device (e.g., a front-end device) sends a request, an application running on a mobile device (e.g., the confirmation device) receives the request and sends the confirmation back to the PC device as a response. The communication of the request and the confirmation can be sent over a TLS connection. Accordingly, a two secure factor authentication is established: one is using the certificate and another is confirmation by the mobile device. When the PC device receives the confirmation response, an application running on the PC device can use a local private certificate (e.g., the certificate used in connection with the SSL connection) to encrypt the response confirmation (e.g., a 6 digit token), and the credential in the confirmation response can be used for authentication of the device.

At 920, a login result is generated. As an example, the authentication system can generate a remote login result that is associated with a login request (e.g., from the front-end device). More specifically, the target host can generate the remote login result. The login result (or remote login result) can be generated based on the confirmation information. For example, if the confirmation information indicates that the confirmation device (e.g., the user thereof) confirms the login request or the account information associated therewith, then the login result can be determined to be an authenticated or successful login.

At 930, the login result is communicated. The authentication system can communicate the login result to the front-end device. As an example, the target host can send the remote login result back to the front-end device.

Upon successfully sending the remote login result back to the front-end device, the authentication system (e.g., the target host) determines that the current account for use of the front-end device is a legitimate account and causes the current account to successfully log on to the target host through the front-end device. The authentication system can permit access to the network (or a server thereon) based on the login result indicating that the login request, front-end device, or account associated with the front-end device is authenticated.

According to various embodiments, the remote login result corresponds to remote desktop data after the successful establishment of a remote login connection. The remote login result can include remote desktop picture data, remote desktop app display icon data, etc.

According to various embodiments, in the event that the confirmation button displayed on the confirmation device is selected and the confirmation information is generated, the confirmation device communicates the confirmation information back to the authentication server. The authentication server forwards the confirmation information via a TLS connection to the target host. The target host generates a remote login result based on the confirmation information, sends the remote login result back to the front-end device, and permits the front-end device to successfully log on to the target host.

As an illustrative example, the front-end device is a notebook computer and the confirmation device is a mobile phone. If the user holding the mobile phone permits account "1252" to conduct the remote login, then the mobile phone can generate confirmation information response to the user clicking the permission button. The mobile phone sends the confirmation information back to the authentication server. The authentication server sends the confirmation information via a TLS connection back to the target host. The target host determines that account "1252" is a legitimate account, permits the account to conduct the remote login, establishes a remote login connection with the notebook computer, and sends the account information corresponding to account "1252" to the notebook computer.

According to various embodiments, the authentication server can forward the confirmation information. The target host generates the remote login result and sends the remote login result to the front-end device, with the result that the user successfully logs on to the target host through the front-end device.

Related art includes mainstream approaches for accessing network resources: a) open direct access; b) accessing a network, entering a password, etc. through dial-in; c) carrying out configurations, such as certificates, on the system for accessing a network. Each of the approaches for accessing network resources have certain deficiencies associated therewith. In relation to the certificate configuration approach, in the event a device environment is copied, it is possible to copy the device (e.g., maliciously passing off a device running the copied device environment as a legitimate device) for accessing a network. If an account number and password are used to enter the network, then the account number could easily be leaked. Open networks are even more vulnerable. None of these techniques can be integrated into a secure, protective terminal module, resulting in much inconvenience for network management and detection. Therefore, it is possible to substitute system network access strategies based on a certificate scheme and have an authorization server identify users.

Figure 9B:
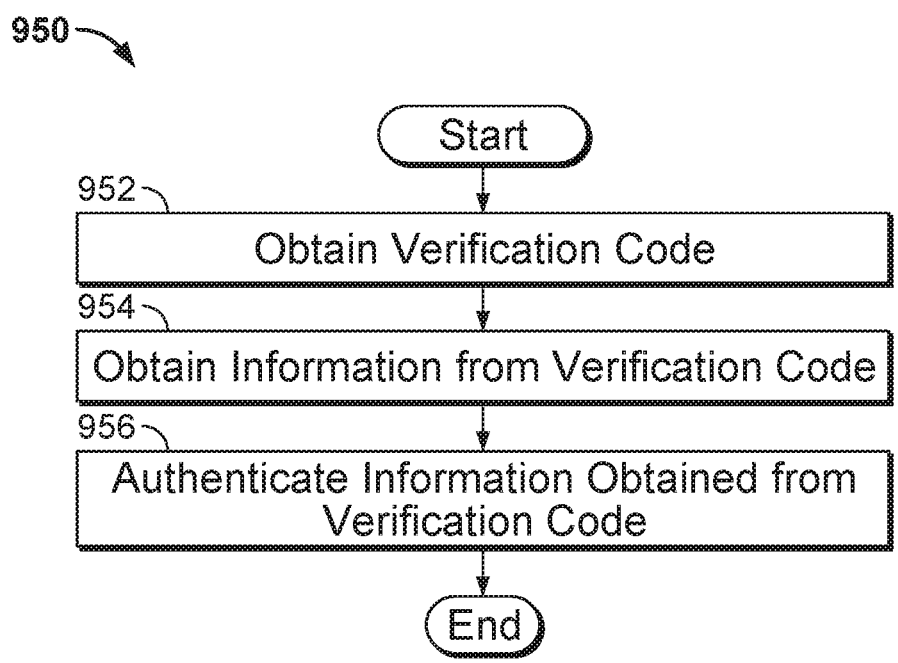
FIG. 9B is a flowchart of a method for identity authentication according to various embodiments of the present application.

FIG. 9B is a flowchart of a method for identity authentication according to various embodiments of the present application.

Referring to FIG. 9B, a method 950 for identity authentication is provided. Method 950 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, and/or method 900 of FIG. 9A. For example, system 100, system 300, terminal 400, and/or system 500 can implement at least a part of method 950. According to various embodiments, method 950 can be implemented in connection with 650 of method 600 of FIG. 6. For example, 650 of method 600 of FIG. 6 can comprise method 950.

According to various embodiments, the authentication system comprises an authorization server. Returning to FIG. 6, as discussed above, at 610, a login request is received. For example, the authentication system receives the login request issued by the front-end device. Method 950 can be implemented before the authentication system receives the login request.

At 952, a verification code is obtained. As an example, the authorization server receives a verification code. The verification code can be communicated to the authorization server by the front-end device. According to various embodiments, the verification code is generated by the front-end device. For example, the front-end device can generate the verification code for authorization purposes. The verification code can be generated based at least in part on encrypting the account information and security certificate for the current account (e.g., the account associated with the front-end device or the user thereof). The verification code can be generated by encrypting the account information and security certificate for the current account in accordance with a predetermined encryption algorithm.

In some embodiments, the authorization server corresponds to an authentication server. For example, the authorization server can correspond to an authentication server that performs authorization and authentication. In some embodiments, the authorization server corresponds to a target host. For example, the authorization server can correspond to a target host that conducts remote logins, authentication, and authorization.

At 954, information is obtained from the verification code. For example, obtaining information from the verification code can comprise extracting information from the verification code. In some embodiments, extracting the information from the verification code is performed by decrypting the verification code. The authentication system can decrypt the verification code. For example, the authorization server decrypts the verification code in accordance with a predetermined decryption algorithm. The information extracted from the verification code can comprise account information and/or the security certificate for the current account.

At 956, the information obtained from the verification code is authenticated. As an example, the authentication system (e.g., the authorization server) authenticates the information obtained from the verification code. In some embodiments, authenticating the information obtained from the verification code comprises determining whether the information obtained from the verification code (e.g., the result of decrypting the verification code) matches information associated with a registration of the corresponding account, front-end device, and/or user thereof.

In some embodiments, the predetermined encryption algorithm used in connection with generating the verification code corresponds to the predetermined decryption algorithm. The predetermined encryption algorithm can be a Data Encryption Standard (DES) encryption algorithm. Other encryption algorithms can be used as the predetermined encryption/decryption algorithm. The present application imposes no particular limits in this regard.

According to various embodiments, the front-end device can establish an SSL connection with the authorization server. The front-end device can encrypt the user-entered account information and the certificate corresponding to the front-end device based at least in part on a preset encryption algorithm (e.g., the predetermined encryption algorithm). For example, the front-end device can use a preset encryption algorithm in connection with encrypting the user-entered account information and the certificate corresponding to the front-end device. The front-end device generates an authorization key (e.g., the verification code) based at least in part on the encrypting of the user-entered account information and the certificate corresponding to the front-end device. The front-end device communicates the authorization key to the authorization server. After receiving the authorization key, the authorization server can decrypt the authorization key. The authorization key can be decrypted based at least in part on (e.g., using) the preset decryption algorithm. The authorization key can be decrypted to obtain the certificate and account information of the front-end device. The authorization server can determine whether the certificate and account information (e.g., obtained from decrypting the authorization key) have been saved. For example, the authorization server can determine whether the certificate and account information obtained from the authorization key matches a certificate and account information stored at the authorization server (or at a storage associated with the authorization server). As an example, the authorization server queries locally as to whether the account information and certificate have been saved. If the authorization server determines that the certificate and account information obtained from the authorization key match a certificate and account information stored at the authorization server, then the front-end device is determined to be verified as a legitimate device. In the event that the front-end device is determined to be verified as a legitimate device, the network connection (e.g., associated with a login request) may proceed. Accordingly, the front-end device can be granted access to the network.

In some embodiments, if the decryption result is successfully verified, the authentication system queries the front-end device as to whether the front-end device is to (e.g., needs or otherwise desires to) access the network. If the front-end device is to (e.g., needs or otherwise desires to) access the network, then the front-end device establishes a network connection with the authentication system and issues the login request to the authentication system.

Figure 10:
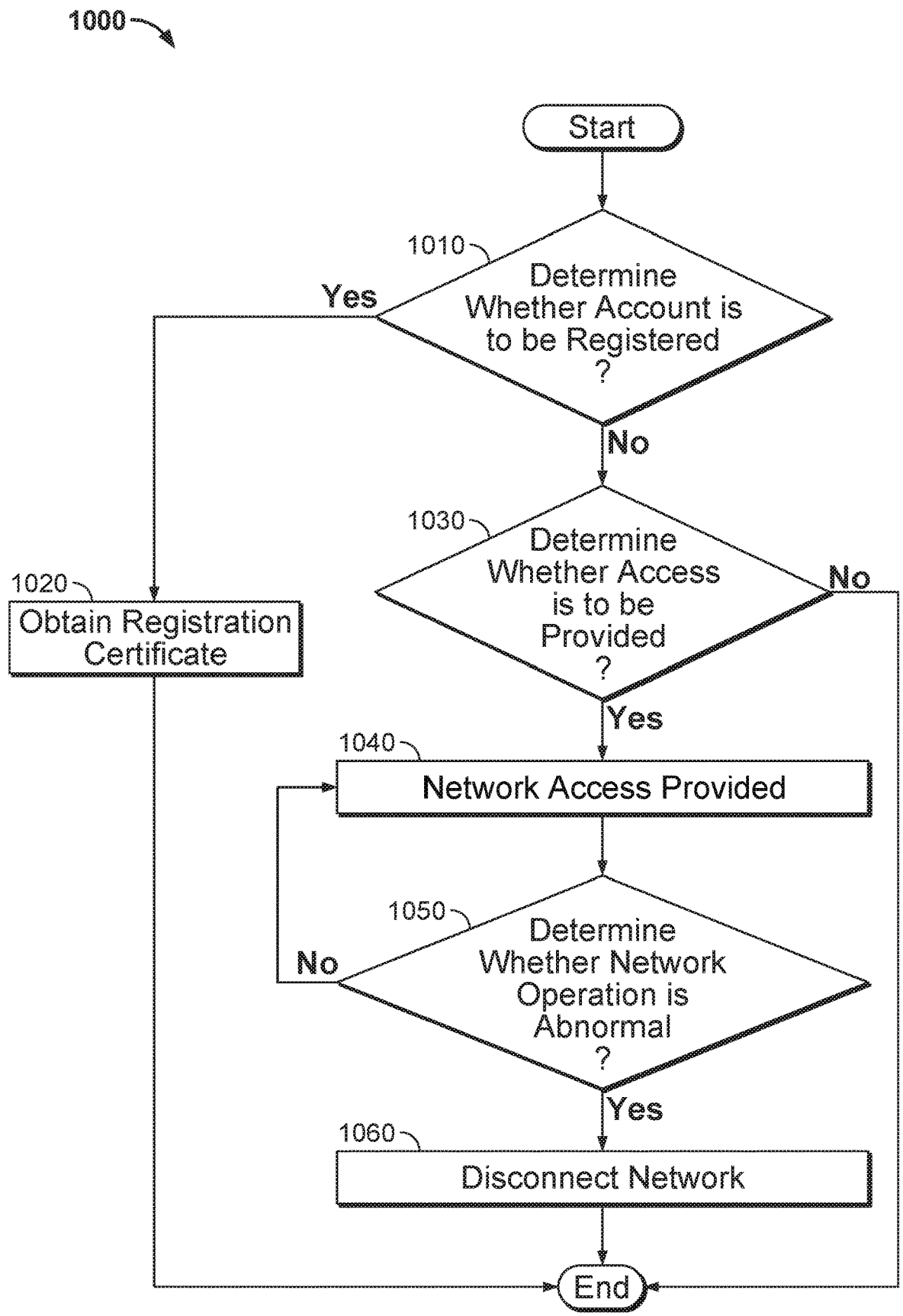
FIG. 10 is a flowchart of a method for identity authentication according to various embodiments of the present application.

FIG. 10 is a flowchart of a method for identity authentication according to various embodiments of the present application.

Referring to FIG. 10, a method 1000 for identity authentication is provided. Method 1000 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, and/or method 950 of FIG. 9B. For example, system 100, system 300, terminal 400, and/or system 500 can implement at least a part of method 1000.

At 1010, it is determined whether an account is to be registered. The determination of whether an account is to be registered can be made by the authorization system, the front-end device, or the confirmation device. The authorization system can determine that an account is to be registered in the event that the authorization system determines that account information received by the authorization system does not correspond to any account information that has been (previously) registered with the authorization system. For example, the authorization system can determine whether the database of registered account information comprises account information that the authorization system receives (e.g., in connection with an access or login request).

In the event that it is determined that the account is to be registered at 1010, method 1000 proceeds to 1020 at which a registration certificate is obtained. A registration certificate can be generated based at least in part on the corresponding account information. The registration certificate can be generated in response to a registration request. The registration certificate can be generated by the authorization system. In the event that the registration certificate is generated, the authorization system can provide the registration certificate to the corresponding device (e.g., a front-end device, a confirmation device, etc.).

According to various embodiments, in the event that the authorization system determines that the account information corresponds to a registered account (e.g., registered account information), then the authorization system can determine that the account is not to be registered.

In the event that it is determined that the account is not to be registered at 1010, method 1000 proceeds to 1030 at which it is determined whether access is to be provided. For example, it can be determined whether a front-end device or other terminal, as applicable, is to (e.g., needs or otherwise desires to) provide access (e.g., to a network or a network resource such as an authentication system, etc.). It can be determined whether a front-end device is to (e.g., needs or otherwise desires to) provide access based on a query communicated to the front-end device and a reply to such query communicated by the front-end device.

In the event that it is determined that access is not to be provided at 1030, method 1000 can end.

In the event that it is determined that access is to be provided at 1030, method 1000 proceeds to 1040 at which network access is provided. The network access can be provided to the front-end device or other terminal, as applicable.

At 1050, it is determined whether network operation is abnormal. For example, the network or authentication system can determine whether the network is operating normally.

In the event that network operation is determined to be abnormal at 1050, method 1000 proceeds to 1060 at which access to the network is disconnected. For example, the connection between the terminal (e.g., front-end device) and the network (or network resource) is disconnected.

In some embodiments, the authentication system queries the front-end device as to whether the network is to (e.g., needs or otherwise desires to) be accessed. If the front-end device is to (e.g., needs or otherwise desires to) access the network, the front-end device establishes a remote network connection and sends a remote login request to the authentication system. The remote network connection may be broken or disconnected in the event that the network develops an abnormality or a pulse detection finds that the front-end device has disconnected.

As an illustrative example, the front-end device is a notebook computer, the authentication system is a target host, and the confirmation device is a mobile phone. Before conducting a remote login through a notebook computer, the user is to (e.g., needs or otherwise desires to) make a remote connection with the authentication system. The notebook computer first establishes an SSL connection with the authorization server. The user inputs the account name "1252" and the password "123456." The notebook computer generates a notebook computer authorization key based on the account name "1252," the password "123456," and the notebook computer's security certificate. The notebook computer sends the authorization key to the authorization server. The authorization server decrypts the notebook computer authorization key to obtain the account name "1252," the password "123456," and the notebook computer's security certificate. The authorization system (e.g., the authorization server) queries locally as to whether the same account information and security certificate exist. If the same account information and security certificate exist, then the authorization system (e.g., the authorization server) determines that the notebook computer is a legitimate device, and the authorization system (e.g., the authorization server) inquires if the network is to (e.g., needs or otherwise desires to) be accessed by the notebook computer. After the notebook computer (or user thereof) confirms that the network is to (e.g., needs or otherwise desires to) be accessed, a remote network connection can be established between the notebook computer and the target host.

In some embodiments, before the confirmation device establishes a connection with the authentication system, the confirmation device can also carry out authorization. For example, the confirmation device sends the authorization verification code to the authorization server. The authorization server decrypts and authenticates (verifies) the information included in the result of the decrypted verification code. After successful authentication (verification), the authorization server queries the confirmation device if the confirmation device is accessing (or desires to) the network. If the confirmation device is accessing the network, then a remote network connection is established.

According to various embodiments, authorizing the front-end device by encrypting the certificate and the account information is possible. Thus, it is possible to achieve the results of more secure protection for user access, less likelihood of forgery attacks, and effective control of device access to/disconnection from the network.

Figure 11:
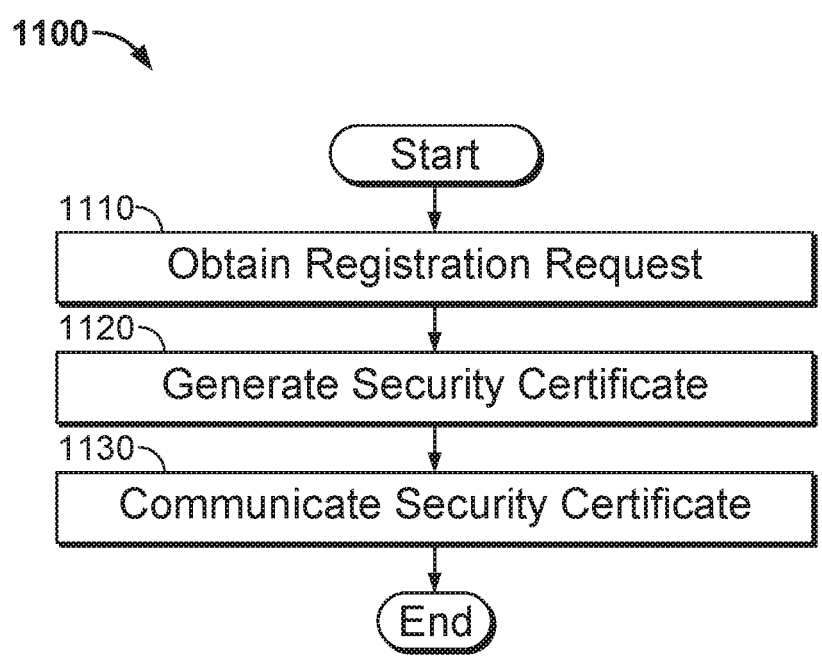
FIG. 11 is a flowchart of a method for identity authentication according to various embodiments of the present application.

FIG. 11 is a flowchart of a method for identity authentication according to various embodiments of the present application.

Referring to FIG. 11, a method 1100 for identity authentication is provided. Method 1100 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, and/or method 1000 of FIG. 10. For example, system 100, system 300, terminal 400, and/or system 500 can implement at least a part of method 1100.

Returning to FIG. 9B, at 952, a verification code is obtained. According to various embodiments, before a verification code is obtained, method 1100 is performed. As an example, before the verification code is obtained, a registration of a terminal can be performed. Before the authorization system receives the verification code sent by the front-end device, method 1100 can be performed.

At 1110, a registration request is obtained. The authorization system can obtain the registration request from a terminal such as a front-end device, a confirmation device, etc. In some embodiments, the authorization server receives a registration request from the front-end device. The authorization server can receive the registration request over one or more networks. The registration request can comprise account information such as account information associated with the terminal from which the registration request is received, account information associated with a user of the terminal, etc.

At 1120, a security certificate is generated. The security certificate can be generated based at least in part on the registration request. In some embodiments, the authentication system generates the security certificate. For example, the authorization server can generate the security certificate. The security certificate can be stored by the authentication server, such as in a mapping of security certificates to accounts (e.g., account information). The security certificate can correspond to the registration request.

In some embodiments, the registration request comprises account information sent by the terminal (e.g., the front-end device). As an example, the account information can correspond to user-entered remote login account information.

At 1130, the security certificate is communicated. In some embodiments, the authentication system communicates the security certificate to the terminal from which the registration request was obtained. For example, the authorization server sends the security certificate back to the front-end device.

In some embodiments, in the event that a front-end device first undergoes authorization, the front-end device is required to register with an authorization server. The front-end device can send the user-entered account information to the authorization server. The authorization server can use the account information as a basis for generating a security certificate for the corresponding front-end device. In the event that the security certificate is generated, the authorization server saves the account information and the corresponding security certificate locally in the authorization server or locally in the authentication system. The authorization server can communicate the generated security certificate back to the front-end device so that the front-end device undergoes re-authorization and thus can safely access the network.

According to various embodiments, the authorization server generates a security certificate based on account information and thus achieves the goal of certificate-based authorization of corresponding front-end devices.

Figure 12:
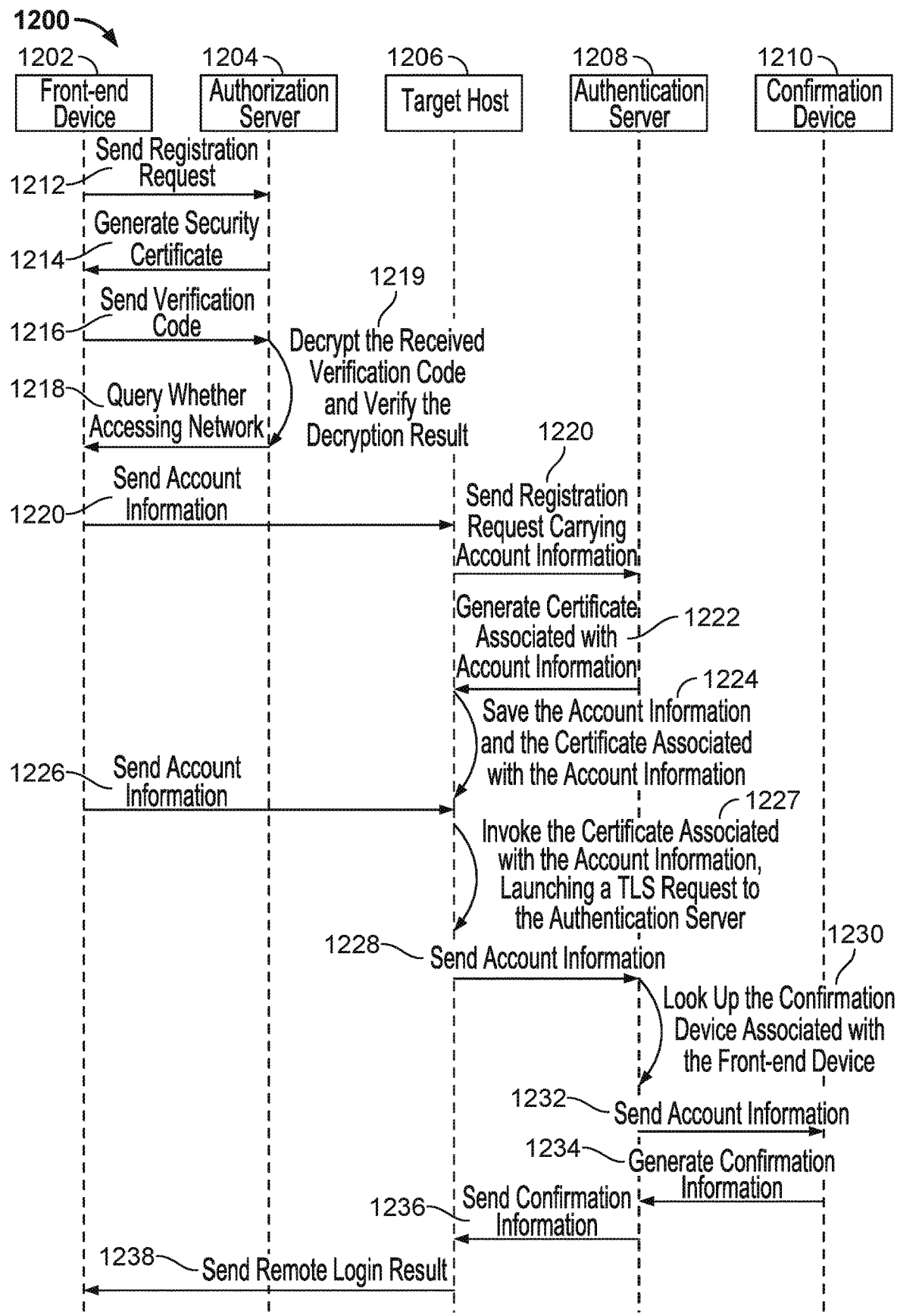
FIG. 12 is a flowchart of a method for identity authentication according to various embodiments of the present application.

FIG. 12 is a flowchart of a method for identity authentication according to various embodiments of the present application.

Referring to FIG. 12, a method 1200 for identity authentication is provided. Method 1200 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, method 1000 of FIG. 10, and/or method 1100 of FIG. 11. For example, system 100, system 300, terminal 400, and/or system 500 can implement at least a part of method 1200.

At 1212, front-end device 1202 sends a registration request to authorization server 1204.

In some embodiments, front-end device 1202 first establishes an SSL connection with authorization server 1204. Front-end device 1202 uses the account information of the current account for use of the front-end device (e.g., the account associated with a user of front-end device 1202) as a basis for generating a registration request and sends the registration request to authorization server 1204.

At 1214, authorization server 1204 generates a security certificate and sends the security certificate back to front-end device 1202.

In some embodiments, authorization server 1204 uses the received account information as a basis for generating the security certificate corresponding to the account information and sends the security certificate to front-end device 1202. Front-end device 1202 can store (e.g., locally) the security certificate.

At 1216, front-end device 1202 sends a verification code to authorization server 1204.

In some embodiments, front-end device 1202 generates the verification code. For example, front-end device 1202 can generate the verification code on the basis of the account information of the current account for use of front-end device 1202 and the saved confirmation device security certificate. Front-end device 1202 can use a preset encryption algorithm in connection with generating the verification code.

At 1218, authorization server 1204 decrypts the received verification code and verifies the decryption result.

In some embodiments, authorization server 1204 decrypts the received verification code in accordance with a preset decryption algorithm to obtain the decryption result and verifies the decryption result.

At 1219, authorization server 1204 queries front-end device 1202 as to whether front-end device 1202 is to access the network.

In some embodiments, if authorization server 1204 successfully verifies the decryption result, authorization server 1204 determines that front-end device 1202 is a legitimate device and queries front-end device 1202 as to whether front-end device 1202 is to (e.g., needs or otherwise desires to) access the network. If front-end device 1202 is to (e.g., needs or otherwise desires to) access the network, then front-end device 1202 establishes a remote network connection between front-end device 1204 and/or authorization server and target host 1206.

At 1220, front-end device 1202 sends account information to target host 1206.

In some embodiments, in connection with the first login onto target host 1206 through front-end device 1202, the account information of the account may be entered (e.g., to the front-end device 1202). Front-end device 1202 sends the account information to target host 1206, and front-end device 1202 normally logs on to target host 1206.

1220 further comprises target host 1206 sending a registration request carrying the account information to authentication server 1208.

In some embodiments, target host 1206 generates a registration request based on the received account information and sends the registration request to authentication server 1208 for registration.

At 1222, authentication server 1208 generates a certificate associated with the account information and sends the certificate to target host 1206.

In some embodiments, authentication server 1208 decrypts the received registration request to obtain the account information sent by front-end device 1202 and authentication server 1208 generates a certificate associated with the account information (e.g., a certificate for the front-end device).

At 1224, target host 1206 saves the account information and the certificate associated with the account information.

In some embodiments, target host 1206 receives a certificate for front-end device 1202, obtains front-end device registration information based on the account information sent by the front-end device 1202, and saves the front-end device registration information in a local database.

At 1226, front-end device 1202 sends account information to the target host 1206.

In some embodiments, during the next login (e.g., and subsequent logins) onto target host 1206 through front-end device 1202, the account information of the account may be entered. Front-end device 1202 sends the account information to target host 1206.

At 1227, target host 1206 invokes the certificate associated with the account information, launching a TLS request to the authentication server 1208.

In some embodiments, target host 1206 locally queries for account information that is the same as the account information sent by front-end device 1202. If the query is successful, target host 1206 acquires the certificate for front-end device 1202 and, by invoking the certificate, launches a TLS request to authentication server 1208 to establish a TLS connection.

At 1228, target host 1206 sends the account information to authentication server 1208.

In some embodiments, after target host 1206 establishes a TLS connection with authentication server 1208, target host 1206 forwards the account information sent by front-end device 1202 to authentication server 1208.

At 1230, authentication server 1208 looks up confirmation device 1210 associated with front-end device 1202.

In some embodiments, authentication server 1208 locally queries for account information that is the same account information sent by front-end device 1202. If the query is successful, authentication server 1208 acquires confirmation device 1210 associated with the account information sent by front-end device 1202. For example, authentication server 1208 looks up the confirmation device associated with the front-end device 1202.

At 1232, authentication server 1208 sends the account information to confirmation device 1210 for authentication.

In some embodiments, authentication server 1208 generates an authentication request based on the account information sent by front-end device 1202 and sends the authentication request to confirmation device 1210 for manual authentication.

At 1234, confirmation device 1210 generates confirmation information and sends the confirmation information to authentication server 1208.

In some embodiments, if user authentication is successful, confirmation information can be generated through an operation such as clicking or sliding an element displayed on confirmation device 1210, and the confirmation information is sent to authentication server 1208.

At 1236, authentication server 1208 sends the confirmation information back to target host 1206.

In some embodiments, authentication server 1208 forwards the confirmation information to target host 1206.

At 1238, target host 1206 generates a remote login result according to the confirmation information and sends the remote login result back to front-end device 1202.

In some embodiments, target host 1206 can generate a remote login result based on the confirmation information and send the remote login result to front-end device 1202. Upon successfully receiving the remote login result, front-end device 1202 determines that the current account for use of front-end device 1202 is a legitimate account. The identity authentication is successful, and the target host can be logged on to through front-end device 1202.

According to various embodiments, it is possible to replace a system network access strategy based on a certificate scheme. As an example, the authorization server completes user identification and connects the front-end device into the network. In the event that a user first accesses the target host, the user is required to register the front-end device as a trusted login device. During the second (or subsequent) login(s), the target host makes a TLS connection using the certificate and sends an authentication request through the authentication server to the confirmation device. The confirmation device carries out authentication. Thus, user access of the network is more securely protected and forgery attacks are unlikely to occur. Moreover, while ensuring two-factor security, this approach enhances user login experience and reduces the time cost of user login.

Please note that all the method embodiments described above have been presented as a series of a combination of actions in order to simplify the description. However, persons skilled in the art should know that the present application is not limited by the action sequences that are described, for some of the steps may make use of another sequence or be implemented simultaneously in accordance with the present application. Furthermore, persons skilled in the art should also know that the embodiments described in the Description are preferred embodiments and that the actions and modules involved therein are not necessarily required by the present application.

Through descriptions of the above implementations, persons skilled in the art can clearly understand that methods based on the aforesaid embodiment may be realized through software with the necessary general-use hardware platform. Of course, hardware may also be used, but in many cases the former is the preferred implementation. Based on such an understanding, the technical scheme of the present application, whether intrinsically or with respect to portions that contribute to the prior art, is realizable in the form of software products. These computer software products can be stored on storage media (such as ROM/RAM, magnetic disks, and optical disks) and include a certain number of commands used to cause a piece of terminal equipment (which could be a mobile telephone, a computer, a server, or network equipment) to execute the methods described in the embodiments of the present application.

A method embodiment of an identity authentication method is further provided according to an embodiment of the present application. Please note that the steps depicted in the flowcharts in the drawings can be executed in a computer system, such as a group of computers capable of executing commands. Moreover, although logical sequences are depicted in the flowcharts, the steps that are depicted or described may, in some situations, be executed in sequences other than those herein.

Figure 13:
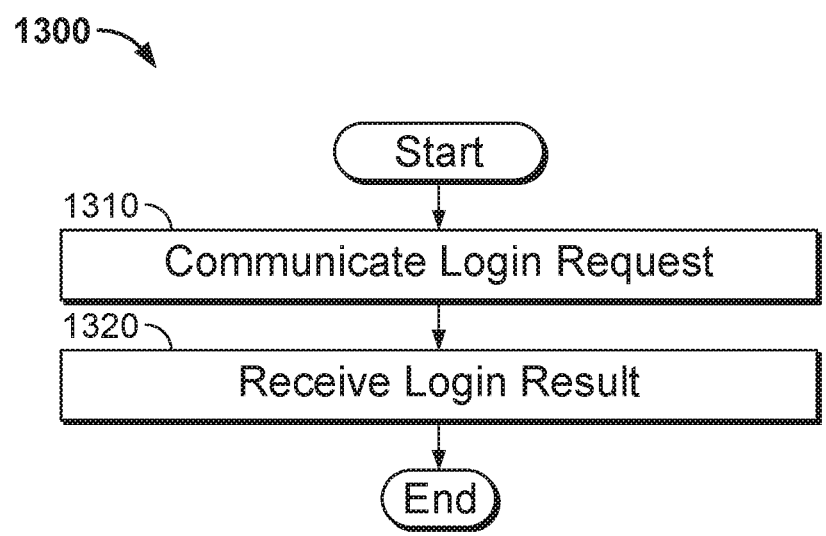
FIG. 13 is a flowchart of a method for identity authentication according to various embodiments of the present application.

FIG. 13 is a flowchart of a method for identity authentication according to various embodiments of the present application Referring to FIG. 13, a method 1300 for identity authentication is provided. Method 1300 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, method 1000 of FIG. 10, method 1100 of FIG. 11, and/or method 1200 of FIG. 12. For example, system 100, system 300, terminal 400, and/or system 500 can implement at least a part of method 1300.

According to various embodiments, method 1300 is implemented by a front-end device.

At 1310, a login request is communicated. In some embodiments, the login request is communicated by the front-end device. For example, the front-end device communicates the login request to an authentication system. In some embodiments, the login request comprises the account information of the current account for use of the front-end device. The current account can be associated with a user of the front-end device.

In some embodiments, the authentication system is a target host logged on to remotely by a user (e.g., via the front-end device). The target host (e.g., authentication system) can authenticate the identity of the user. In some embodiments, the front-end device is a client such as a terminal used by a user or a mobile terminal device (e.g., a smartphone, a tablet, or an iPad). In some embodiments, a login request can correspond to a remote login request by a user to remotely log on to an authentication system through a front-end device and undergo identity authentication. For example, the login request communicated by the front-end device to the authentication system can be a remote login request communicated in connection with a remote login by a user. Accordingly, the account information included in the login request (e.g., the login request communicated by the front-end device to the authentication system) comprises account information for a remote login carried out by a user. As an example, the account information comprises the account name and password for the remote login.

As an illustrative example, the authentication system is a target host, the front-end device is a notebook computer (e.g., a terminal), and the confirmation device is a mobile phone. According to this example, User A uses a notebook computer (e.g., front-end device) to conduct a remote login. In connection with the remote login, the user could enter the account name "1252" and the password "123456" for the remote login account. The notebook computer sends the account name "1252" and the password "123456" that were input by the user through the network to the target host (e.g., authentication system). The account name and password that are input by the user and sent to the target host can be communicated in the login request communicated by the notebook computer.

At 1320, a login result is received. In some embodiments, the front-end device receives the login result from the authentication system. The authentication system can send the login result in connection with the login request. The login result can indicate whether login (e.g., to a target host or other network resource) is successful.

In some embodiments, the authentication system uses the account information as a basis for determining the confirmation device associated with the front-end device and sends an authentication request comprising the account information to the confirmation device. Upon receiving the confirmation information sent back by the confirmation device in response to the authentication request, the login result corresponds to a result that the current account is a legitimate account.

In some embodiments, the confirmation device is a handheld device associated with the user in advance. For example, a user can register a confirmation device in association with the user's account. Examples of a confirmation device include terminals such as smartphones, tablets, iPads, and other such devices that can serve as token terminal devices for identity authentication. According to various embodiments, the authentication system can use account information to associate a front-end device with a confirmation device and/or to associate a user or account with a confirmation device. For example, based on account information, the user can associate the currently used front-end device with a confirmation device. In some embodiments, an authentication system saves account information in relation to the corresponding confirmation device.

According to various embodiments, the confirmation device can generate the confirmation information in connection with one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, the user inputs account information in connection with a remote login. For example, the user inputs the account information to the front-end device. The front-end device sends the account information via the network to the authentication system for authentication. With the received account information, the authentication system queries a local database as to whether the local database has the account information. If the authentication system fails to find the account information, the authentication system determines that the account is a non-legitimate account. If the authentication system finds the account information, the authentication system determines the confirmation device associated with the account information. For example, the authentication system determines the confirmation device associated with the front-end device. After looking up the account information and determining the confirmation device associated with the account information, the authentication system can send the account information via the network to the confirmation device. The user can manually confirm the account information received by the confirmation device. If the user determines that the account information sent by the authentication system is account information input by the user himself or herself, the user can generate confirmation information by clicking a confirmation button displayed on the confirmation device or by swiping the display screen of the confirmation device. The confirmation device sends the confirmation information back to the authentication system. The authentication system determines that the account is a legitimate account; remote login may be carried out. If the authentication system has not received confirmation information sent back by the confirmation device, then the authentication system determines that the account is a non-legitimate account; remote login cannot be carried out.

In some embodiments, if the user confirms that the user has not entered the account information, or if the account information sent by the authentication system is not account information entered by the user, then the user can generate denial information by clicking the deny button displayed on the confirmation device. The confirmation device sends the denial information back to the authentication system. The authentication system determines that the account is a non-legitimate account; remote login cannot be carried out.

As an illustrative example, the authentication system is a target host, the front-end device is a notebook computer, and the confirmation device is a mobile phone. After receiving the account name "1252" and the password "123456," the target host locally looks up the mobile phone associated with the account name and the password. It finds Mobile Phone A and sends the authentication request "Account '1252' requests remote login; permitted?" to Mobile Phone A. Mobile Phone A can display the authentication request "Account '1252' requests remote login; permitted?" on the display screen along with a permission button and a rejection button. The user holding Mobile Phone A can view the authentication request. If the user permits account "1252" to conduct the remote login, then the user can generate confirmation information by clicking the permission button. Mobile Phone A will send the confirmation information back to the target host. The target host will determine that account "1252" is a legitimate account, permit the account to conduct the remote login, and establish a remote login connection with the notebook computer.

According to various embodiments, the front-end device refers to the device currently in need of identity authentication; the authentication system refers to the device that performs the first identity authentication of the front-end device, and the confirmation device is the device that performs the second identity authentication of the front-end device, thereby achieving two-factor authentication of the front-end device and making identity authentication more secure.

According to various embodiments, the front-end device issues a login request to the authentication system. The front-end device receives the login result sent back by the authentication system and thus achieves identity authentication for remote login.

According to various embodiments, because the login request sent by the front-end device comprises account information for the current account for use of the front-end device, the authentication system can look up the confirmation device with the account information and send the account information to the confirmation device. The user can complete the identity authentication by performing a manual operation to confirm the account information. This avoids password leaks or the security risks involved in other parties falsely presenting themselves. Moreover, the user does not need to input a password during the identity authentication process, but only to perform a simple confirmation operation. Therefore, it is possible to achieve the effects of enhancing user login experience, reducing user login time costs, and effectively preventing user misrepresentation.

Various embodiments described herein solve the technical problem in the prior art of identity authentication methods involving both high security risks and poor user experience.

Figure 14:
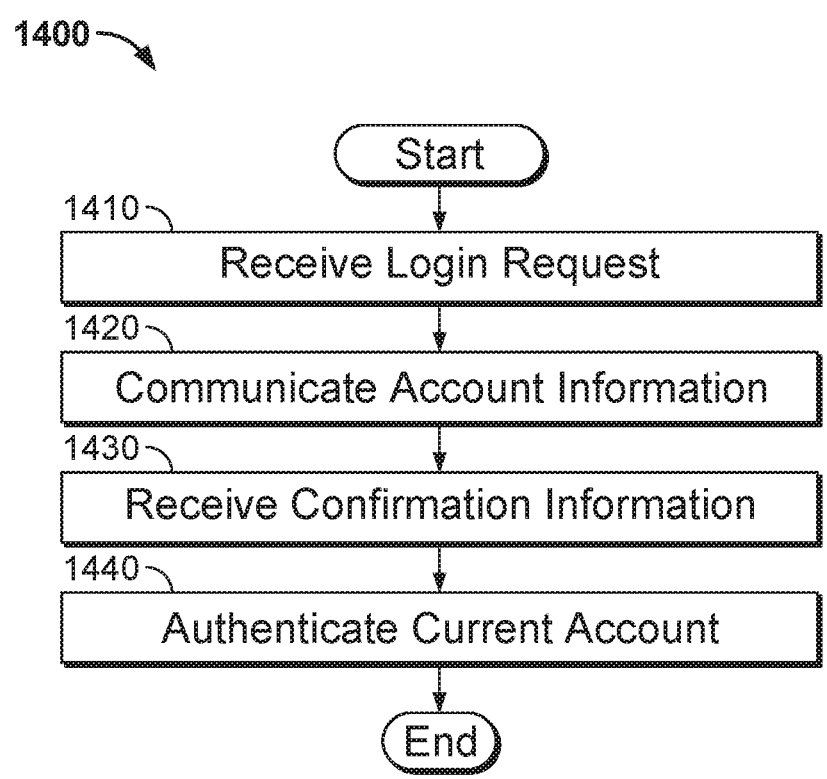
FIG. 14 is a flowchart of a method for identity authentication according to various embodiments of the present application.

Referring to FIG. 14, a method 1400 for identity authentication is provided. Method 1400 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, method 1000 of FIG. 10, method 1100 of FIG. 11, method 1200 of FIG. 12, and/or method 1300 of FIG. 13. For example, system 100, system 300, terminal 400, system 500, and/or system 1500 of FIG. 15 can implement at least a part of method 1400.

According to various embodiments, method 1400 is implemented by a target host. The target host can be a terminal.

At 1410, a login request is received. In some embodiments, a target host receives the login request. The login request can be communicated by a front-end device. The target host receives a login request issued from a front-end device. The login request can be communicated to the target host via a network. In some embodiments, the login request comprises account information. For example, the account information included in the login request can correspond to the account information of the current account for use of the front-end device. The account information included in the login request can correspond to an account associated with a user of the front-end device. In some embodiments, the account information is communicated to the authentication system in connection with the login request. For example, the account information can be communicated separately (but contemporaneously) with the login request.

The target host can correspond to a terminal logged on to remotely by a user (e.g., using a front-end device or other terminal). In some embodiments, the target host could authenticate an identity of the user. The front-end device could be a terminal or other client such as computer equipment (including a PC or a notebook computer) used by a user or a mobile terminal device (such as a smartphone, a tablet, or an iPad). In some embodiments, the login request corresponds to a remote login request by a user to remotely log on to a target host through a front-end device and undergo identity authentication. The aforesaid account information could be account information for a remote login carried out by a user (e.g., the account name and password for a remote login).

As an illustrative example, the front-end device is a notebook computer and the confirmation device is a mobile phone. When User A uses a notebook computer to conduct a remote login, User A inputs (or causes the notebook computer to retrieve) the account name "1252" and the password "123456" for the remote login account. The notebook computer sends the account name "1252" and the password "123456" that were input by the user through the network to the target host. The target host receives the account information "1252" and "123456" for using the notebook computer.

At 1420, account information is communicated. In some embodiments, the account information is communicated to the authentication server. For example, a terminal that obtained the login request can communicate account information to the authentication server. The account information communicated can be based at least in part on the login request. For example, the account information can be extracted from the login request. In some embodiments, the target host sends the account information to an authentication server. In response to receiving the account information, the authentication server can send an authentication request to the confirmation device after using the account information as a basis for determining the confirmation device associated with the front-end device. For example, the sending of the account information to an authentication server can cause the authentication server to generate and/or send the authentication request. The authentication request can comprise the account information.

In some embodiments, the confirmation device is a handheld device bound by, or otherwise associated with, the user in advance. For example, a user can register a confirmation device with an account of the user. Examples include smartphones, tablets, iPads, and other such devices that can serve as token terminal devices for identity authentication. Using account information, the user can associate the currently used front-end device with a confirmation device. The authentication server can save account information in relation to the corresponding confirmation device.

In an optional scheme, in connection with a user remotely logging in, the user can input account information. The front-end device sends account information via the network to the target host for authentication. The target host forwards the account information to the authentication server. With the received account information, the authentication server queries a local database as to whether the local database has the account information. If the authentication server fails to find the account information, it determines that the account is a non-legitimate account. If the authentication server finds the account information, the authentication server determines the confirmation device associated with the account information. That is, it determines the confirmation device associated with the front-end device. After looking up the account information and determining the confirmation device associated with the account information, the authentication server can send the account information via the network to the confirmation device. The user can manually confirm the account information received by the confirmation device.

As an illustrative example, the front-end device is a notebook computer and the confirmation device is a mobile phone. After receiving the account information "1252" and "123456," the target host forwards the account information to the authentication server. The authentication server locally looks up the mobile phone associated with the account name and the password and finds Mobile Phone A. The authentication server sends to Mobile Phone A the authentication request comprising information from which an indication such as "Account '1252' requests remote login; permitted?" can be provided. Mobile Phone A can display the authentication request or an indication associated therewith such as "Account '1252' requests remote login; permitted?" on the display screen along with a permission button and a rejection button. The user holding Mobile Phone A can view the authentication request.

At 1430, confirmation information is received. In some embodiments, the confirmation information can be received from the confirmation device (e.g., the confirmation device corresponding to an account associated with the login request). The confirmation information can be communicated to the authentication system (e.g., the target host) from the confirmation device. For example, the confirmation device can communicate the confirmation information in response to determining whether the account information (or the login request) is confirmed. The confirmation device can determine whether the account information (or the login request) is confirmed based on input from the user (e.g., indicating whether the account information or the login request is confirmed). The confirmation device can send the confirmation information to the authentication system via a network. Upon receiving confirmation information sent back by the confirmation device in response to the authentication request, the target host determines that the current account is a legitimate account at 1440.

According to various embodiments, the confirmation device can generate the confirmation information in connection with one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, if the user (e.g., of the confirmation device) determines that the account information sent by the authentication system corresponds to account information input by the user himself or herself (e.g., via the front-end device), the user can generate confirmation information by clicking a confirmation button displayed on the confirmation device or by swiping the display screen of the confirmation device. The confirmation device communicates the confirmation information back to the authentication system. The authentication system determines whether the account is a legitimate account (or whether the login request is authenticated or otherwise authorized) based on the confirmation information (e.g., communicated by the confirmation device). In the event that the account is deemed to be a legitimate account (or that the login request is authenticated or otherwise authorized), remote login may be carried out. In some embodiments, absence of receipt of confirmation information (e.g., associated with a corresponding authentication request) is deemed to indicate that the account is a non-legitimate account (or that the login request is not authenticated or not otherwise authorized). For example, if the authentication system has not received confirmation information sent back by the confirmation device (e.g., within a predefined period of time), then the authentication system (e.g., the target host) determines that the account is a non-legitimate account. In the event that the account is determined to be a non-legitimate account (or that the login request is not authenticated or not otherwise authorized), remote login cannot be carried out. For example, the authentication system (e.g., the target host) can deny a login request in the event that the corresponding account is determined to be a non-legitimate account (or that the login request is not authenticated or not otherwise authorized).

In some embodiments, if the user (e.g., of the confirmation device) confirms that it has not entered the account information (or otherwise submitted a login request), or if the account information sent by the authentication system is not account information entered by the user, then the user can provide an indication to the confirmation device that the account information or corresponding login request is not authenticated. For example, the user can generate denial information by clicking a deny button displayed on the confirmation device. In response to receiving the denial information from the user (or otherwise being generated in connection with an authentication request), the confirmation device communicates the denial information to the authentication system. The denial information can be included in confirmation information communicated to the authentication system. For example, the denial information can correspond to an indication that the account information or corresponding login request is not authenticated. The authentication system (e.g., the target host) determines that the account is a non-legitimate account (or that the account information or corresponding login request is not authenticated) based at least in part on the denial information. In the event that the authentication system determines that the account is a non-legitimate account (or that the account information or corresponding login request is not authenticated), remote login cannot be carried out. For example, the authentication system can deny the corresponding login request in response to determining that the account is a non-legitimate account (or that the account information or corresponding login request is not authenticated). The authentication system can communicate an indication of the denial of the corresponding login request to the front-end device.

As an illustrative example, the authentication system is a target host, the front-end device is a notebook computer, and the confirmation device is a mobile phone. The confirmation device (e.g., corresponding to account information associated with a login request) can be Mobile Phone A. After receiving an authentication request (e.g., from the target host), Mobile Phone A can display the authentication request or information associated therewith. For example, Mobile Phone A can display "Account '1252' requests remote login; permitted?" on the display screen along with a permission button and a rejection button. The user holding Mobile Phone A can view the authentication request. If the user permits account "1252" to conduct the remote login, then the user can generate (via Mobile Phone A) confirmation information by clicking the permission button. Mobile Phone A communicates the confirmation information back to the target host. The target host determines that account "1252" is a legitimate account (or that the corresponding login request is authenticated) based on the confirmation information communicated by Mobile Phone A. In the event that authentication system determines that account "1252" is a legitimate account, the target host permits the account to conduct the remote login, and establishes a remote login connection with the notebook computer.

In some embodiments, the front-end device refers to the device currently in need of identity authentication; the target host refers to the device that the front-end device remotely logs on to; the authentication server refers to the device that performs the first identity authentication of the front-end device; and the confirmation device is the device that performs the second identity authentication of the front-end device, thereby achieving two-factor authentication of the front-end device and making identity authentication more secure.

According to various embodiments, the authentication system (e.g., the target host) receives a login request issued by the front-end device; the authentication system (e.g., the authentication server) uses account information (e.g., associated with the login request) as a basis for determining the confirmation device associated with the front-end device; the authentication system communicates an authentication request to the confirmation device; the authentication system (e.g., the target host) receives confirmation information from the confirmation device; in the event that the authentication system receives the confirmation information communicated by the confirmation device in response to the authentication request, the authentication system determines that the current account is a legitimate account (or that the login request is authenticated); and in the event that the authentication system determines that the current account is a legitimate account (or that the login request is authenticated), the authentication system implements identity authentication for the remote login.

Because the login request sent by the front-end device comprises account information for the current account for use of the front-end device, the authentication system can look up the confirmation device with the account information and communicate the account information to the confirmation device (e.g., in connection with an authentication request). The authentication system can look up the confirmation device in a local storage (e.g., database) or a remote storage. The user can complete the identity authentication by performing a manual operation (e.g., on the confirmation device) to confirm the account information or corresponding login request. The use of the user completing the identity authentication (e.g., on the confirmation device) avoids password leaks or the security risks involved in other parties falsely presenting themselves. Moreover, the user does not need to input a password during the identity authentication process, but only to perform a simple confirmation operation. Therefore, various embodiments achieve the effects of enhancing user login experience, reducing user login time costs, and effectively preventing user misrepresentation.

Various embodiments solve the technical problem of identity authentication methods involving both high security risks and poor user experience associated with related art.

Figure 15:
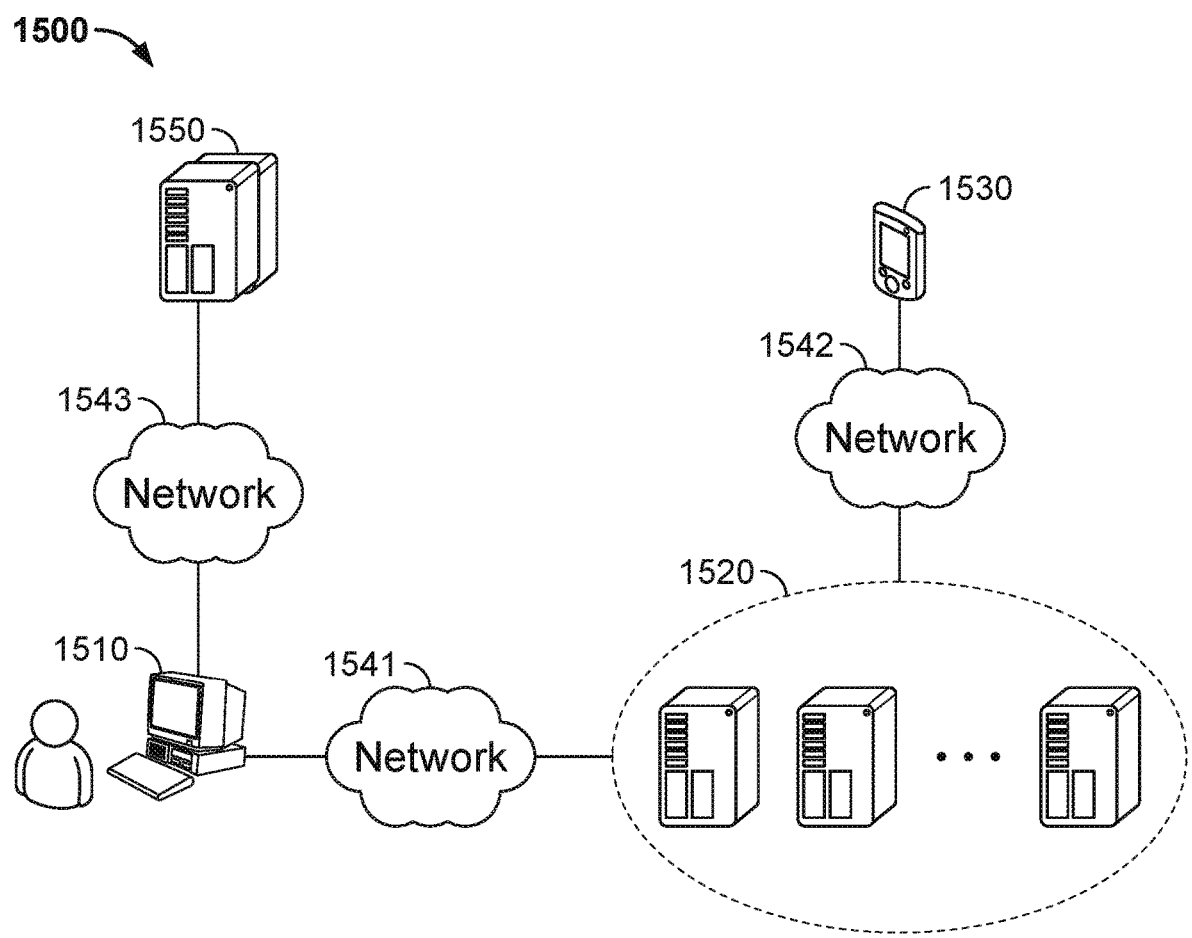
FIG. 15 is a diagram of a system for identity authentication according to various embodiments of the present application.

FIG. 15 is a diagram of a system for identity authentication according to various embodiments of the present application.

Referring to FIG. 15, system 1500 for identity authentication is provided. System 1500 comprises terminal 1510 (also referred to herein as front-end device 1510), one or more servers 1520 (also referred to herein as authentication system 1520), and terminal 1530 (also referred to herein as confirmation device 1530). System 1500 can comprise one or more networks 1541, 1542, and/or 1543 over which front-end device 1510, server(s) 1520, and confirmation device 1530 communicate. Authentication system 1520 can comprise a target host. In some embodiments, authentication system 1520 comprises an authentication server.

System 1500 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, method 1000 of FIG. 10, method 1100 of FIG. 11, method 1200 of FIG. 12, method 1300 of FIG. 13, and/or method 1400 of FIG. 14.

Front-end device 1510 can be configured to communicate login requests. The account information included in the login request can correspond to an account associated with a user of front-end device 1510. In some embodiments, the account information is communicated to the authentication system in connection with the login request. For example, the account information can be communicated separately (but contemporaneously) with the login request.

Front-end device 1510 can be a terminal or a client such as computer equipment (including a PC or a notebook computer) used by a user or a mobile terminal device (such as a smartphone, a tablet, or an iPad). In some embodiments, the login request corresponds to a remote login request by a user to remotely log on to the target host through front-end device 1510 and undergo identity authentication. As an example, account information can be account information for a remote login carried out by a user (e.g., the account name and password for a remote login).

As an illustrative example, the front-end device is a notebook computer and the confirmation device is a mobile phone. In the event that User A uses a notebook computer to conduct a remote login for the first time, User A inputs (or causes the notebook computer to retrieve, etc.) the account name "1252" and the password "123456" for the remote login account. Notebook Computer A sends the account name "1252" and the password "123456" that were input by the user through the network to the target host.

The target host included in authentication system 1520 that is connected to front-end device 1510 (e.g., via network(s) 1541, 1542, and/or 1543) is configured to receive login requests issued by front-end device 1510. The target host can determine the certificate associated with the account information (e.g., the account information included in the login request). For example, the target host can use the account information as a basis for determining the certificate associated with the account information. The target host can be further configured to invoke the certificate to launch a TLS connection with the authentication server (e.g., an authentication server included in authentication system 1520). The certificate can be issued in connection with registration of the front-end device and/or the confirmation device. The TLS connection can be established with Open SSL.

In some embodiments, the target host corresponds to a terminal (e.g., a server) logged on to remotely by a user. The target host can authenticate the identity of the user.

According to various embodiments, in connection with a remote login, a user can input account information (e.g., to front-end device 1510). Front-end device 1510 sends account information via network(s) 1541, 1542, and/or 1543 to the target host for authentication. The target host forwards the account information to the authentication server. With the received account information, the authentication server queries a local database as to whether the local database has the account information. If the authentication server fails to find the account information, the authentication server determines that the account is a non-legitimate account. For example, the authentication server decrypts the credential receive from the front end device and determines whether the credential is valid and/or authentic. If the authentication server finds the account information, the target host determines the certificate associated with the account information. For example, the target host requests the authentication server to authenticate the credential received from the front end device. After finding the account information and determining the certificate associated with the account information, the target host invokes the found certificate to establish a TLS connection with the authentication server. After the TLS connection is established, the target host sends the account information to the authentication server for authentication.

As an illustrative example, front-end device 1510 is a notebook computer and the confirmation device 1530 is a mobile phone. The target host receives the account information "1252" and "123456" for current use of the notebook computer. The target host can locally look up the certificate corresponding to the account name "1252" and the account password "123456." The target host finds Certificate A and invokes Certificate A to launch a TLS connection with the authentication server. After establishing the connection, the target host sends the account name "1252" and the password "123456" to the authentication server.

The authentication server included in authentication system 1520 is connected to the target host included in authentication system 1520. The authentication server is configured to receive account information sent by the target host. The authentication server can determine confirmation device 1530 associated with front-end device 1510 based at least in part on the account information. In some embodiments, the authentication server can use the account information (e.g., the account information comprised in the login request) as a basis for determining whether a confirmation device associated with the front-end device exists. If the authentication server determines that the confirmation device exists (e.g., is registered to be associated with the account information), the authentication server generates an authentication request based on the account information. In some embodiments, the authentication request comprises the account information.

The target host and authentication server can be two separate servers, or the target host and the authentication server can be one server such as an authentication server (e.g., the target host can be a module or function executed by an authentication server). In some embodiments, confirmation device 1530 is a terminal such as a hand-held device that is associated with the user in advance. Examples of such a hand-held device include smartphones, tablets, iPads, and other such devices for identity authentication. Using account information, the user can associate the currently used front-end device with a confirmation device. The authentication server will save account information in relation to the corresponding confirmation device.

In some embodiments, after receiving the account information sent by the target host, the authentication server may query a local database with the received account information as to whether the local database has the account information. If the authentication server fails to find the account information, the authentication server determines that the account is a non-legitimate account. If the authentication server finds the account information, the authentication server determines the confirmation device associated with the account information. For example, the authentication server determines the confirmation device associated with the front-end device. After looking up the account information and determining the confirmation device associated with the account information, the authentication server can send the account information via the network to the confirmation device. The user can manually confirm the account information received by the confirmation device.

As an illustrative example, front-end device 1510 is a notebook computer and confirmation device 1530 is a mobile phone. After receiving the account information "1252" and "123456" (e.g., an account name and account password), the authentication server locally looks up the mobile phone associated with the account name and password. The authentication server finds Mobile Phone A and sends the authentication request "Account '1252' requests remote login; permitted?" to Mobile Phone A.

Confirmation device 1530 is connected to authentication system 1520 via network(s) 1541, 1542, and/or 1543. For example, confirmation device 1530 is connected to the authentication server via network(s) 1541, 1542, and/or 1543. Confirmation device 1530 is configured to receive the authentication request and to send confirmation information generated according to the authentication request back to the authentication server.

Confirmation device 1530 can be a terminal such as a hand-held device associated with the user (e.g., registered in association with an account of the user) in advance. Examples of such a hand-held device include smartphones, tablets, iPads, and other such devices for identity authentication. Using account information, the user can associate the currently used front-end device with a confirmation device. The authentication server will save account information in relation to the corresponding confirmation device.

According to various embodiments, the confirmation device can generate the confirmation information in connection with one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, in the event that the authentication server has reported the confirmation information back to the front-end device, the authentication server determines that the current account is a legitimate account.

In some embodiments, if the user determines that the account information sent by the authentication server is account information input by the user, the user can generate confirmation information by clicking a confirmation button displayed on confirmation device 1530 or by swiping the display screen of the confirmation device. Confirmation device 1530 sends the confirmation information back to the authentication server. The authentication server sends the confirmation information back to the target host. The target host determines that the account is a legitimate account and remote login may be carried out. If the target host has not received confirmation information sent back by confirmation device 1530, then the target host determines that the account is a non-legitimate account and remote login cannot be carried out.

In some embodiments, if the user confirms that the user has not entered the account information, or if the account information sent by the authentication server is not account information entered by the user, then the user can generate denial information by clicking the deny button displayed on confirmation device 1530. Confirmation device 1530 sends the denial information back to the authentication server. The authentication server sends the denial information back to the target host. The target host determines that the account is a non-legitimate account and remote login cannot be carried out.

As an illustrative example, front-end device 1510 is a notebook computer and confirmation device 1530 is a mobile phone. After receiving the authentication request sent by the authentication server, Mobile Phone A can display the authentication request "Account '1252' requests remote login; permitted?" on the display screen. The user holding Mobile Phone A can view the authentication request. Mobile Phone A can display the authentication request "Account '1252' requests remote login; permitted?" on the display screen along with a permission button and a rejection button. The user holding Mobile Phone A can view the authentication request. If the user permits account "1252" to conduct the remote login, then the user can generate confirmation information by clicking the permission button. Mobile Phone A sends the confirmation information back to the target host. The target host determines that account "1252" is a legitimate account, permits the account to conduct the remote login, and establishes a remote login connection with the notebook computer.

Although FIG. 2 uses a block diagram to depict data exchanges between a user device and a server, data exchange 200 can also be used to represent data exchanges between the front-end device 1510 and the target host, and data exchanges between the authentication server and the confirmation device 1530 of system 1500 of FIG. 15.

In some embodiments, the front-end device refers to the device currently in need of identity authentication; the target host refers to the device that the front-end device remotely logs on to; the authentication server refers to the device that performs the first identity authentication of the front-end device; and the confirmation device is the device that performs the second identity authentication of the front-end device, thereby achieving two-factor authentication of the front-end device and making identity authentication more secure.

According to various embodiments, the front-end device sends a login request. The target host receives the login request issued by the front-end device. It uses account information as a basis for determining the certificate associated with the account information and invokes the certificate to launch a TLS connection with the authentication server. The authentication server uses the account information as a basis for determining whether a confirmation device associated with the front-end device exists. If the confirmation device associated with the front-end device is determined to exist, then the authentication server generates an authentication request based on the account information and sends the authentication request to the confirmation device. The confirmation device sends the confirmation information that was generated according to the authentication request back to the authentication server, which thus implements identity authentication for the remote login.

Because the login request sent by the front-end device comprises account information for the current account for use of the front-end device, the authentication system can look up the confirmation device with the account information and communicate the account information to the confirmation device (e.g., in connection with an authentication request). The authentication system can look up the confirmation device in a local storage (e.g., database) or a remote storage. The user can complete the identity authentication by performing a manual operation (e.g., on the confirmation device) to confirm the account information or corresponding login request. The use of the user completing the identity authentication (e.g., on the confirmation device) avoids password leaks or the security risks involved in other parties falsely presenting themselves. Moreover, the user does not need to input a password during the identity authentication process, but only to perform a simple confirmation operation. Therefore, various embodiments achieve the effects of enhancing user login experience, reducing user login time costs, and effectively preventing user misrepresentation.

Various embodiments address the technical problem in the related art of identity authentication methods involving both high security risks and poor user experience.

In some embodiments, the target host establishes a network connection separately with at least one front-end device and at least one confirmation device, and the target host receives first account information used by any one front-end device when the corresponding front-end device first remotely logs on to the target host and receives second account information used by any one confirmation device when the corresponding confirmation device first remotely logs on to the target host.

The target host can establish remote network connections with multiple, remotely logged-in, front-end devices and with the confirmation devices associated with multiple front-end devices. When each user remotely logs in for the first time, the remote login account information can be sent through the front-end device to the target host for registration, and the account information can be sent through the confirmation device to the target host for registration.

The target host generates a first registration request based on the first account information and generates a second registration request based on the second account information.

In some embodiments, the first registration information is used in the trusted certificate information that is used for launching the next login (e.g., to the authentication system). The second registration information may further include a certificate associated with the second account information and identification information for the confirmation device. The confirmation device can be verified according to the certificate. According to various embodiments, before the confirmation device carries out identity authentication, the confirmation device is verified according to the certificate. If the verification fails, that indicates that the confirmation device is a non-legitimate device. The authentication server will not send the user-entered information to this confirmation device. According to various embodiments, in the event that the confirmation device is not verified, information communicated by a front-end device to the authentication system is not communicated (e.g., by the authentication system) to the confirmation device. In some embodiments, in the event that the confirmation device is verified, information communicated by a front-end device (corresponding to the confirmation device) to the authentication system is communicated (e.g., by the authentication system) to the confirmation device.

As an example, the front-end device (e.g., a PC device) and an application running on a mobile terminal (e.g., the confirmation device) establish TLS connections with the authentication server using their own respective certificates.

In the event of a TLS connection failure (e.g., between the front-end device and the authentication server or between the confirmation device and the authentication server), the request from the front-end device will not be sent to the application running on the mobile terminal.

In some embodiments, the target host sends the first registration request and/or the second registration request to the authentication server.

As an illustrative example, the front-end device is a notebook computer and the confirmation device is a mobile phone. When User A first uses Notebook Computer A to log in remotely, User A can enter the remote login account name "1252" and the password "123456" into both Notebook Computer A and Mobile Phone A. Notebook Computer A and the Mobile Phone A send the user-entered account name "1252" and password "123456" through the network to the target host. When User B first uses Notebook Computer B to log in remotely, User B can enter the remote login account name "1253" and the password "456123" into both Notebook Computer B and Mobile Phone B. Notebook Computer B and Mobile Phone B send the user-entered account name "1253" and password "456123" through the network to the target host, which forwards the account name and password to the authentication server.

In some embodiments, the target host receives the first registration information generated by the authentication server according to the first registration request and/or second registration information generated according to the second registration request. The first registration information comprises a certificate associated with the first account information, and the second registration information comprises at least the second account information.

In some embodiments, the target host saves the first registration information and the second registration information.

According to various embodiments, after receiving the first account information sent by the front-end device, the authentication server can generate the corresponding certificate according to the first account information and send the corresponding certificate back to the target host. The target host can save the first account information and the corresponding certificate locally in the target host. After receiving the second account information sent by the confirmation device, the authentication server can save the confirmation device identification information and the second account information locally in the authentication server.

According to various embodiments, after receiving the first account information sent by the front-end device, the authentication server can generate the corresponding certificate according to the first account information and send the corresponding certificate to the target host. The target host can save the first account information and the corresponding certificate locally in the target host. After receiving the second account information sent by the confirmation device, the authentication server can generate the corresponding certificate according to the second account information and send the corresponding certificate to the target host. The target host can save the confirmation device identification information, the second account information, and the corresponding certificate locally in the authentication server.

As an illustrative example, the front-end device is a notebook computer and the confirmation device is a mobile phone, a detailed explanation of the aforesaid embodiment of the present application will be provided. After receiving the account name "1252" and the password "123456" sent by Notebook Computer A, the authentication server can generate Certificate A for Notebook Computer A and send Certificate A to the target host. The target host saves the account name "1252," the password "123456," and Certificate A locally in a database. After receiving the account name "1252" and the password "123456" sent by Mobile Phone A, the authentication server can save Mobile Phone A's identification information, the account name "1252," and the password "123456" locally in a database. After receiving the account name "1253" and the password "456123" sent by Notebook Computer B, the authentication server can generate Certificate B for Notebook Computer B and send Certificate B to the target host. The target host saves the account name "1253," the password "456123," and Certificate B locally in a database. After receiving the account name "1253" and the password "456123" sent by Mobile Phone B, the authentication server can save Mobile Phone B's identification information, the account name "1253," and the password "456123" locally in a database.

In some embodiments, in the event that the first account information and the second account information match (e.g., are the same), the front-end device that uses the first account information for registration and the confirmation device that uses the second account information for registration in the authentication server are deemed to be inter-related devices.

In some embodiments, in the event that a user binds its own confirmation device to a front-end device, the user can communicate remote login account information through the front-end device to the authentication system for registration, and by having the confirmation device communicate the same remote login account information to the authentication system for registration, the authentication system confirms that the confirmation device and the front-end device are inter-related. For example, the user can operate the front-end device and the confirmation device to each communicate remote login account information, and if the remote login account information communicated by the front-end device and the confirmation device is determined to match, the authentication system can deem the front-end device and the confirmation device to be associated.

As an illustrative example, the front-end device is a notebook computer and the confirmation device is a mobile phone. The authentication server can use stored account names and passwords as a basis for determining that Notebook Computer A and Mobile Phone A are inter-related devices and that Notebook Computer B and Mobile Phone B are inter-related devices. For example, the target host can determine whether the account names and/or passwords associated with Notebook Computer A and the account names and/or passwords associated with Mobile Phone A match (e.g., are the same) in connection with determining whether Notebook Computer A and Mobile Phone A are inter-related devices. Similarly, the target host can determine whether the account names and/or passwords associated with Notebook Computer B and the account names and/or passwords associated with Mobile Phone B match (e.g., are the same) in connection with determining whether Notebook Computer B and Mobile Phone B are inter-related devices.

With the scheme described above, during an initial remote login on the target host, the authentication server can use the received account information as a basis for generating the registration information used in connection with an identity verification and for confirming the association between the front-end device and the confirmation device. In this way, the authentication server achieves the goal of performing identity authentication based on received account information in connection with a subsequent remote login at the target host.

In some embodiments, system 1500 comprises: an authorization server 1550. In some embodiments, the authorization server 1550 can be included in authentication system 1520. The authorization server is connected to the front-end device 1510 via network(s) 1541, 1542, and/or 1543. The authorization server 1550 is configured to receive a verification code sent by front-end device 1510, to decrypt the verification code according to a predetermined decryption algorithm, and to verify the decryption result. The verification code can be generated by front-end device 1510 in connection with authorization purposes by encrypting the account information and security certificate for the current account in accordance with a predetermined encryption algorithm. If the decryption result is successfully verified, the target host queries front-end device 1510 as to whether front-end device 1510 is to (e.g., needs or otherwise desires to) access the network. If front-end device 1510 is to (e.g., needs or otherwise desires to) access the network or a network resource, then front-end device 1510 establishes a network connection with the target host and issues the login request to the target host.

In some embodiments, the predetermined encryption algorithm used in connection with generating the verification code corresponds to the predetermined decryption algorithm. The predetermined encryption algorithm can be a Data Encryption Standard (DES) encryption algorithm. Other encryption algorithms can be used as the predetermined encryption/decryption algorithm. The present application imposes no particular limits in this regard.

According to various embodiments, front-end device 1510 can establish an SSL connection with authorization server. Front-end device 1510 can encrypt the user-entered account information and the certificate corresponding to the front-end device based at least in part on a preset encryption algorithm (e.g., the predetermined encryption algorithm). For example, front-end device 1510 can use a preset encryption algorithm in connection with encrypting the user-entered account information and the certificate corresponding to front-end device 1510. Front-end device 1510 generates an authorization key (e.g., the verification code) based at least in part on the encrypting of the user-entered account information and the certificate corresponding to front-end device 1510. Front-end device 1510 communicates the authorization key to the authorization server. After receiving the authorization key, the authorization server can decrypt the authorization key. The authorization key can be decrypted based at least in part on (e.g., using) the preset decryption algorithm. The authorization key can be decrypted to obtain the certificate and account information of front-end device 1510. The authorization server can determine whether the certificate and account information (e.g., obtained from decrypting the authorization key) has been saved. For example, the authorization server can determine whether the certificate and account information obtained from the authorization key match a certificate and account information stored at the authorization server (or at a storage associated with the authorization server). As an example, the authorization server queries locally as to whether the account information and certificate have been saved. If the authorization server determines that the certificate and account information obtained from the authorization key match a certificate and account information stored at the authorization server, then front-end device 1510 is determined to be verified as a legitimate device. In the event that front-end device 1510 is determined to be verified as a legitimate device, the network connection (e.g., associated with a login request) may proceed. Accordingly, front-end device 1510 can be granted access to network(s) 1541, 1542, and/or 1543.

According to various embodiments, authentication system 1520 (e.g., target host) queries front-end device 1510 as to whether front-end device 1510 is to (e.g., needs or otherwise desires to) access network(s) 1541, 1542, and/or 1543 or a network resource. Front-end device 1510 can reply to the query as to whether front-end device 1510 is to (e.g., needs or otherwise desires to) access network(s) 1541, 1542, and/or 1543 with an indication. In some embodiments, the indication can be a login request. In some embodiments, if front-end device 1510 is to (e.g., needs or otherwise desires to) access the network, front-end device 1510 establishes a remote network connection and communicates a remote login request to the authentication system (e.g., to the target host). The remote network connection between the front-end device 1510 and the authentication system may be broken when the network develops an abnormality or pulse detection finds that the front-end device has disconnected.

As an illustrative example, the front-end device is a notebook computer, and the confirmation device is a mobile phone. Before conducting a remote login through the notebook computer, a remote connection is to be established between the notebook computer and the authentication system. For example, a user can cause the notebook computer to establish the remote connection with the authentication system (e.g., by using an application or the like installed on the notebook computer). The notebook computer may first establish an SSL connection with authorization system 1520 (e.g., authorization server). The user may cause the notebook computer to generate a notebook computer authorization key. For example, the user can input to the notebook computer the account name "1252" and the password "123456." The notebook computer generates a notebook computer authorization key based at least in part on the account name "1252," the password "123456," and the notebook computer's security certificate. The notebook computer communicates the notebook computer authorization key to authorization system 1520 (e.g., authorization server). In the event that authorization system 1520 (e.g., authorization server) receives the notebook computer authorization key, authorization system 1520 (e.g., authorization server) decrypts the notebook computer authorization key to obtain the account name "1252," the password "123456," and the notebook computer's security certificate. Authorization system 1520 (e.g., authorization server) queries locally as to whether the same account information (e.g., the account name and the password) and security certificate exist. As an example, in some embodiments, authorization system 1520 (e.g., authorization server) determines whether the account name, password, and/or the notebook computer's security certificate that are obtained from the notebook computer authorization key matches account information and the security certificate that are registered in association with the user (or front-end device 1510) or that are otherwise stored by the authentication system. If the same account information and security certificate exist (or if the account information and security certificate match account information and/or the notebook computer's security certificate that are obtained from the notebook computer authorization key), then authorization system 1520 (e.g., authorization server) determines that the notebook computer is a legitimate device. The authentication system inquires if the network is to (e.g., needs or otherwise desires to) be accessed. For example, authorization system 1520 (e.g., authorization server) can query the notebook computer as to whether the notebook computer is to (e.g., needs or otherwise desires to) access the network. After the user (or the notebook computer) confirms that the network is to (e.g., needs or otherwise desires to) be accessed, a remote network connection between the notebook computer and the target host can be established.

According to various embodiments, before confirmation device 1530 establishes a connection with the authentication system, confirmation device 1530 can carry out authorization and send the authorization verification code to the authorization server. In the event that the authorization server receives the authorization verification code, the authorization server decrypts the authorization verification code (e.g., provided by the front-end device) and verifies information obtained via decryption of the authorization verification code. After successful verification, a remote network connection can be established between the confirmation device and the network. For example, a remote network connection can be established between the confirmation device and the network if authentication system 1520 (e.g., authorization server) queries the confirmation device if the confirmation device 1530 is accessing (or desires to access) the network, and the confirmation device 1530 provides an indication that it is accessing (or desires to access) the network.

According to various embodiments, it is possible to authorize the front-end device by encrypting the certificate and the account information and thus to achieve the results of more secure protection for user access, less likelihood of forgery attacks, and effective control of device access to/disconnection from the network.

In some embodiments, the authorization server is further configured to receive front-end device registration requests, to generate security certificates corresponding to registration requests, and to send security certificates back to front-end devices.

In some embodiments, the aforesaid registration request includes account information sent by the front-end device (e.g., user-entered remote login account information).

According to various embodiments, in the event that front-end device 1510 first undergoes authentication, front-end device 1510 is to (e.g., needs or otherwise desires to) register with the authorization server. In connection with registering front-end device 1510 (with an authentication system), front-end device 1510 sends account information to an authorization server. The account information communicated by front-end device 1510 can correspond to user-entered account information. In some embodiments, front-end device 1510 sends a request for registering front-end device 1510. The account information communicated by front-end device 1510 can be communicated in connection with (e.g., contemporaneously with) the request for registering front-end device 1510. In the event that the authorization server receives the account information, the authorization server generates a security certificate. For example, the authorization server uses the account information as a basis for generating the security certificate for the corresponding front-end device 1510. The security certificate is saved in association with corresponding account information. As an example, the authorization server saves the account information and the corresponding security certificate locally in the authentication system (e.g., locally in the authorization server). The security certificate can be stored in a database storing mappings of security certificates to account information (e.g., for lookup in connection with an authentication of a terminal). The security certificate is provided to front-end device 1510. For example, the authorization server sends the generated security certificate back to front-end device 1510 so that front-end device 1510 undergoes re-authorization and thus can safely access the network.

According to various embodiments, the authorization server generates security certificates based on account information and thus the goal of certificate-based authorization of corresponding front-end devices is achieved.

According to various embodiments, a computer terminal is provided. This computer terminal can be any computer terminal device within a cluster of computer terminals. In some embodiments, the computer terminal is a terminal device such as a mobile terminal.

According to various embodiments, the computer terminal is located on any one network device among multiple network devices of a computer network.

According to various embodiments, the computer terminal may execute the program code for an identity authentication method. For example, the program code can be executed to cause an authentication system to receive a login request issued by a front-end device, wherein the login request comprises: account information of the current account for use of the front-end device; the authentication system to use the account information as a basis for determining the confirmation device associated with the front-end device; the authentication system to send an authentication request to the confirmation device, wherein the authentication request comprises account information; upon receiving the confirmation information sent by the confirmation device in response to the authentication request, the authentication system to determine that the current account is a legitimate account.

Figure 16:
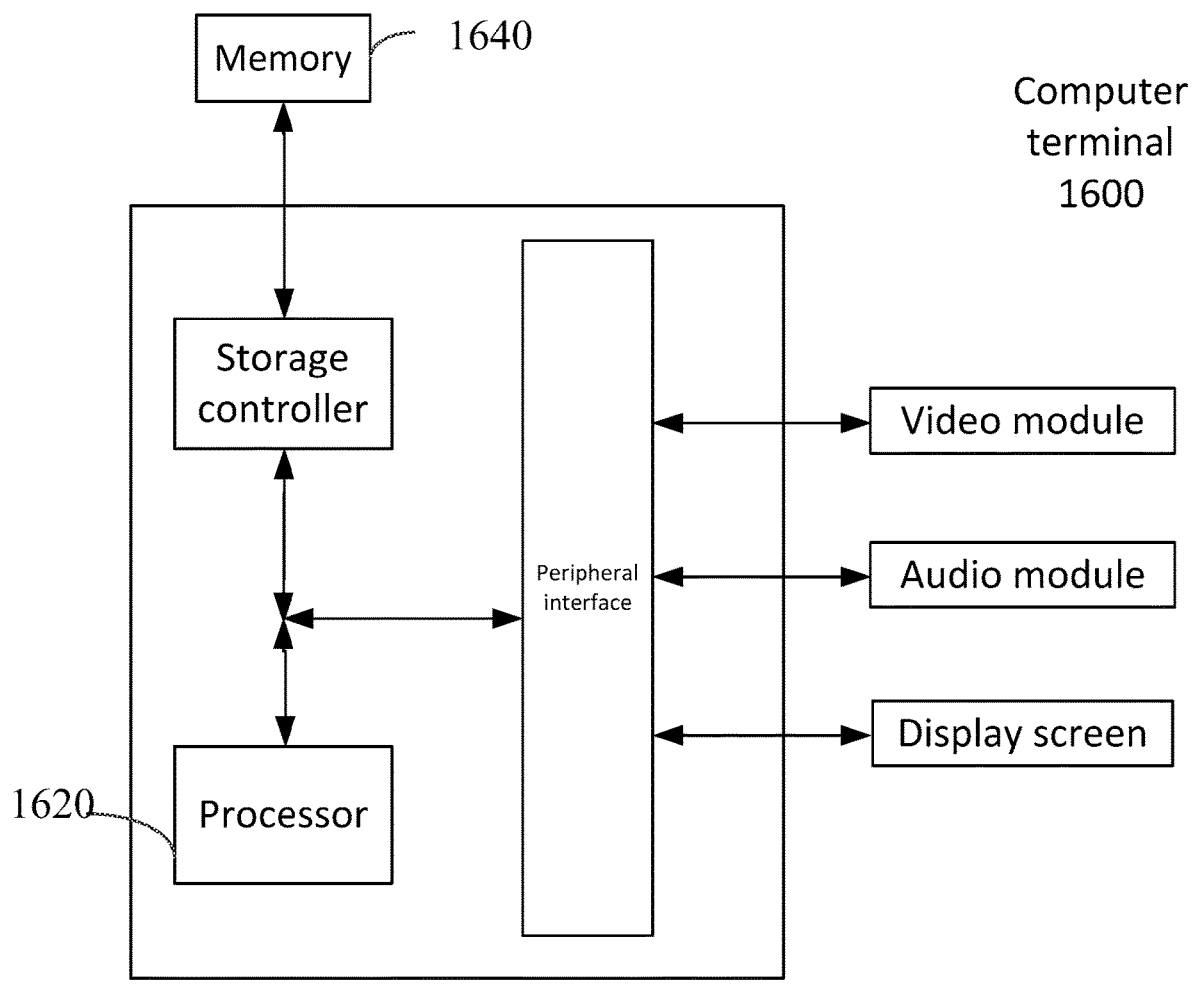
FIG. 16 is a structural block diagram of a terminal according to various embodiments of the present application.

FIG. 16 is a structural block diagram of a terminal according to various embodiments of the present application.

Referring to FIG. 16, terminal 1600 for identity authentication is provided. Terminal 1600 comprises one or more processors 1620 and memory 1640.

Terminal 1600 can at least be partially implemented in connection with system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, method 1000 of FIG. 10, method 1100 of FIG. 11, method 1200 of FIG. 12, method 1300 of FIG. 13, method 1400 of FIG. 14, and/or system 1500 of FIG. 15. Terminal 1600 can implement terminal 400 of FIG. 4.

Memory 1640 may be used to store software programs and modules (e.g., program instructions/modules corresponding to a method for identity authentication). By running software programs and modules stored in the memory, processor 1620 executes various function applications and data processing. For example, processor 1620 implements the method for identity authentication according to various embodiments. Memory 1640 can comprise high-speed random access memory. Memory 1640 can further comprise non-volatile memory, such as one or more magnetic storage devices, flash memory, or other non-volatile solid-state memory. Memory 1640 can further comprise memory that is remotely disposed relative to processor 1620. Such remote memory may be connected to the terminal 1600 via a network. Examples of the network comprise but are not limited to the Internet, corporate intranets, local area networks, mobile communication networks, and combinations thereof.

When used to implement an authentication system, processor 1620 is configured to execute applications stored in memory and cause the authentication system to: receive a login request issued by a front-end device, wherein the login request comprises: account information of the current account for use of the front-end device; use the account information as a basis for determining the confirmation device associated with the front-end device; send an authentication request to the confirmation device, wherein the authentication request comprises account information; upon receiving the confirmation information sent by the confirmation device in response to the authentication request, the authentication system to determine that the current account is a legitimate account.

In some embodiments, processor 1620 can execute program code to cause: before receiving a login request issued by a front-end device, the authentication system to establish network connections separately with at least one front-end device and at least one confirmation device and to receive a first registration request sent from any one front-end device and/or a second registration request sent from any one confirmation device, wherein the first registration request comprises the first account information used by any one front-end device when first remotely logging on to the authentication system, and the second registration request comprises the second account information used by any one confirmation device when first remotely logging on to the authentication system; the authentication system to generate first registration information based on the first registration request and/or to generate second registration information based on the second registration request, wherein the first registration information comprises: first account information and the certificate associated with the first account information, and the second registration information comprises: at least second account information; the authentication system to save the first registration information and the second registration information, wherein, when the first account information is the same as the second account information, the front-end device that uses the first account information to register and the confirmation device that uses the second account information to register in the authentication system are inter-related devices.

In some embodiments, processor 1620 executes program code to cause: the authentication system to query as to whether there exists first account information and second account information that are the same as the account information; if the query is successful, the authentication system to determine that the front-end device that issued the login request is a registered device and to confirm that the confirmation device that used the second account information for registration is a confirmation device associated with the front-end device.

In some embodiments, an authentication system comprises a target host and an authentication server. In some embodiments, processor 1620 executes program code to cause the target host to receive the first account information used by any one front-end device when first remotely logging in; after sending the first registration request carrying the first account information to the authentication server, to receive a certificate that was sent by the authentication server and that is associated with the first account information, and thus to obtain the first registration information.

In some embodiments, processor 1620 executes program code to cause the target host to query as to whether there exists first account information that is the same as the account information; if the query is successful, the target host to obtain the certificate associated with the first account information; the target host to invoke the certificate to launch a TLS connection with the authentication server and to send the account information to the authentication server; the authentication server to query whether there exists second account information that is the same as the account information; if this query is successful, the authentication server to determine that the confirmation device that used the second account information for registration is the confirmation device associated with the front-end device.

In some embodiments, processor 1620 executes program code to cause: the authentication server to forward the confirmation information to the target host; the target host to generate a remote login result based on the confirmation information and to send the remote login result back to the front-end device, wherein, upon successfully sending the remote login result back to the front-end device, the authentication server to determine that the current account for use of the front-end device is a legitimate account and to cause the current account to successfully log on to the target host through the front-end device.

In some embodiments, processor 1620 executes program code to cause: the confirmation device to generate the confirmation information in connection with (e.g., in response to) one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, processor 1620 executes program code to cause: before the authentication system receives the login request issued by the front-end device, the authorization server to receive a verification code sent by the front-end device, wherein the verification code is verification code generated by the front-end device for authorization purposes by encrypting the account information and security certificate for the current account in accordance with a predetermined encryption algorithm; the authorization server to decrypt the verification code in accordance with a predetermined decryption algorithm; if the decryption result is successfully verified, the authentication system to query the front-end device as to whether the front-end device is to (e.g., needs or otherwise desires to) access the network; if the front-end device is to (e.g., needs or otherwise desires to) access the network, then the front-end device to establish a network connection with the authentication system and to issue the login request to the authentication system.

In some embodiments, processor 1620 executes program code to cause: before receiving the verification code sent by the front-end device, the authorization server to receive a registration request from the front-end device and to generate a security certificate corresponding to the registration request; the authorization server to send the security certificate back to the front-end device.

In some embodiments, processor 1620 executes program code to cause the authentication system to receive a login request issued by a front-end device; the authentication system to use account information as a basis for determining the confirmation device associated with the front-end device; the authentication system to send an authentication request to the confirmation device; upon receiving the confirmation information sent by the confirmation device in response to the authentication request, the authentication system to determine that the current account is a legitimate account and thus achieves identity authentication for the remote login.

Because the login request sent by the front-end device comprises account information for the current account for use of the front-end device, the authentication system can look up the confirmation device with the account information and communicate the account information to the confirmation device (e.g., in connection with an authentication request). The authentication system can look up the confirmation device in a local storage (e.g., database) or a remote storage. The user can complete the identity authentication by performing a manual operation (e.g., on the confirmation device) to confirm the account information or corresponding login request. The use of the user completing the identity authentication (e.g., on the confirmation device) avoids password leaks or the security risks involved in other parties falsely presenting themselves. Moreover, the user does not need to input a password during the identity authentication process, but only to perform a simple confirmation operation. Therefore, various embodiments achieve the effects of enhancing user login experience, reducing user login time costs, and effectively preventing user misrepresentation.

Various embodiments address the technical problem in the related art of identity authentication methods involving both high security risks and poor user experience.

A person with ordinary skill in the art can understand that the structure shown in FIG. 16 is merely illustrative. The computer terminal may be a smartphone (such as an Android phone or an iOS phone), a tablet computer, a palmtop computer, a mobile Internet device (MID), a PAD, or other such device. FIG. 16 does not limit the structures of the aforesaid electronic devices. For example, terminal 1600 can comprise more or fewer components (such as network interfaces, display devices, etc.) than shown in FIG. 16 or may have a configuration that differs from the one shown in FIG. 16.

A person with ordinary skill in the art may understand that all or some of the steps in the various methods of the embodiments described above can be carried out by instructing terminal device-related hardware via programs. These programs may be stored in computer-readable storage media. The storage media may include: flash disks, read-only memory (ROM), random access memory (RAM), magnetic disks, optical disks, etc.

According to various embodiments, a storage medium is provided. The storage medium can save the program code that is executed in connection with a method for identity authentication according to various embodiments.

The storage medium can be located in any computer terminal in a computer terminal group in a computer network or located in any mobile terminal in a mobile terminal group.

In some embodiments, storage media is configured to store program code that, when executed, causes: an authentication system to receive a login request issued by a front-end device, wherein the login request comprises: account information of the current account for use of the front-end device; the authentication system to use the account information as a basis for determining the confirmation device associated with the front-end device; the authentication system to send an authentication request to the confirmation device, wherein the authentication request comprises account information; upon receiving the confirmation information sent by the confirmation device in response to the authentication request, the authentication system to determine that the current account is a legitimate account.

In some embodiments, storage media is configured to store program code that, when executed, causes: before receiving a login request issued by a front-end device, the authentication system to establish network connections separately with at least one front-end device and at least one confirmation device and to receive a first registration request sent from any one front-end device and/or a second registration request sent from any one confirmation device, wherein the first registration request comprises the first account information used by any one front-end device when first remotely logging on to the authentication system, and the second registration request comprises the second account information used by any one confirmation device when first remotely logging on to the authentication system; the authentication system to generate first registration information based on the first registration request and/or to generate second registration information based on the second registration request, wherein the first registration information comprises: first account information and the certificate associated with the first account information, and the second registration information comprises: at least second account information; the authentication system to save the first registration information and the second registration information, wherein, when the first account information is the same as the second account information, the front-end device that uses the first account information to register and the confirmation device that uses the second account information to register in the authentication system are inter-related devices.

In some embodiments, storage media is configured to store program code that, when executed, causes: the authentication system to query as to whether there exists first account information and second account information that are the same as the account information; if the query is successful, the authentication system to determine that the front-end device that issued the login request is a registered device and to confirm that the confirmation device that used the second account information for registration is a confirmation device associated with the front-end device.

In some embodiments, storage media is configured to store program code that, when executed, causes: the target host to receive the first account information used by any one front-end device when first remotely logging in; after sending the first registration request carrying the first account information to the authentication server, to receive a certificate that was sent by the authentication server and that is associated with the first account information, and thus to obtain the first registration information.

In some embodiments, storage media is configured to store program code that, when executed, causes: the target host to query as to whether there exists first account information that is the same as the account information; if the query is successful, the target host to obtain the certificate associated with the first account information; the target host to invoke the certificate to launch a TLS connection with the authentication server and to send the account information to the authentication server; the authentication server to query whether there exists second account information that is the same as the account information; if this query is successful, the authentication server to determine that the confirmation device that used the second account information for registration is the confirmation device associated with the front-end device.

In some embodiments, storage media is configured to store program code that, when executed, causes: the authentication server to forward the confirmation information to the target host; the target host to generate a remote login result based on the confirmation information and to send the remote login result back to the front-end device, wherein, upon successfully sending the remote login result back to the front-end device, the authentication server to determine that the current account for use of the front-end device is a legitimate account and to cause the current account to successfully log on to the target host through the front-end device.

In some embodiments, storage media is configured to store program code that, when executed, causes: the ways in which the confirmation device can generate (or be caused to generate) the confirmation information in connection with (e.g., in response to) one or more of detecting a click operation, a swipe operation, a press-and-hold operation, a double-click operation, a gesture operation, and a speech operation. A user of the confirmation device can indicate whether the login request (or account associated therewith) is authenticated by inputting a corresponding indication to the confirmation device.

In some embodiments, storage media is configured to store program code that, when executed, causes: before the authentication system receives the login request issued by the front-end device, the authorization server to receive a verification code sent by the front-end device, wherein the verification code is verification code generated by the front-end device for authorization purposes by encrypting the account information and security certificate for the current account in accordance with a predetermined encryption algorithm; the authorization server to decrypt the verification code in accordance with a predetermined decryption algorithm; if the decryption result is successfully verified, the authentication system to query the front-end device as to whether the front-end device is to (e.g., needs or otherwise desires to) access the network; if the front-end device is to (e.g., needs or otherwise desires to) access the network, then the front-end device to establish a network connection with the authentication system and to issue the login request to the authentication system.

In some embodiments, storage media is configured to store program code that, when executed, causes: before receiving the verification code sent by the front-end device, the authorization server to receive a registration request from the front-end device and to generate a security certificate corresponding to the registration request; the authorization server to send the security certificate back to the front-end device.

Figure 17:
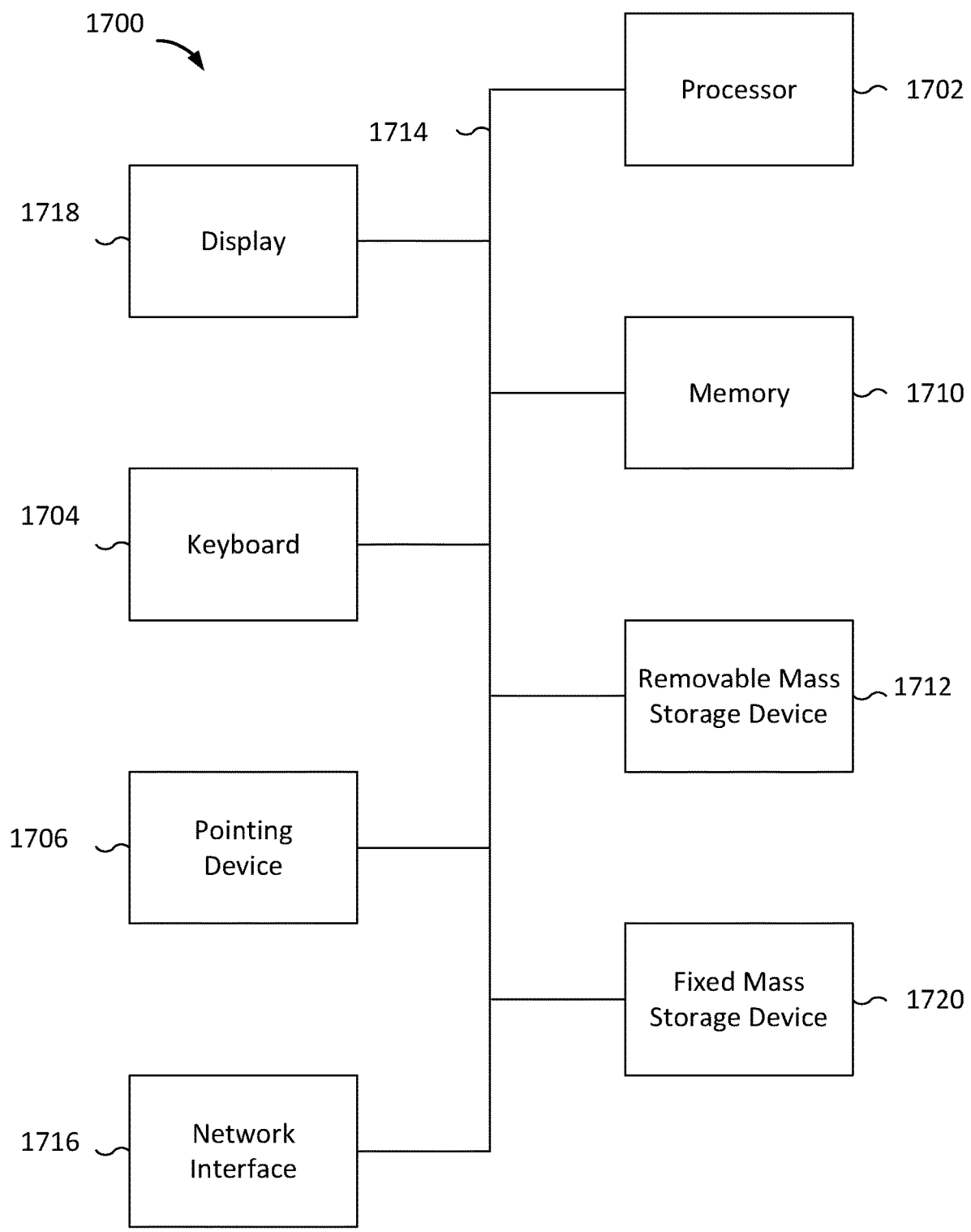
FIG. 17 is a functional diagram of a computer system for identity authentication according to various embodiments of the present application.

FIG. 17 is a functional diagram of a computer system for identity authentication according to various embodiments of the present application.

Referring to FIG. 17, a computer system 1700 for identity authentication is shown. As will be apparent, other computer system architectures and configurations can be used to detect a specified identifier. Computer system 1700, which includes various subsystems as described below, includes at least one microprocessor subsystem (also referred to as a processor or a central processing unit (CPU)) 1702. For example, processor 1702 can be implemented by a single-chip processor or by multiple processors. In some embodiments, processor 1702 is a general purpose digital processor that controls the operation of the computer system 1700. Using instructions retrieved from memory 1710, the processor 1702 controls the reception and manipulation of input data, and the output and display of data on output devices (e.g., display 1718).

Terminal 1700 can at least partially implement system 100 of FIG. 1, data exchange 200 of FIG. 2, system 300 of FIG. 3, terminal 400 of FIG. 4, system 500 of FIG. 5, method 600 of FIG. 6, method 700 of FIG. 7, method 800 of FIG. 8A, method 850 of FIG. 8B, method 900 of FIG. 9A, method 950 of FIG. 9B, method 1000 of FIG. 10, method 1100 of FIG. 11, method 1200 of FIG. 12, method 1300 of FIG. 13, method 1400 of FIG. 14, system 1500 of FIG. 15, and/or terminal 1600 of FIG. 16.

Processor 1702 is coupled bi-directionally with memory 1710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1702. Also as is well known in the art, primary storage typically includes basic operating instructions, program code, data, and objects used by the processor 1702 to perform its functions (e.g., programmed instructions). For example, memory 1710 can include any suitable computer-readable storage media, described below, depending on whether, for example, data access is to (e.g., needs to) be bi-directional or uni-directional. For example, processor 1702 can also directly and very rapidly retrieve and store frequently needed data in a cache memory (not shown). The memory can be a non-transitory computer-readable storage medium.

A removable mass storage device 1712 provides additional data storage capacity for the computer system 1700, and is coupled either bi-directionally (read/write) or uni-directionally (read only) to processor 1702. For example, storage 1712 can also include computer-readable media such as magnetic tape, flash memory, PC-CARDS, portable mass storage devices, holographic storage devices, and other storage devices. A fixed mass storage 1720 can also, for example, provide additional data storage capacity. The most common example of mass storage 1720 is a hard disk drive. Mass storage device 1712 and fixed mass storage 1720 generally store additional programming instructions, data, and the like that typically are not in active use by the processor 1702. It will be appreciated that the information retained within mass storage device 1712 and fixed mass storage 1720 can be incorporated, if needed, in standard fashion as part of memory 1710 (e.g., RAM) as virtual memory.

In addition to providing processor 1702 access to storage subsystems, bus 1714 can also be used to provide access to other subsystems and devices. As shown, these can include a display monitor 1718, a network interface 1716, a keyboard 1704, and a pointing device 1706, as well as an auxiliary input/output device interface, a sound card, speakers, and other subsystems as needed. For example, the pointing device 1706 can be a mouse, stylus, track ball, or tablet, and is useful for interacting with a graphical user interface.

The network interface 1716 allows processor 1702 to be coupled to another computer, computer network, or telecommunications network using a network connection as shown. For example, through the network interface 1716, the processor 1702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1702 can be used to connect the computer system 1700 to an external network and transfer data according to standard protocols. For example, various process embodiments disclosed herein can be executed on processor 1702, or can be performed across a network such as the Internet, intranet networks, or local area networks, in conjunction with a remote processor that shares a portion of the processing. Additional mass storage devices (not shown) can also be connected to processor 1702 through network interface 1716.

An auxiliary I/O device interface (not shown) can be used in conjunction with computer system 1700. The auxiliary I/O device interface can include general and customized interfaces that allow the processor 1702 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 17 is but an example of a computer system suitable for use with the various embodiments disclosed herein. Other computer systems suitable for such use can include additional or fewer subsystems. In addition, bus 1714 is illustrative of any interconnection scheme serving to link the subsystems. Other computer architectures having different configurations of subsystems can also be utilized.

The modules described as separate components may or may not be physically separate, and components displayed as modules may or may not be physical modules. They can be located in one place, or they can be distributed across multiple network modules. The embodiment schemes of the present embodiments can be realized by selecting part or all of the modules in accordance with actual need.

Furthermore, the functional modules in the various embodiments of the present invention can be integrated into one processor, or each module can have an independent physical existence, or two or more modules can be integrated into a single module. The aforesaid integrated modules can take the form of hardware, or they can take the form of hardware combined with software function modules.

In the aforesaid embodiments, the description of each embodiment has its respective emphasis, and parts of an embodiment are not described in detail. One may refer to other embodiments for the relevant descriptions.

Please understand that, in several embodiments provided by the present application, the disclosed technical content may be realized in other ways. The device embodiments described above are merely illustrative. For example, the division into said units is merely a division by logical function. When actually implemented, there may be other forms of division. For example, multiple units or components may be combined or integrated into another system, or some features might be omitted or not executed. In addition, the interposed couplings or direct couplings or communication connections that are displayed or discussed may be indirect couplings or communication links that pass through some interfaces, units, or modules. They may be electrical or may take another form.

The units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

Furthermore, the functional units in the various embodiments of the present invention can be integrated into one processing unit, or each unit can have an independent physical existence, or two or more units can be integrated into a single unit. The aforesaid integrated units may also take the form of hardware, and they may take the form of software function units.

If said integrated units are realized in the form of software functional units and are sold or used as separate products, they may be stored on computer-readable storage media. Based on such an understanding, the technical scheme of the present invention, whether intrinsically or with respect to portions that contribute to the prior art, or with respect to all or part of the technical scheme, is realizable in the form of software products. These computer software products can be stored on storage media (such as ROM/RAM, magnetic disks, and optical disks) and include a certain number of commands used to cause a piece of terminal equipment (which could be a mobile phone, a computer, a server, or network equipment) to execute the methods described in the embodiments of the present invention. The storage medium described above encompasses: USB flash drive, mobile hard drive, read-only memory (ROM), random access memory (RAM), portable hard drives, magnetic disks, or optical disks, or various other media that can store program code.

The description above is only a specific means of implementing the present invention. It should be pointed out that persons with ordinary skill in the art can, without departing from the principles of the present invention, also produce a number of improvements and embellishments, and that such improvements and embellishments should also be regarded as falling within the scope of protection of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
  receive a verification code sent by a front-end device;
  decrypt the verification code according to a predetermined decryption algorithm;
  verify a result of decrypting the verification code, the verification code being generated by the front-end device based at least in part on encrypting account information and a security certificate associated with an account corresponding to the account information;
  in response to a determination that the result of decrypting the verification code is successfully verified, query the front-end device as to whether the front-end device is to access an authentication system;
  in response to a determination that the front-end device is to access the authentication system,
  establish a network connection with the front-end device; and
  receive a login request from the front-end device, wherein the login request comprises account information of an account associated with the front-end device, and the login request does not include a password associated with the account;
  determine a confirmation device associated with the front-end device based at least in part on the account information;

generate an authentication request based at least in part on the account information, wherein said authentication request comprises said account information;

obtain confirmation information from the confirmation device, the confirmation information being generated based at least in part on the authentication request and confirming the login request; and authenticate the front-end device based at least in part on the confirmation information; and one or more memories coupled to the one or more processors, configured to provide the one or more processors with instructions.

2. The system of claim 1, wherein to authenticate the front-end device based at least in part on the confirmation information comprises to determine whether the account associated with the front-end device corresponds to a legitimate account based at least in part on the confirmation information.

3. The system of claim 1, wherein:

the one or more processors are further configured to:

establish network connections separately with the front-end device and the confirmation device;

receive a first registration request sent from the front-end device, a second registration request sent from the confirmation device, or both, wherein the first registration request comprises first account information used by the front-end device in connection with an initial remote login by the front-end device, and the second registration request comprises second account information used by the confirmation device in connection with an initial remote login by the confirmation device to the authentication system;

generate first registration information based at least in part on the first registration request, second registration information based at least in part on the second registration request, or both, wherein the first registration information comprises the first account information and a security certificate associated with the first account information, and the second registration information comprises the second account information;

save one or more of the first registration information and the second registration information; and deem the front-end device and the confirmation device to be inter-related devices based on a determination that the first account information and the second account information match.

4. The system of claim 3, wherein the one or more processors are further configured to receive a registration request from the front-end device, generate the security certificate based at least in part on the registration request, and send the security certificate to the front-end device.

5. A method, comprising:

receiving, by an authentication system, a verification code sent by a front-end device;

decrypting, by the authentication system, the verification code according to a predetermined decryption algorithm;

verifying, by the authentication system, a result of decrypting the verification code, the verification code being generated by the front-end device based at least in part on encrypting account information and a security certificate associated with an account corresponding to the account information;

in response to a determination that the result of decrypting the verification code is successfully verified, querying, by the authentication system, the front-end device as to whether the front-end device is to access an authentication system;

in response to a determination that the front-end device is to access the authentication system, establishing a network connection with the front-end device; and receiving, by an authentication system, a login request from the front-end device, wherein the login request comprises account information of an account associated with the front-end device, and the login request does not include a password associated with the account;

determining, by the authentication system, a confirmation device associated with the front-end device based at least in part on the account information;

generating, by the authentication system, an authentication request based at least in part on the account information, wherein said authentication request comprises said account information;

obtaining, by the authentication system, confirmation information from the confirmation device, the confirmation information being generated based at least in part on the authentication request and confirming the login request; and authenticating, by the authentication system, the front-end device based at least in part on the confirmation information.

6. The method of claim 5, further comprising:

establishing by the authentication system, network connections separately with the front-end device and the confirmation device;

receiving, by the authentication system, a first registration request sent from the front-end device, a second registration request sent from the confirmation device, or both, wherein the first registration request comprises first account information used by the front-end device in connection with an initial remote login by the front-end device to the authentication system, and the second registration request comprises second account information used by the confirmation device in connection with an initial remote login by the confirmation device to the authentication system;

generating, by the authentication system, first registration information based at least in part on the first registration request, second registration information based at least in part on the second registration request, or both, wherein the first registration information comprises the first account information and a security certificate associated with the first account information, and the second registration information comprises the second account information;

saving, by the authentication system, one or more of the first registration information and the second registration information; and deeming the front-end device and the confirmation device to be inter-related devices based on a determination that the first account information and the second account information match.

7. The method of claim 5, further comprising:

determining, by the authentication system, whether a database associated with the authentication system stores first account information and second account information that match the account information included in the login request; and in response to a determination that the database stores the first account information and the second account information that match the account information included in the login request, determining, by the authentication system, that the front-end device corresponds to a registered device and that a confirmation device associated with registration of the second account information corresponds to the confirmation device associated with the front-end device.

8. The method of claim 7, wherein further comprising:
obtaining first registration information, the obtaining of the first registration information comprising:
receiving the first account information in connection with an initial remote login by the front-end device; and
obtaining a certificate that is associated with the first account information.

9. The method of claim 7, wherein the determining whether the database associated with the authentication system stores the first account information and the second account information that match the account information included in the login request, and the determining that the front-end device corresponds to a registered device and that the confirmation device associated with the registration of the second account information corresponds to the confirmation device associated with the front-end device further comprises:
determining, by a target host, whether the database associated with the authentication system stores the first account information that matches the account information included in the login request;
in response to a determination that the database stores the first account information that matches the account information included in the login request, obtaining, by the target host, a certificate associated with the first account information;
determining by the target host, whether the database associated with the authentication system stores the second account information that matches the account information included in the login request; and
in response to a determination that the database stores the second account information that matches the account information included in the login request, determining that the confirmation device associated with the registration of the second account information corresponds to the confirmation device associated with the front-end device.

10. The method as described in claim 5, wherein the authenticating the front-end device based at least in part on the confirmation information comprises:
generating, by the authentication system, a remote login result based at least in part on the confirmation information; and
sending, by the authentication system, the remote login result to the front-end device; and
wherein, upon successfully sending the remote login result to the front-end device, determining that the account associated with the account information is authenticated and causing the account associated with the account information to log on to a target host through the front-end device.

11. The method of claim 5, wherein the confirmation information is generated by the confirmation device based at least on one of detecting a click operation, detecting a swipe operation, detecting a press-and-hold operation, detecting a double-click operation, detecting a gesture operation, and detecting a speech operation.

12. The method of claim 5, wherein the verification code sent by the front-end device is obtained, the method further comprising:

receiving, by the authentication system, a registration request from the front-end device;
generating, by the authentication system, the security certificate based at least in part on the registration request; and
sending, by the authentication system, the security certificate to the front-end device.

13. A method, comprising:
sending, by a front-end device, a verification code to an authentication system, wherein the authentication system decrypts the verification code according to a predetermined decryption algorithm, and verifies a result of decrypting the verification code, the verification code being generated by the front-end device based at least in part on encrypting account information and a security certificate associated with an account corresponding to the account information;
receiving, from the authentication system, a query as to whether the front-end device is to access the authentication system, the query being sent by the authentication system in response to a determination that the result of decrypting the verification code is successfully verified;
in response to a determination that the front-end device is to access the authentication system,
establishing a network connection with the authentication system; and
sending a login request to the authentication system, wherein the login request comprises account information of an account associated with the front-end device, and the login request does not include a password associated with the account; and
receiving a result of a login associated with the login request, the result being communicated to the front-end device by the authentication system, wherein the login request is used by the authentication system to determine that a confirmation device is associated with the front-end device based at least in part on the account information, in connection with generating an authentication request based at least in part on the account information, wherein the authentication request comprises the account information, in connection with obtaining confirmation information from the confirmation device, and in connection with authenticating the front-end device based at least in part on the confirmation information.

14. A method, comprising:
receiving, by an authentication system, a verification code sent by a front-end device;
decrypting, by the authentication system, the verification code according to a predetermined decryption algorithm;
verifying, by the authentication system, a result of decrypting the verification code, the verification code being generated by the front-end device based at least in part on encrypting account information and a security certificate associated with an account corresponding to the account information;
in response to a determination that the result of decrypting the verification code is successfully verified, querying, by the authentication system, the front-end device as to whether the front-end device is to access an authentication system;
in response to a determination that the front-end device is to access the authentication system,
establishing a network connection with the front-end device; and receiving, by a target host, a login request from the front-end device, wherein the login request comprises account information of an account associated with the front-end device, and the login request does not include a password associated with the account;

sending, by the target host, the account information to an authentication server and causing the authentication server to send an authentication request to a confirmation device, wherein the authentication request comprises the account information, and the authentication server determines that the confirmation device is associated with the front-end device based at least in part on the account information; and in response to a determination that confirmation information is received from the confirmation device in response to the authentication request, authenticating, by the target host, the front-end device based at least in part on the confirmation information.

15. A computer program product, the computer program product being embodied in a non-transitory computer readable storage medium and comprising computer instructions for:

receive a verification code sent by a front-end device;

decrypt the verification code according to a predetermined decryption algorithm;

verify a result of decrypting the verification code, the verification code being generated by the front-end device based at least in part on encrypting account information and a security certificate associated with an account corresponding to the account information;

in response to a determination that the result of decrypting the verification code is successfully verified, query the front-end device as to whether the front-end device is to access an authentication system;

in response to a determination that the front-end device is to access the authentication system,
    establish a network connection with the front-end device; and
    receive a login request from the front-end device, wherein the login request comprises account information of an account associated with the front-end device, and the login request does not include a password associated with the account;

determine a confirmation device associated with the front-end device based at least in part on the account information;

generate an authentication request based at least in part on the account information, wherein said authentication request comprises said account information;

obtain confirmation information from the confirmation device, the confirmation information being generated based at least in part on the authentication request and confirming the login request; and authenticate the front-end device based at least in part on the confirmation information.

16. The system of claim 1, wherein the one or more processors are further configured to:

in response to a determination that the front-end device has a corresponding token credential and that the confirmation device has not been registered in association with the front-end device, prompting a user of the front-end device to register a token application on the confirmation device with a same credential as the token credential.

17. The system of claim 1, wherein:

the login request includes certificate information that the front-end device obtained during registration with the system;

the confirmation information includes certificate information that the confirmation device obtained during registration with the system; and to authenticate the front-end device includes determining whether the certificate information included in the login request and the certificate information included in the confirmation information respectively match with the account information that is stored in connection with registration of an association between the front-end device and the confirmation device.

18. The system of claim 1, wherein certificate information comprised in the login request is based at least in part on information that identifies an account associated with the front-end device but not on password information.

19. The system of claim 1, wherein the login request does not include confidential or secret information that is sensitive to leakage for authentication of the front-end device.

20. The system of claim 1, wherein the front-end device is authenticated based on the confirmation information being obtained in connection with the login request comprising the account information, and the password is not used in connection with authenticating the front-end device.

* * * * *